(12) United States Patent
Ogata

(10) Patent No.: US 7,492,694 B2
(45) Date of Patent: Feb. 17, 2009

(54) OPTICAL PICKUP DEVICE AND OPTICAL DISK DRIVE USING THE SAME

(75) Inventor: Tetsuya Ogata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/436,660

(22) Filed: May 19, 2006

(65) Prior Publication Data

US 2006/0209660 A1     Sep. 21, 2006

Related U.S. Application Data

(62) Division of application No. 10/411,290, filed on Apr. 11, 2003, now abandoned.

(30) Foreign Application Priority Data

| Apr. 15, 2002 | (JP) | ............................. 2002-111544 |
| May 9, 2002 | (JP) | ............................. 2002-134002 |
| May 9, 2002 | (JP) | ............................. 2002-134012 |
| Jul. 25, 2002 | (JP) | ............................. 2002-216446 |
| Aug. 30, 2002 | (JP) | ............................. 2002-253737 |

(51) Int. Cl.
*G11B 7/00* (2006.01)

(52) U.S. Cl. ............................. 369/112.23; 369/112.24

(58) Field of Classification Search ............ 369/112.24, 369/112.23
See application file for complete search history.

(56) References Cited

U.S. PATENT DOCUMENTS

| 4,653,923 A | 3/1987 | Kitabayashi |
| 4,743,117 A | 5/1988 | Kitabayashi et al. |
| 4,743,118 A | 5/1988 | Tsuchiya et al. |
| 4,744,659 A | 5/1988 | Kitabayashi |
| 5,015,835 A | 5/1991 | Ohuchida et al. |
| 5,101,389 A | 3/1992 | Ohuchida et al. |
| 5,107,483 A | 4/1992 | Nakajima et al. |
| 5,115,423 A | 5/1992 | Maeda et al. |
| 5,144,684 A | 9/1992 | Inada et al. |
| 5,278,817 A | 1/1994 | Maeda et al. |
| 5,281,802 A | 1/1994 | Kitabayashi |
| 5,487,058 A | 1/1996 | Kitabayashi |
| 5,619,488 A | 4/1997 | Ota et al. |
| 5,737,300 A * | 4/1998 | Ota et al. ............... 369/112.24 |
| 6,063,468 A | 5/2000 | Aratani et al. |
| 6,084,843 A * | 7/2000 | Abe et al. ............... 369/112.07 |
| 6,195,315 B1 | 2/2001 | Takahashi et al. |

(Continued)

FOREIGN PATENT DOCUMENTS

JP     59-78532     5/1984

(Continued)

*Primary Examiner*—Wayne R Young
*Assistant Examiner*—Van N Chow
(74) *Attorney, Agent, or Firm*—Dickstein Shapiro LLP

(57) ABSTRACT

An optical pickup device includes a light source unit an optical system which leads a return light beam to a predetermined light-receiving location and includes an object lens focusing each light beam from the light source unit to a recording surface of a corresponding storage medium and a photodetector arranged at the light-receiving location. The light source unit includes a plurality of light sources outputting light beams respectively, the plurality of light sources being arranged in proximity to each other, and a divergence-angle changing unit changing an angle of divergence of a light beam output from at least one of the plurality of light sources.

17 Claims, 45 Drawing Sheets

U.S. PATENT DOCUMENTS

| | | |
|---|---|---|
| 6,240,053 B1 | 5/2001 | Akiyama |
| 6,256,283 B1 | 7/2001 | Fukakusa et al. |
| 6,388,976 B1 * | 5/2002 | Fujita et al. ............ 369/112.01 |
| 6,574,182 B1 * | 6/2003 | Yamada et al. ......... 369/112.03 |
| 6,671,247 B1 | 12/2003 | Arai et al. |
| 6,704,152 B2 | 3/2004 | Togashi et al. |
| 6,760,294 B2 | 7/2004 | Miyake |
| RE38,643 E | 11/2004 | Sugaya et al. |
| 6,975,576 B1 | 12/2005 | Uchiyama |
| 2002/0009039 A1 * | 1/2002 | Miyake ................. 369/112.23 |
| 2002/0012313 A1 * | 1/2002 | Kimura et al. ......... 369/112.08 |
| 2002/0093902 A1 | 7/2002 | Hirai et al. |
| 2002/0105892 A1 | 8/2002 | Onishi et al. |
| 2002/0110076 A1 * | 8/2002 | Yanagisawa ........... 369/112.24 |
| 2003/0072047 A1 | 4/2003 | Funato et al. |
| 2003/0072228 A1 | 4/2003 | Izumi et al. |
| 2003/0080274 A1 | 5/2003 | Izumi et al. |
| 2003/0165107 A1 * | 9/2003 | Honda et al. ........... 369/112.08 |
| 2004/0264344 A1 | 12/2004 | Ogata |
| 2005/0141391 A1 * | 6/2005 | Ueyama et al. ......... 369/112.1 |
| 2005/0232119 A1 | 10/2005 | Ohkubo |
| 2005/0281169 A1 * | 12/2005 | Kimura et al. ......... 369/112.01 |
| 2006/0039266 A1 * | 2/2006 | Kimura et al. ......... 369/112.23 |

FOREIGN PATENT DOCUMENTS

| | | |
|---|---|---|
| JP | 61-165837 | 7/1986 |
| JP | 62-154337 | 7/1987 |
| JP | 2-71442 | 3/1990 |
| JP | 5-66354 | 3/1993 |
| JP | 9-96760 | 4/1997 |
| JP | 10-31841 | 2/1998 |
| JP | 10-199021 | 7/1998 |
| JP | 10-233031 | 9/1998 |
| JP | 10-275359 | 10/1998 |
| JP | 10-312578 | 11/1998 |
| JP | 10-334505 | 12/1998 |
| JP | 11-39705 | 2/1999 |
| JP | 3026279 | 1/2000 |
| JP | 2000-82232 | 3/2000 |
| JP | 2000-306258 | 11/2000 |
| JP | 2000-348367 | 12/2000 |
| JP | 2000-348369 | 12/2000 |
| JP | 2001-43555 | 2/2001 |
| JP | 2001-160234 | 6/2001 |
| JP | 2001-174697 | 6/2001 |
| JP | 2001-184707 | 7/2001 |
| JP | 2001-209967 | 8/2001 |
| JP | 2002-184026 | 6/2002 |
| WO | WO 00/36597 | 6/2000 |

* cited by examiner

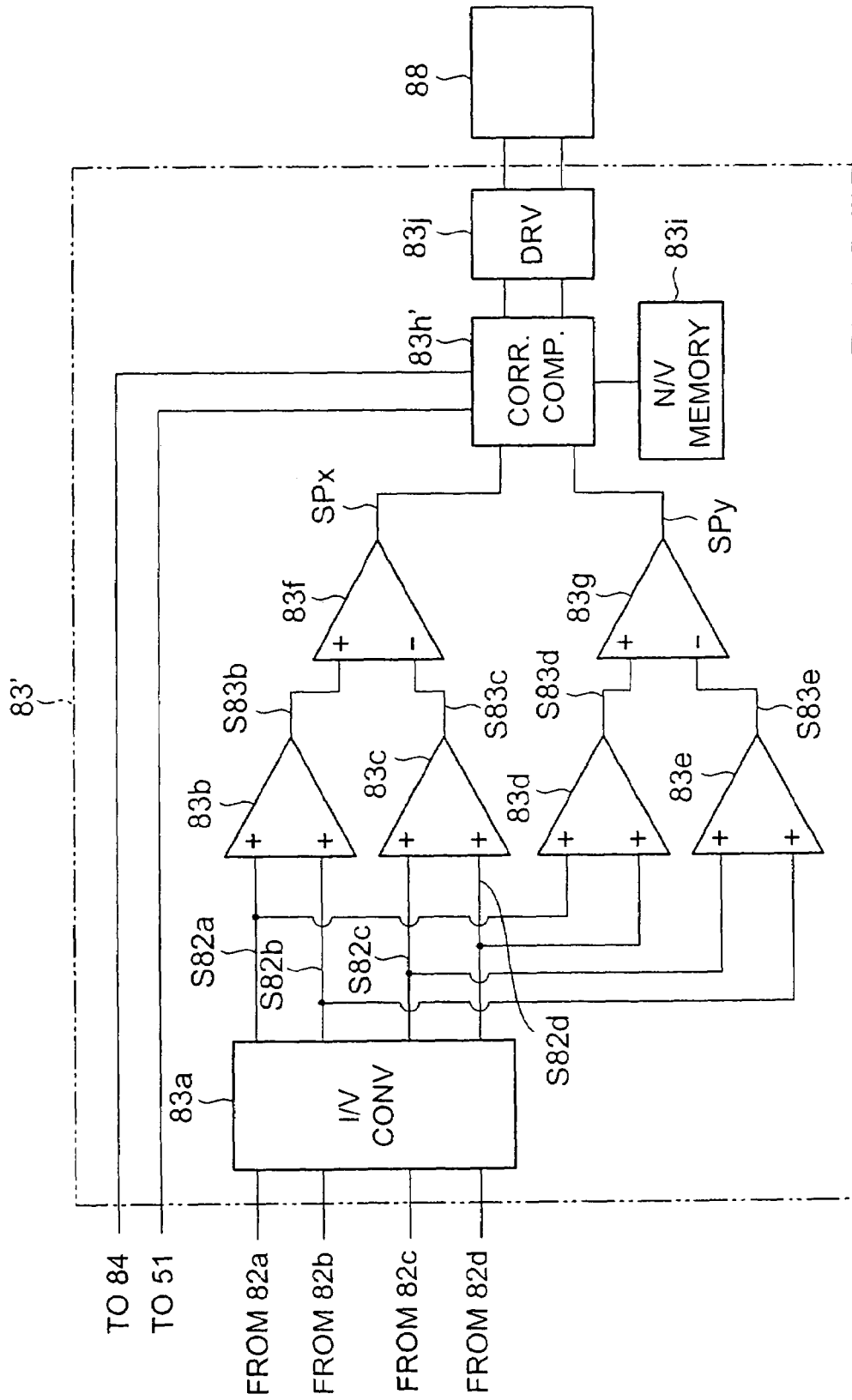

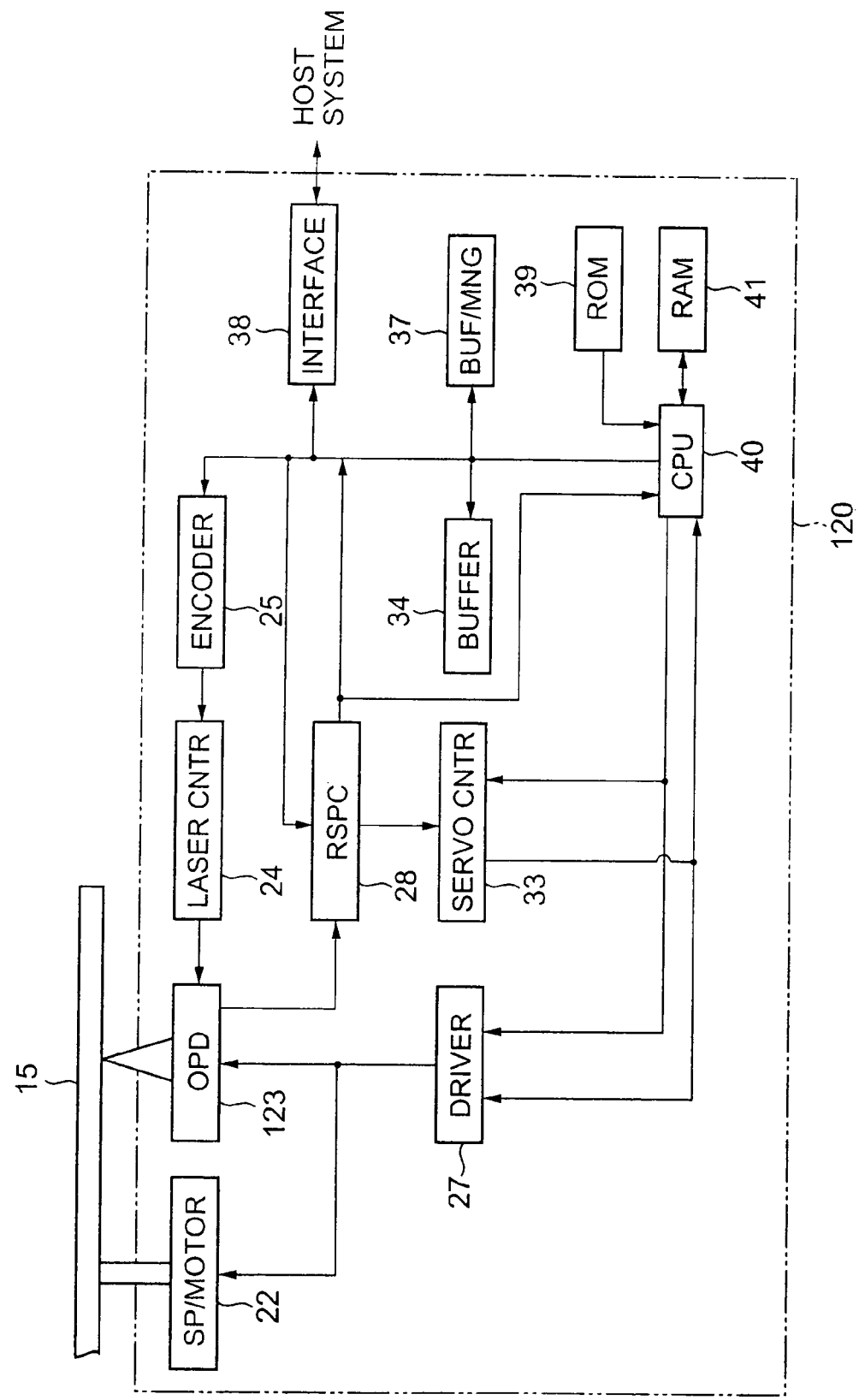

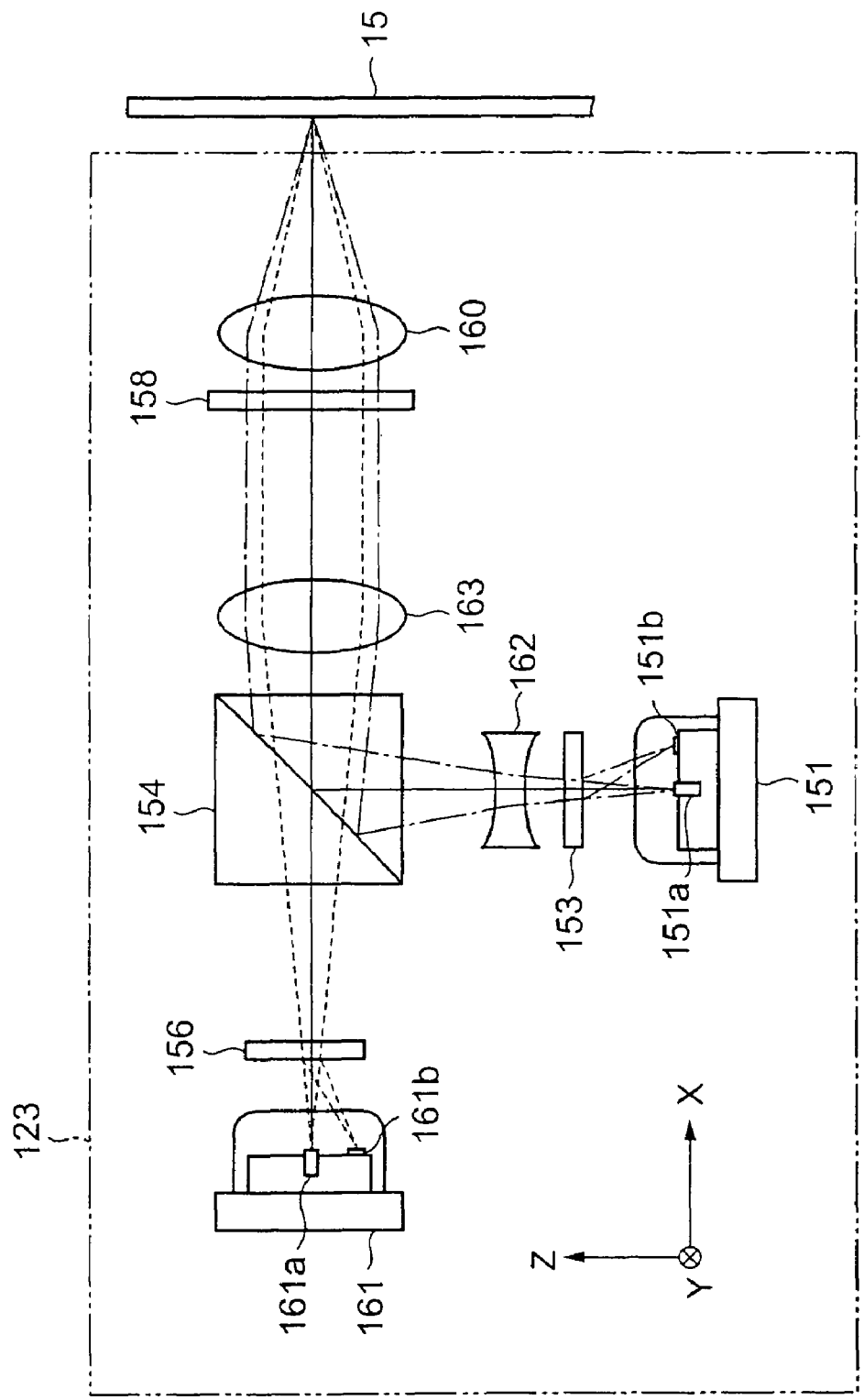

FIG.57A
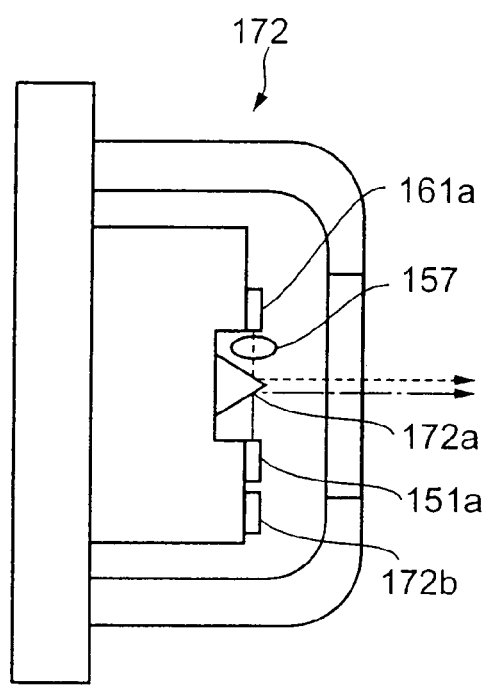
FIG.57B
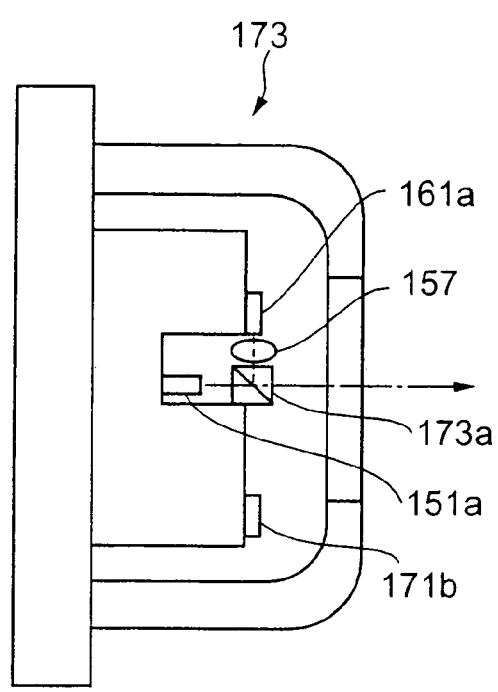
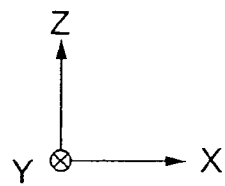
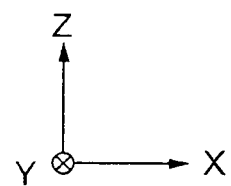

FIG.58
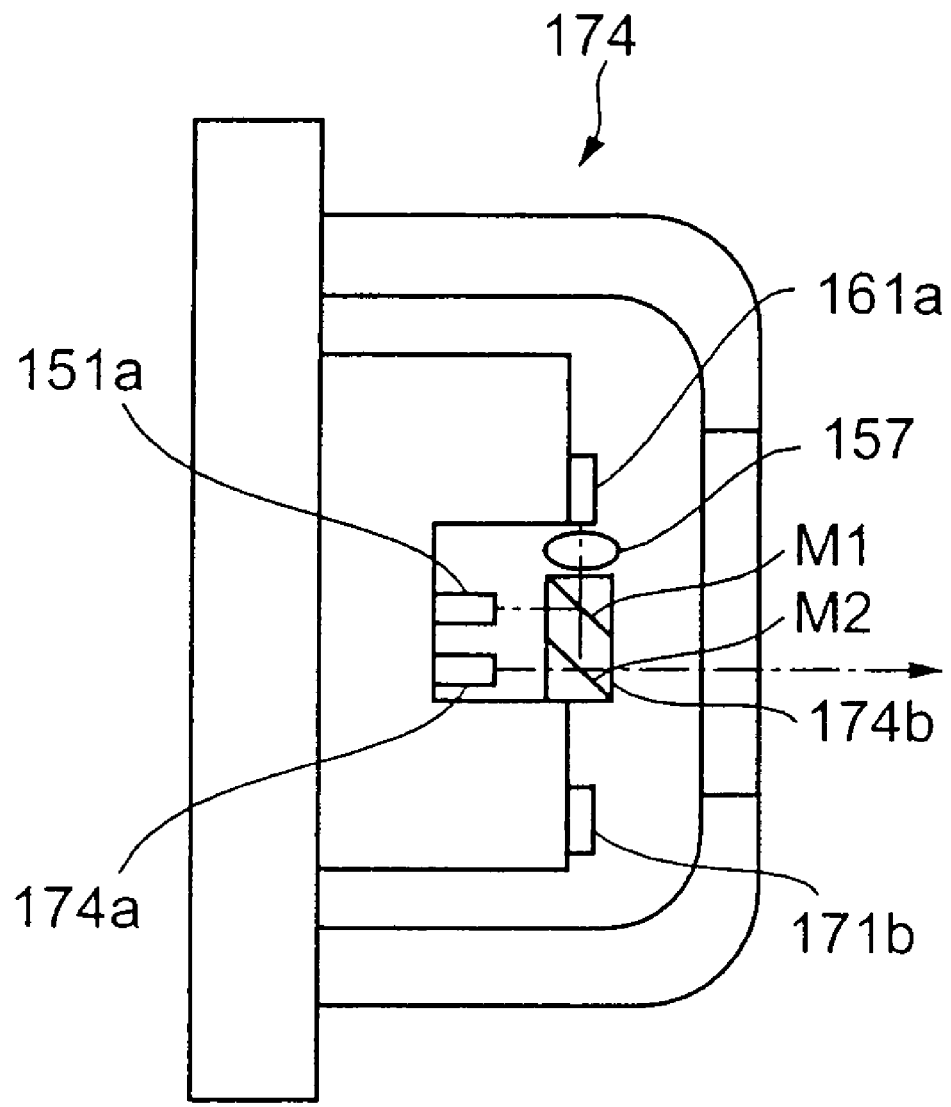
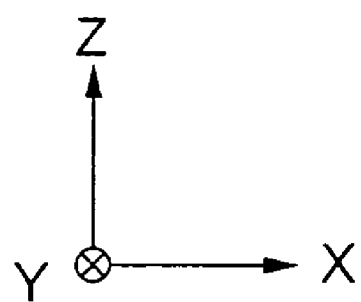

OPTICAL PICKUP DEVICE AND OPTICAL DISK DRIVE USING THE SAME

CROSS REFERENCE TO RELATED APPLICATIONS

The present application is a divisional of U.S. patent application Ser. No. 10/411,290, filed on Apr. 11, 2003 now abandoned, the disclosure of which is incorporated by reference in its entirety.

BACKGROUND OF THE INVENTION

1. Field of the Invention

The present invention relates to an optical pickup device and an optical disk drive using the same. More specifically, the present invention relates to an optical pickup device for an optical disk drive which focuses a light beam to a corresponding one of two optical disks of different types for recording of information, and receives a reflected light beam from the corresponding optical disk for reproduction of information.

2. Description of the Related Art

In the optical disk drive, storage media, such as optical disks, in which tracks in the spiral or concentric formation are formed in the recording surface of the optical disk, are used for recording and reproduction of information. The optical disk drive emits a light beam to the optical disk to record information in the recording surface of the optical disk, and receives a reflected light beam from the recording surface of the optical disk to reproduce the information based on the received light beam.

The optical disk drive is usually equipped with an optical pickup device. The optical pickup device is provided for emitting a laser beam to the recording surface of an optical disk to form a small light spot thereon, and for receiving a reflected laser beam from the recording surface of the optical disk.

The optical pickup device usually includes an object lens, an optical system and a photodetector. The optical system is provided to lead the light beam emitted by the light source, to the recording surface of the optical disk, and to lead the return light beam reflected from the recording surface of the optical disk to a predetermined light-receiving location where the photodetector is arranged.

In response to the received light beam, the photodetector outputs the electrical signal indicating the reproduced information of data that is recorded in the optical disk. Also, the optical pickup device outputs the signal including information (servo control information) required for the position control of the optical pickup device itself and the object lens.

In recent years, a DVD (digital versatile disk) has been generalized as a mass storage medium having a recording capacity much larger than that of a CD (compact disk).

In order to perform recording and reproduction to CD, the laser light having the wavelength 780 nm is used. In order to perform recording and reproduction to DVD, the laser light having the wavelength 650 nm is used.

For this reason, the optical disk drive for CD and the optical disk drive for DVD have been developed respectively as different peripheral devices of information processing devices, such as personal computer.

With recent developments of small-sized, lightweight information processing devices, the necessity for the optical disk drive, which can access both CD and DVD, is increasing.

In this case, in order to access both DVD and CD, the optical pickup device must be provided with a light source unit containing both the semiconductor laser (DVD light source) which outputs the laser light whose wavelength is 650 nm, and the semiconductor laser (CD light source) which outputs the laser light whose wavelength is 780 nm. Furthermore, the optical pickup device must be provided with the optical system for detecting each of the two laser beams output from the two light sources.

However, if the optical system for 650 nm and the optical system for 780 nm are arranged individually in the optical pickup device, the problem that the size of the optical pickup device is enlarged arises.

In the following the optical pickup device equipped with the light sources of two different wavelengths will be called the two-wavelength optical pickup device.

For example, Japanese Patent No. 3026279 discloses a laser module for a recording/reproduction apparatus. This laser module is equipped with an LD module in which two laser components which output laser light beams having different wavelengths are integrated. In the laser module, a light-receiving component is commonized to receive both the return light beams of the different wavelengths.

According to the optical pickup device using the laser module, the commonization of the optical system and the reduction of the number of the optical parts needed are possible, and simplification of the assembly of the components, the reduction in cost, and the miniaturization of the device are promoted.

FIG. 17 shows a relationship between the intensity distribution of the light beam output from the semiconductor laser and the location of the activation layer thereof.

Generally, the light beam (the outgoing light beam) output from the semiconductor laser that is used as a light source is a divergent light beam with the intensity distribution in the form of an ellipse having the major axis whose direction accords with the direction perpendicular to the surface of the activation layer (hetero-junction plane) AL of the semiconductor laser LD, as shown in FIG. 17.

The rate of the light beam received by the object lens and focused on the recording surface of the optical disk (which light beam is called the received light beam) over the outgoing light beam of the light source is represented by the ratio of the minimum optical intensity in the received light beam to the optical intensity in the center of the outgoing light beam. This ratio is called the rim intensity (RIM).

FIG. 18 shows an example of the intensity distribution of the received light beam in the case of RIM=50%.

FIG. 19 shows a relationship between the optical efficiency and the rim intensity of the light beam output from the semiconductor laser. The optical efficiency, which is indicated by the ratio of the quantity of light on the optical disk recording surface to the quantity of light in the outgoing light beam, is almost in the inverse proportion with the RIM, as shown in FIG. 19.

If the optical pickup device is designed to raise the RIM, the optical efficiency will fall. If the optical pickup device is designed to raise the optical efficiency, the RIM will become low.

Usually, the optical pickup device is designed so that the RIM to the outgoing light beam of CD light source is lower than the RIM to the outgoing light beam of DVD light source.

This is because it is necessary to control accurately the diameter of a light spot on the recording surface of DVD, as the recording density of DVD is higher than that of CD. On the other hand, importance is attached to raising the optical efficiency for CD light source.

However, in the optical pickup device using the laser module of Japanese Patent No. 3026279, the RIM to the outgoing light beam of CD light source and the RIM to the outgoing light beam of DVD light source become almost equal.

When the optical system is optimized to DVD, the optical efficiency of CD light source falls, and it is difficult to deal with improvement in the access speed for the optical disk. On the other hand, when the optical system is optimized to CD, the problem arises that it is difficult to control accurately the diameter of a light spot on the recording surface of DVD.

SUMMARY OF THE INVENTION

An object of the present invention is to provide an improved optical pickup device in which the above-described problems are eliminated.

Another object of the present invention is to provide a light source unit of an optical pickup device that is capable of optimizing the respective intensity distributions of the light beams output from the plurality of light sources.

Another object of the present invention is to provide a light source unit package of an optical pickup device which is capable of optimizing the respective intensity distributions of the light beams from the plurality of light source without causing enlargement and high cost, and which stably receives the return light beam from the outside.

Another object of the present invention is to provide an optical element of an optical pickup device that is capable of adjusting the intensity distributions of two incoming light beams with sufficient accuracy.

Another object of the present invention is to provide an optical pickup device that can respond to each of two kinds of optical disks and forms the optimal light spot for each optical disk without causing enlargement and high cost.

Another object of the present invention is to provide an optical disk drive that includes an optical pickup device and can respond to each of two kinds of optical disks and stably carry out high-speed access to each optical disk.

Another object of the present invention are to provide a method of manufacture of an optical pickup device in which a deviation of the outgoing direction of each of the light beams output from the plurality of light sources can be corrected with sufficient accuracy.

The above-mentioned objects of the present invention are achieved by a light source unit comprising: a plurality of light sources outputting light beams respectively, the plurality of light sources being arranged in proximity to each other; and a divergence-angle changing unit changing an angle of divergence of a light beam output from at least one of the plurality of light sources.

The above-mentioned objects of the present invention are also achieved by a light source unit package including a light source unit, a branch optical element reflecting a light beam, incident to the light source unit, in a predetermined direction, and a photodetector receiving the reflected light beam from the branch optical element, wherein the light source unit, the branch optical element and the photodetector are unified, and the light source unit comprising: a plurality of light sources outputting light beams respectively, the plurality of light sources being arranged in proximity to each other; and a divergence-angle-changing unit changing an angle of divergence of a light beam output from at least one of the plurality of light sources.

The above-mentioned objects of the present invention are also achieved by an optical pickup device which focuses a light beam on a recording surface of a corresponding one of two or more storage media of different types and receives a return light beam from the recording surface, the optical pickup device comprising: a light source unit; an optical system which leads the return light beam to a predetermined light-receiving location and includes an object lens focusing each light beam from the light source unit to the recording surface of the corresponding storage medium; and a photodetector arranged at the light-receiving location, the light source unit comprising: a plurality of light sources outputting light beams respectively, the plurality of light sources being arranged in proximity to each other; and a divergence-angle changing unit changing an angle of divergence of a light beam output from at least one of the plurality of light sources.

The above-mentioned objects of the present invention are also achieved by an optical disk drive which performs recording, reproduction and erasing of information with a corresponding one of two or more optical disks of different types, the optical disk drive including: an optical pickup device and a reproduction signal processing unit performing reproduction of information based on a signal output by the optical pickup device, the optical pickup device focusing a light beam on a recording surface of the corresponding optical disk and receiving a return light beam from the recording surface, the optical pickup device comprising: a light source unit; an optical system which leads the return light beam to a predetermined light-receiving location and includes an object lens focusing each light beam from the light source unit to the recording surface of the corresponding storage medium; and a photodetector arranged at the light-receiving location, the light source unit comprising: a plurality of light sources outputting light beams respectively, the plurality of light sources being arranged in proximity to each other; and a divergence-angle changing unit changing an angle of divergence of a light beam output from at least one of the plurality of light sources.

According to the light source unit of the present invention, the angle of divergence of the light beam output from at least one of the plurality of light sources is changed by the changing unit. For example, when the angle of divergence of the light beam output from the light source has shifted from a desired angle of divergence, it can be adjusted to the desired angle of divergence by the changing unit. Therefore, it is possible to optimize the respective intensity distributions of the light beams output from the light sources.

Since the light source unit, the branch optical element, and the photodetector are unified, while acting as the outgoing light beam by which the intensity distribution is optimized according to the light source unit package of the present invention, without causing enlargement and high cost, it is possible to be stably receive the return light beam from the outside.

By arranging each light source corresponding to the positional relation between the first lens portion and the second lens portion for use in the light source unit in which the two light sources are arranged in proximity to each other according to the optical element of the present invention, the angle of divergence of the light beam which acts as the outgoing light beam from one light source can be changed in the first lens portion, and the angle of divergence of the light beam which acted as the outgoing light beam from the other light source can be changed in the second lens portion.

Since the first lens portion and the second lens portion are unified, even if the assembly process and the adjustment process are simplified, it is possible to change with sufficient accuracy the angle of divergence of the light beam output from each light source.

Since the respective intensity distributions of the light beams output from the plurality of light sources can be optimized by using the light source unit of the present invention, the optical pickup device of the present invention makes it possible to respond to two or more kinds of optical disks, and makes it possible to form the optimal light spot on the recording surface of each optical disk.

According to the optical disk drive of the present invention, it is possible to form the optimal light spot on the recording surface of each of the two kinds of optical disks by using the optical pickup device of the present invention. Therefore, the optical disk drive of the present invention responds to each of the two kinds of optical disks, and it is possible to stably carry out the high-speed access to each optical disk.

BRIEF DESCRIPTION OF THE DRAWINGS

Other objects, features and advantages of the present invention will be apparent from the following detailed description when read in conjunction with the accompanying drawings.

FIG. 30 is a diagram showing the detection control device in the optical pickup device of the preferred embodiment.

FIG. 47 is a block diagram of the optical disk drive in another preferred embodiment of the present invention.

FIG. 53 is a block diagram of the optical disk drive in another preferred embodiment of the present invention.

FIG. 57A and FIG. 57B are diagrams showing variations of the optical module.

FIG. 58 is a diagram showing a variation of the optical module including three light sources.

DETAILED DESCRIPTION OF PREFERRED EMBODIMENTS

A description will now be provided of the preferred embodiments of the present invention with reference to the accompanying drawings.

Figure 1:
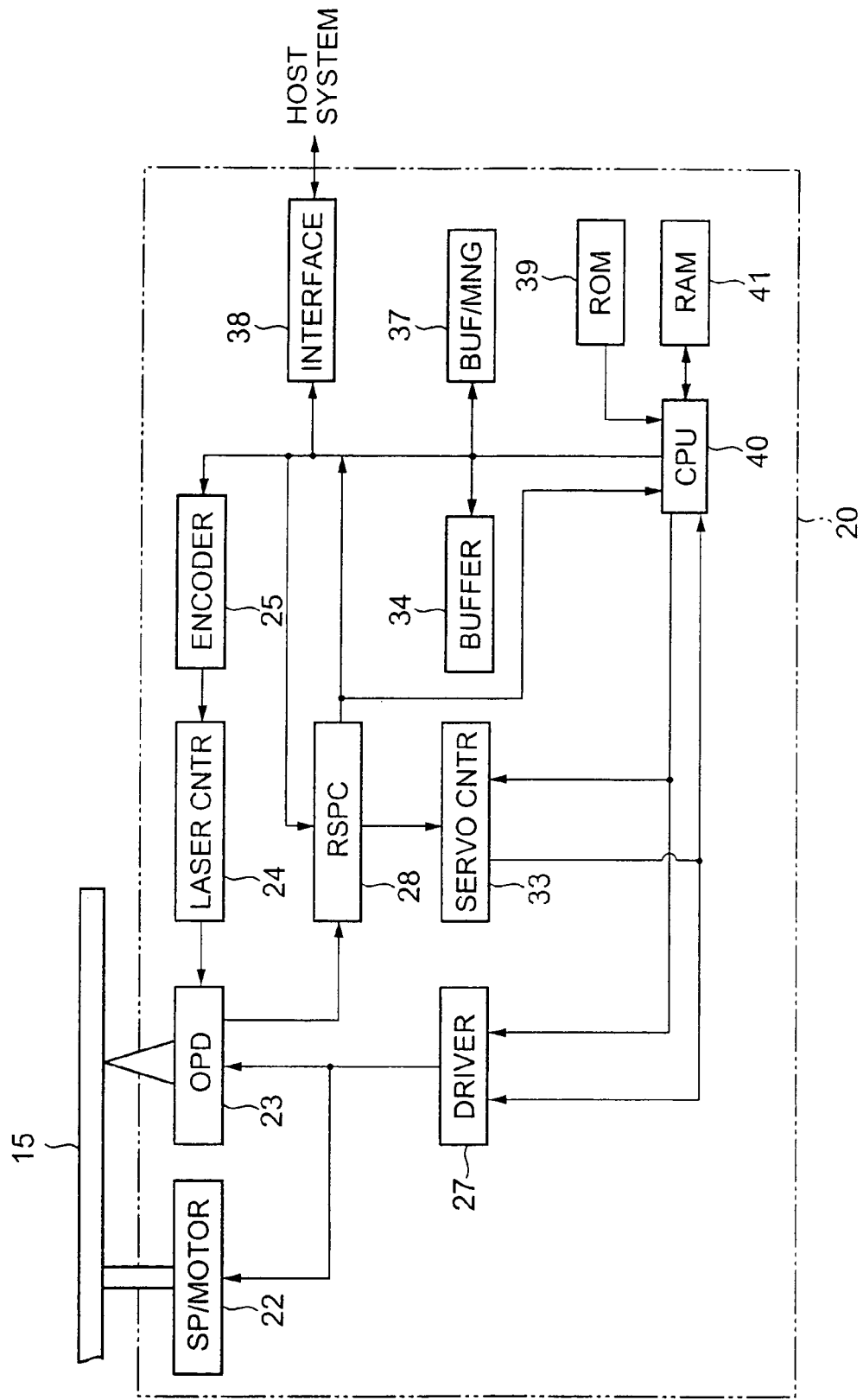
FIG. 1 is a block diagram of the optical disk drive in one preferred embodiment of the present invention.

FIG. 1 shows the composition of an optical disk drive 20 in one preferred embodiment of the present invention in which the optical pickup device of the present invention is included.

The optical disk drive 20 shown in FIG. 1 comprises a spindle motor (SP/MOTOR) 22 for carrying out a rotation drive of the optical disk 15, an optical pickup device (OPD) 23, a laser control circuit (LASER CNTR) 24, an encoder (ENCODER) 25, a motor driver (DRIVER) 27, a reproduction signal processing circuit (RSPC) 28, a servo controller (SERVO CNTR) 33, a buffer RAM (BUFFER) 34, a buffer manager (BUF/MNG) 37, an interface (INTERFACE) 38, a ROM 39, a CPU 40, and a RAM 41.

The optical pickup device 23 is provided for receiving the return light from the recording surface of the optical disk 15, and for emitting laser light to the recording surface of the optical disk 15 in which the tracks in the spiral or concentric formation are formed.

Referring to FIG. 1, the reproduction signal processing circuit 28 converts into an electrical voltage signal the current signal which is the output signal of the optical pickup device 23, and detects the wobble signal, the reproduction signal and the servo signal (the focal error signal, the track error signal) based on the voltage signal.

In the reproduction signal processing circuit 28, the address information, the synchronizing signal, etc. are extracted from the wobble signal.

The extracted address information is outputted to the CPU 40, and the synchronizing signal is outputted to the encoder 25.

After the reproduction signal processing circuit 28 performs error-correction processing to the reproduction signal, it is stored in the buffer RAM 34 through the buffer manager 37.

The servo signal is outputted to the servo controller 33 from the reproduction signal processing circuit 28.

The servo controller 33 generates the control signal which controls the optical pickup device 23 based on the servo signal, and outputs it to the motor driver 27.

The buffer manager 37 notifies to the CPU 40 when the I/O of the data to the buffer RAM 34 is managed and the accumulated amount of data becomes the predetermined value.

The motor driver 27 controls the optical pickup device 23 and the spindle motor 22 based on the directions of the control signals from the servo controller 33 and the CPU 40.

The encoder 25 takes out the data accumulated at the buffer RAM 34 through the buffer manager 37 based on directions of the CPU 40, adds the error correction code, and creates the write-in data to the optical disk 15.

The encoder 25 outputs write-in data to the laser control circuit 24 synchronizing with the synchronizing signal from the reproduction signal processing circuit 28 based on the directions from the CPU 40.

The laser control circuit 24 controls the laser light output from the optical pickup device 23 based on the write-in data from the encoder 25.

The laser control circuit 24 controls one side of the two light sources of the optical pickup device 23 later mentioned based on directions of the CPU 40.

The interface 38 is the bi-directional communication interface with the host system (for example, personal computer), and is based on the standard interfaces, such as ATAPI (AT Attachment Packet Interface) and SCSI (Small Computer System Interface).

The program described in code decipherable by the CPU 40 is stored in the ROM 39.

The CPU 40 temporarily stores data required for control etc. in the RAM 41 while controlling operation of each part of the above according to the above-mentioned program stored in the ROM 39.

Next, the composition of the optical pickup device 23 will be described with reference to FIG. 2 and FIG. 3.

Figure 2:
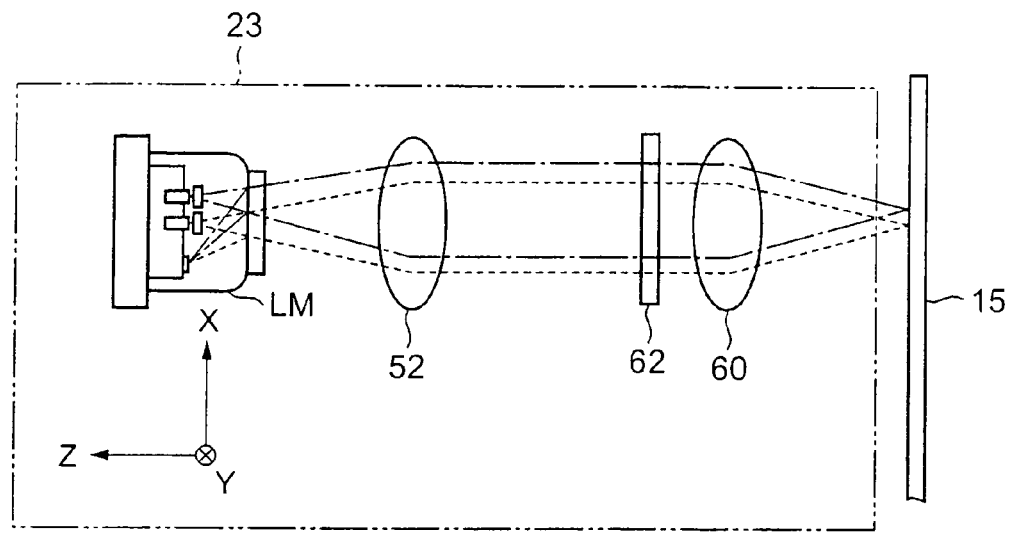
FIG. 2 is a diagram showing the composition of the optical system in the optical pickup device of FIG. 1.

The optical pickup device 23 outputs the laser light whose wavelength is 650 nm or the laser light whose wavelength is 780 nm alternatively, as shown in FIG. 2.

The optical pickup device 23 contains the optical module LM, the coupling lens 52, the quarter-wave plate 62, the object lens 60, and the drive system (the focusing actuator, the tracking actuator, and the seeking motor) as a light source unit package which receives the return light beam from the recording surface of the optical disk 15.

Figure 3:
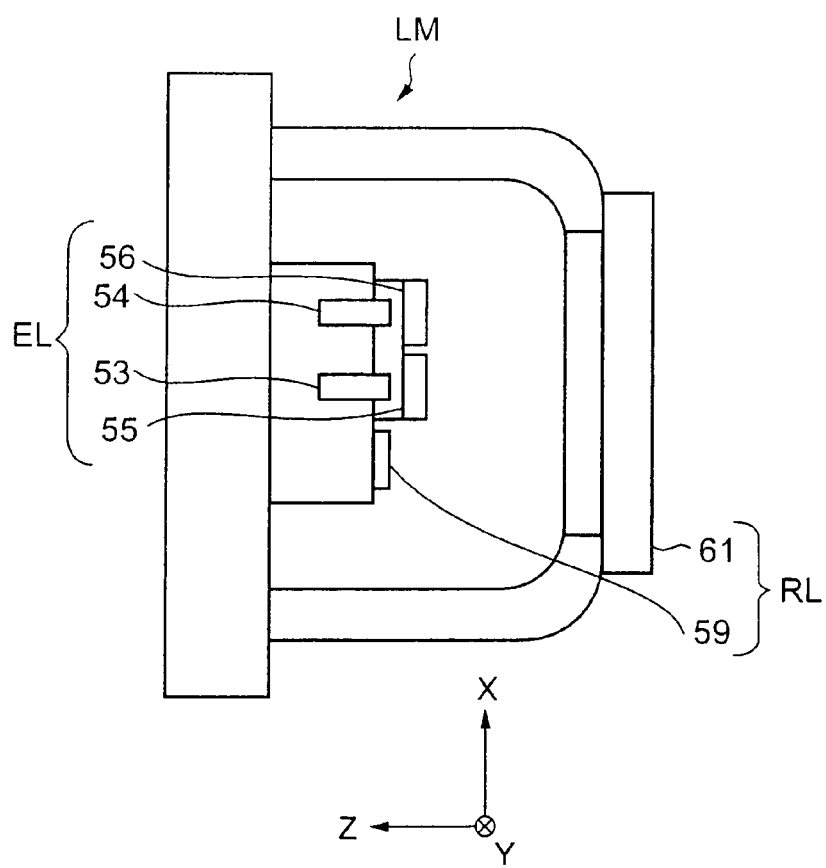
FIG. 3 is a diagram showing the composition of the optical module of FIG. 2.

The optical module LM contains the light-emission portion EL and the light-receiving portion RL as a light source unit, as shown in FIG. 3.

The light-emission portion EL contains the first optical element 55 which changes the angle of divergence of the light beam output from the first semiconductor laser 53 which outputs the laser light the wavelength of which is 650 nm, the second semiconductor laser 54 which outputs the laser light the wavelength of which is 780 nm, and the first semiconductor laser 53, and the second optical element 56 which changes the angle of divergence of the light beam output from the second semiconductor laser 54.

The light-receiving portion RL comprises the light-receiving component 59 as a photodetector which receives the light beam which branched by the polarization hologram 61 and the polarization hologram 61 as a branch optical element which branch the received light from the recording surface of the optical disk 15.

The first semiconductor laser 53 is chosen when the optical disk 15 is DVD, and the second semiconductor laser 54 is chosen when the optical disk 15 is CD.

Figure 4:
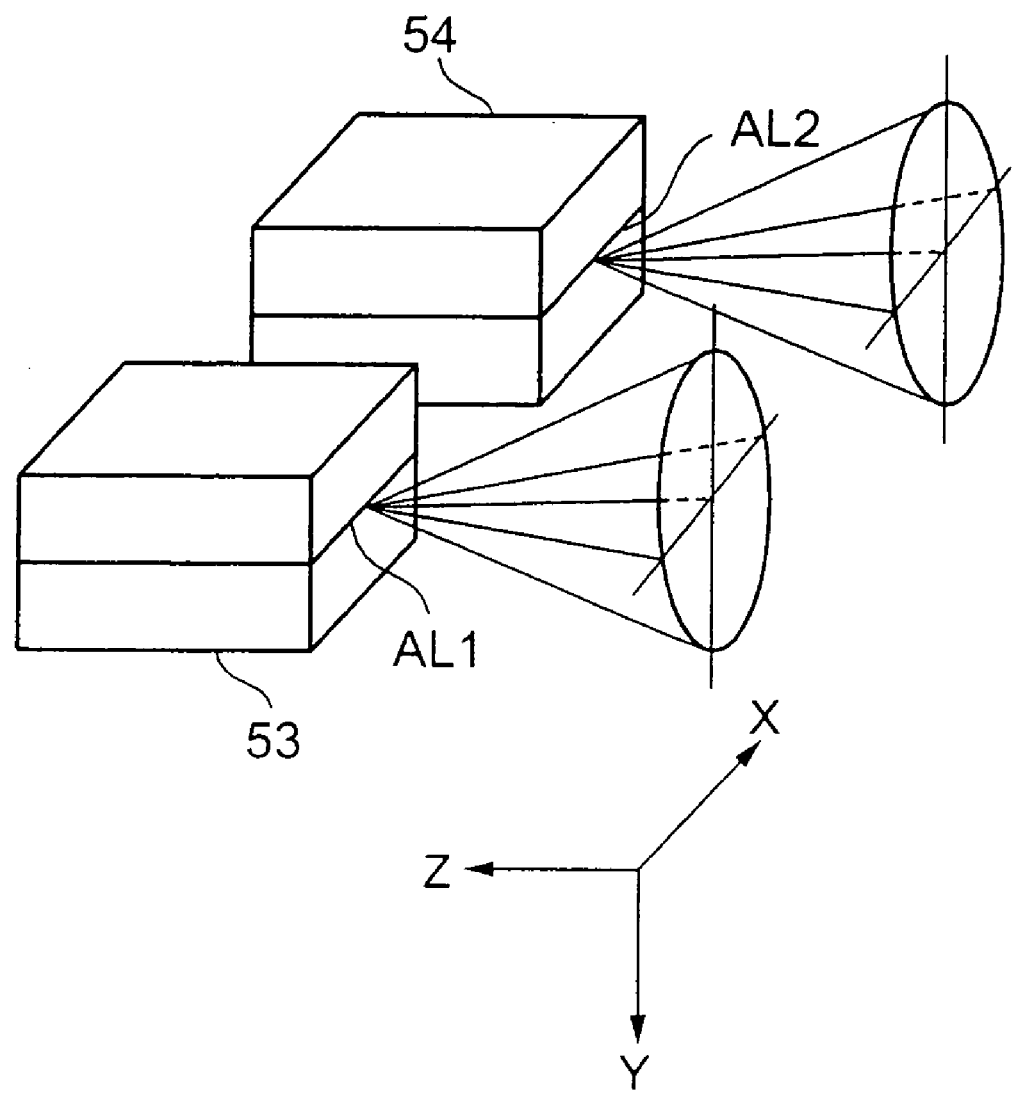
FIG. 4 is a diagram for explaining the configuration of the light beam output from each of the semiconductor lasers.

In this preferred embodiment, as shown in FIG. 4, the first semiconductor laser 53 and the second semiconductor laser 54 are arranged so that the activation layers AL1 and AL2 may become parallel to XZ plane.

Therefore, the light beam output from each semiconductor laser is divergence light with the intensity distribution of the ellipse form which makes Y-axis direction the direction of the transverse.

Figure 5A:
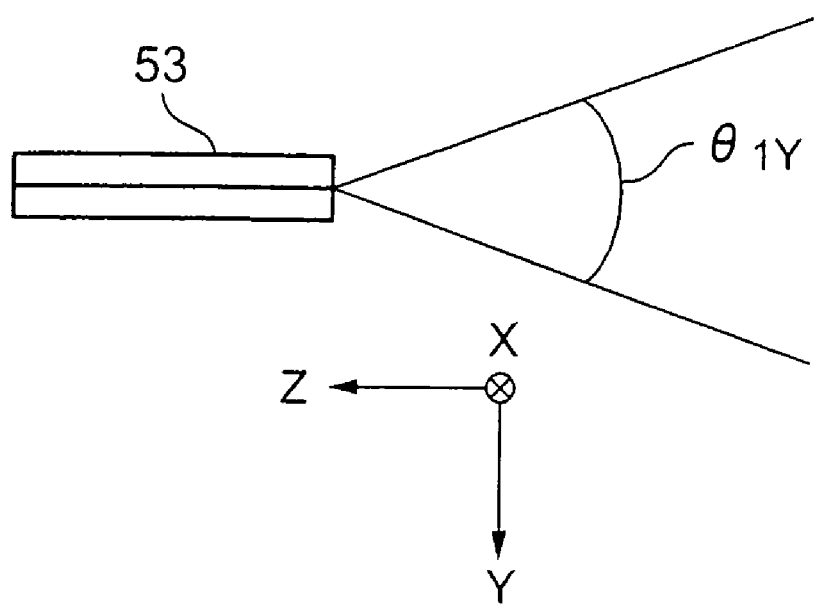
FIG. 5A and FIG. 5B are diagrams for explaining the angle of divergence of the light beam output from the first semiconductor laser.
Figure 5B:
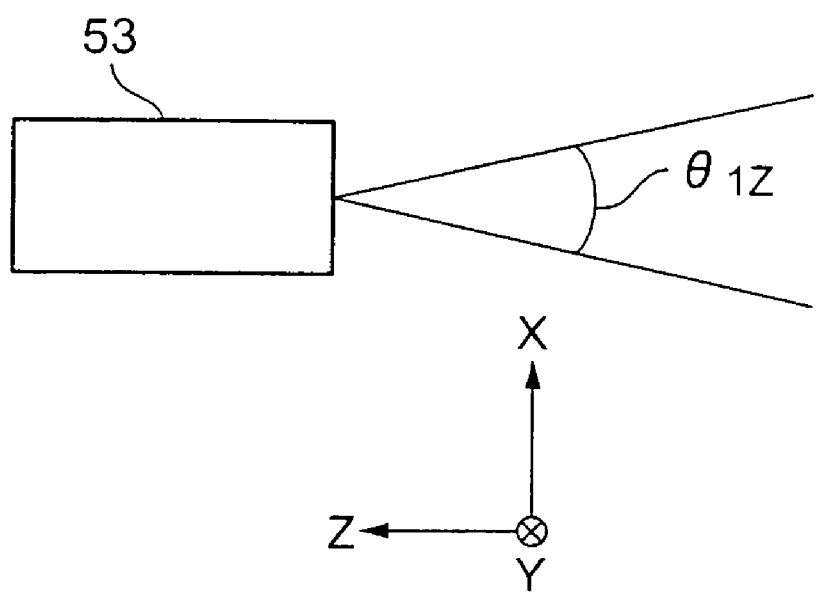

The light beam of angle-of-divergence θ1Y in YZ plane and angle-of-divergence θ1Z in XZ plane output from the first semiconductor laser 53 has the relation of θ1Y>θ1Z, rather than is the same, as shown in FIG. 5A and FIG. 5B.

Similarly, the light beam of the angle of divergence (referred to as θ2Y) in YZ plane and the angle of divergence (referred to as θ2Z) in XZ plane output from the second semiconductor laser 54 also has the relation of θ2Y>θ2Z, rather than is the same.

In this preferred embodiment, to the light beam output from the first semiconductor laser 53, the angle of divergence is changed using the first optical element 55 so that RIM may become about 30% (optical efficiency=about 45%), and to the light beam taken out from the second semiconductor laser 54, the angle of divergence is changed using the second optical element 56 so that RIM may become about 15% (optical efficiency=about 50%).

Figure 6A:
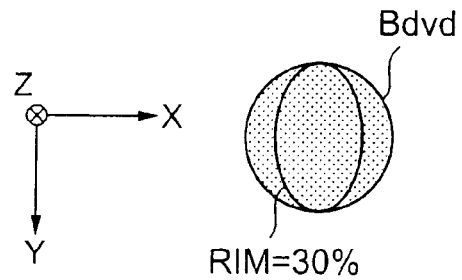
FIG. 6A is a diagram for explaining the rim intensity of the light beam output from the first semiconductor laser and received by the object lens when the angle of divergence is not changed.

The light beam Bdvd received by the object lens 60 among the light beams output from the first semiconductor laser 53 when there is no first optical element 55, as shown in FIG. 6A, and it is RIM=30% about the Y axis direction and it is RIM<30% about the X axis direction.

Figure 6B:
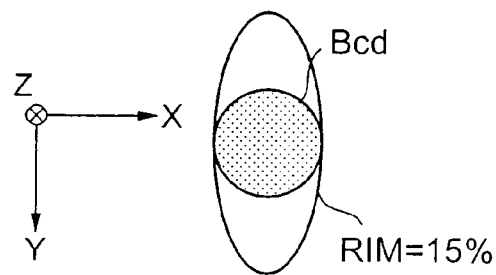
FIG. 6B is a diagram for explaining the rim intensity of the light beam output from the second semiconductor laser and received by the object lens when the angle of divergence is not changed.

Moreover, the light beam Bcd incorporated by the object lens 60 among the light beams which are output from the second semiconductor laser 54 when there is no second optical element 56, as shown in FIG. 6B, and it is RIM=15% about the X axis direction, and it is RIM>15% about the Y axis direction.

Figure 7:
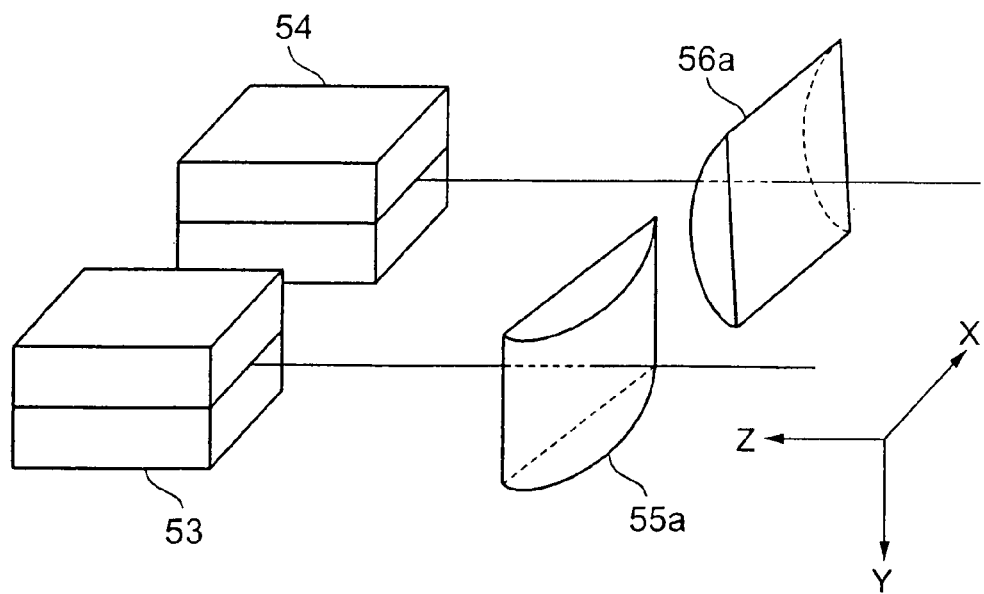
FIG. 7 is a diagram for explaining an example in which the cylindrical lens is used as the optical element.

In order to double the angle of divergence θ1Z within XZ plane of the light beam output from the first semiconductor laser 53 (θ1Y/θ1Z) (>1) and to change the angle of divergence, as shown in FIG. 7, the cylindrical lens (the first cylindrical lens) is used as the first optical element 55.

A description of the first cylindrical-lens 55a (this cylindrical lens) will now be given.

The first cylindrical-lens 55a is arranged on the optical path length of the light beam output from the first semiconductor laser 53 so that the cylinder axis orientation may be in agreement with Y-axis direction.

Figure 8A:
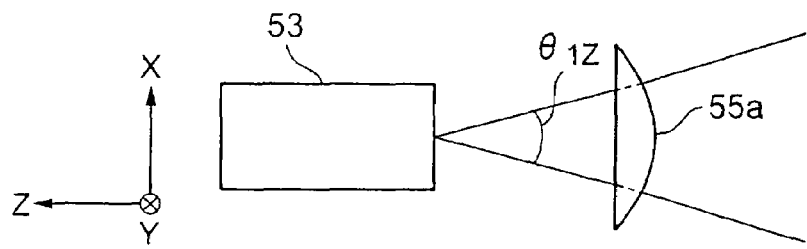
FIG. 8A is a diagram for explaining an example in which the angle of divergence of the light beam output from the first semiconductor laser is enlarged using the cylindrical lens.

As shown in FIG. 8A, the angle of divergence of the light beam through first cylindrical-lens 55a becomes larger than angle-of-divergence θ1Z within XZ plane of the light beam output from the first semiconductor laser 53, and becomes almost equal to angle-of-divergence θ1Y within YZ plane.

The light beam received by the object lens 60 becomes RIM=30% mostly also about X-axis direction.

Moreover, in order to double angle-of-divergence θ2Y within YZ plane of the light beam output from the second semiconductor laser 54 (θ2Z/θ2Y) (<1) and to change the angle of divergence, as shown in FIG. 7, the cylindrical lens (the second cylindrical lens) is used as the second optical element 56.

A description of the second cylindrical-lens 56a (this cylindrical lens) will now be given.

The second cylindrical-lens 56a is arranged on the optical path length of the light beam output from the second semiconductor laser 54 so that the cylinder axis orientation may be in agreement with X axis direction.

Figure 8B:
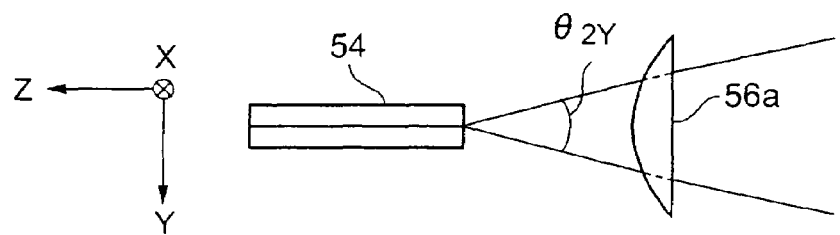
FIG. 8B is a diagram for explaining an example in which the angle of divergence of the light beam output from the second semiconductor laser is reduced using the cylindrical lens.

As shown in FIG. 8B, the angle of divergence of the light beam through second cylindrical-lens 56a becomes smaller than angle-of-divergence θ2Y within YZ plane of the light beam output from the second semiconductor laser 54, and becomes almost equal to angle-of-divergence θ2Z within XZ plane.

The light beam incorporated by the object lens 60 becomes RIM=15% mostly also about Y-axis direction.

To the polarization direction (for example, P polarization) of the light beam output from each semiconductor laser, the polarization hologram 61 has the low diffraction efficiency, and it is set up so that the diffraction efficiency may become high to the polarization direction (for example, S polarization) of the return light beam.

Therefore, in the polarization hologram 61, about 95% of the light beam which came out of each semiconductor laser and is put is penetrated, and about 35% of the return light beam diffracts The photodetector 59 contains two or more light-receiving components which output the optimal signal for detecting the wobble signal, the reproduction signal, the servo signal, etc.

The action of the above-mentioned optical pickup device 23 is explained.

First, the case where the optical disk 15 is DVD will be explained.

The angle of divergence in XZ plane is expanded in first cylindrical-lens 55a, and the light beam of the linear polarization (for example, P polarization) output from the first semiconductor laser 53 is incident to the polarization hologram 61.

After most light beams incident to the polarization hologram 61 penetrate the polarization hologram 61 and it serves as parallel light with the coupling lens 52, it is made into the circularly polarized light with the quarter-wave plate 62, and is focused on the recording surface of the optical disk 15 as a minute spot through the object lens 60.

With the outward trip, the received light (return light beam) reflected in respect of record of the optical disk 15 turns into the circularly polarized light of the circumference of the contrary, is again made into parallel light with the object lens 60, and let it be the linear polarization (for example, S polarization) which intersected perpendicularly with the outward trip with the quarter-wave plate 62.

The light beam through the collimator lens 52 is incident to the polarization hologram 61.

The return light beam which carried out incidence to the polarization hologram 61 is diffracted, and is received by the photodetector 59.

With each light-receiving component which constitutes the photodetector 59, the current signal according to the amount of the received light is outputted to the reproduction signal processing circuit 28, respectively.

Next, the case where the optical disk 15 is CD will be explained.

The angle of divergence in YZ plane is reduced in second cylindrical-lens 56a, and the light beam of the linear polarization (for example, P polarization) output from the second semiconductor laser 54 is incident to the polarization hologram 61.

After each light beam through the polarization hologram 61 is converted into the parallel light beam by the coupling lens 52, it is converted into the circularly polarized light with the quarter-wave plate 62, and is focused on the recording surface of the optical disk 15 as a minute light spot through the object lens 60.

With the outward trip, the received light (return light beam) reflected in respect of record of the optical disk 15 turns into the circularly polarized light of the circumference of the contrary, is again made into parallel light with the object lens 60, and let it be the linear polarization (for example, S polarization) which intersected perpendicularly with the outward trip with the quarter-wave plate 62.

The light beam through the collimator lens 52 is incident to the polarization hologram 61.

The return light beam incident to the polarization hologram 61 is diffracted, and is received by the photodetector 59.

With each light-receiving component which constitutes the photodetector 59, the current signal according to the amount of the received light is outputted to the reproduction signal processing circuit 28, respectively.

It can be distinguished from the intensity of the received light from the recording surface whether the optical disk 15 is CD or DVD.

Usually, this distinction is performed at the time of loading, when the optical disk 15 is intercalated in the predetermined location of the optical disk drive 20.

It is also possible to distinguish the kind of optical disk 15 based on TOC (Table Of Contents) information, PMA (Program Memory Area) information, the wobble signal, etc. which are beforehand recorded on the optical disk 15.

The distinction result is notified to the laser control circuit 24, and either the first semiconductor laser 53 and the second semiconductor laser 54 are chosen by the laser control circuit 24.

Next, processing operation in the case of recording data on the optical disk 15 is briefly explained using the optical disk drive 20.

In addition, selection of the semiconductor laser shall be carried out as described above, and shall already have been performed.

The CPU 40 notifies the information that the record request is received from the host system to the reproduction signal processing circuit 28 while outputting the control signal for controlling rotation of the spindle motor 22 based on the record rate to the motor driver 27, if the record request is received from the host system.

If rotation of the optical disk 15 reaches the predetermined linear velocity, in the reproduction signal processing circuit 28, address information will be acquired based on the output signal from the optical pickup device 23, and it will notify to the CPU 40.

Based on the output signal from the optical pickup device 23, the reproduction signal processing circuit 28 detects the track error signal and the focal error signal, and outputs them to the servo controller 33.

The servo controller 33 drives the tracking actuator and the focusing actuator of the optical pickup device 23 through the motor driver 27 based on the track error signal and the focus error signal from the reproduction signal processing circuit 28.

That is, the tracking error and the focusing error are corrected.

The CPU 40 accumulates the data from the host system to the buffer RAM 34 through the buffer manager 37.

If the amount of data accumulated at the buffer RAM 34 exceeds the predetermined value, the buffer manager 37 will notify to the CPU 40.

The CPU 40 outputs the specified signal which directs the seeking operation of the optical pickup 23 that it writes in and the optical pickup 23 is located in the start point to the motor driver 27 based on the address information from the reproduction signal processing circuit 28 while it is written in the encoder 25 and directs creation of data, if the notice from the buffer manager 37 is received.

If the CPU 40 determines that the location of the optical pickup device 23 writes in and it is the start point based on the address information from the reproduction signal processing circuit 28, it will be notified to the encoder 25.

The encoder 25 records write-in data on the optical disk 15 through the laser control circuit 24 and the optical pickup device 23.

Next, processing operation in the case of reproducing the data currently recorded on the optical disk 15 using the optical disk drive 20 mentioned above is explained.

Selection of the semiconductor laser shall be carried out as described above, and shall already have been performed.

The CPU 40 will output the control signal for controlling rotation of the spindle motor 22 based on the reproduction rate to the motor driver 27, if the reproduction request is received from the host system.

The CPU 40 notifies the purport that the reproduction request is received from the host to the reproduction signal processing circuit 28.

If rotation of the optical disk 15 reaches the predetermined linear velocity, the reproduction signal processing circuit 28 will acquire address information based on the output signal from the optical pickup device 23, and will notify it to the CPU 40.

The tracking error and the focusing error are corrected similar to the previous embodiment mentioned above.

The CPU 40 outputs the specified signal which direct the seeking operation that it reads and the optical pickup device 23 is located in the start point to the motor driver 27 based on the address information from the reproduction signal processing circuit 28.

If the CPU 40 determines it whether it is the reading start point to check, and for the location of the optical pickup device 23 to read, and to be the start point based on the address information from the reproduction signal processing circuit 28, it will be notified to the reproduction signal processing circuit 28.

After the reproduction signal processing circuit 28 detects the reproduction signal from the output signal of the optical pickup device 23 and performs error-correction processing etc., it is accumulated to the buffer RAM 34.

The buffer manager 37 transmits to the host through the interface 38, when the data accumulated at the buffer RAM 34 are assembled as sector data.

As mentioned above, the reproduction signal processing circuit 28 detects the focal error signal and the track error signal based on the output signal from the optical pickup device 23, and corrects the focusing error and the tracking error at any time through the servo controller 33 and the motor driver 27, until the recording processing and the regeneration are completed.

The optical disk drive of this preferred embodiment realizes processing according to the reproduction signal processing circuit 28 and the program performed by the CPU 40 and the CPU 40 so that clearly from the above explanation.

However, the present invention is not limited to this preferred embodiment.

That is, it is possible to constitute a part of the composition of that processing according to the program by the CPU 40 realizes by the hardware. Or it is possible to constitute all the composition by hardware.

As explained above, according to the light source unit of this preferred embodiment, the angle-of-divergence θ1Z within XZ plane of the light beam output from the first semiconductor laser 53 is changed twice (θ1Y/θ1Z) (>1) by the first cylindrical-lens 55a.

For example, if the light source unit of this preferred embodiment is used for the optical pickup device which can respond to both DVD and CD, the light beam incorporated by the object lens 60 among the light beams which are output from the first semiconductor laser 53 will become RIM=30% mostly also about X axis direction.

Therefore, it becomes possible to form the optimal optical spot for DVD in the recording surface.

Moreover, according to the light source unit of this preferred embodiment, the angle-of-divergence θ2Y within YZ plane of the light beam output from the second semiconductor laser 54 is changed twice (θ2Z/θ2Y) (<1) by the second cylindrical-lens 56a.

For example, if the light source unit of this preferred embodiment is used for the optical pickup device which can respond to both DVD and CD, the light beam incorporated by the object lens 60 among the light beams which are output from the second semiconductor laser 54 will become RIM=15% mostly also about Y axis direction.

Therefore, most light beams which are output from the second semiconductor laser 54 will be incorporated by the object lens 60, and it becomes possible to raise optical efficiency of it.

It becomes possible to form the optimal optical spot for CD in the recording surface, and can respond to improvement in the speed of the access rate.

Furthermore, according to the light source unit of this preferred embodiment, the semiconductor laser 53 and 54 and the optical elements 55 and 56 are contained and unified in the same housing.

For example, if the light source unit of this preferred embodiment is used for the optical pickup device, the miniaturization of the optical pickup device can be promoted.

Moreover, since each semiconductor laser and each optical element are positioned with accuracy sufficient in the case of the unification, respectively, they can simplify the attachment process and the adjustment process.

That is, work cost is reduced and it becomes possible to promote low cost.

According to the light source unit package of this preferred embodiment, the photodetector 59 and the polarization hologram 61 are united with the light-emission portion EL.

For example, if the light source unit package of this preferred embodiment is used for the optical pickup device, the miniaturization of the optical pickup device can be promoted.

Moreover, since the photodetector 59 and the polarization hologram 61 are positioned with accuracy sufficient in the case of the unification, they can simplify the attachment process and the adjustment process.

That is, work cost is reduced and it becomes possible to promote low cost.

According to the light source unit package of this preferred embodiment, as a branch optical element, the diffraction efficiency is low to the polarization direction of the light beam output from each semiconductor laser, and the polarization hologram 61 set up so that the diffraction efficiency might become high to the polarization direction of the return light beam is used.

For example, if the light source unit package of this preferred embodiment is used for the optical pickup device, incidence of the light beam output from each semiconductor laser will be carried out to the coupling lens 52, without the quantity of light almost falling.

Therefore, high-speed access to the optical disk 15 is attained.

Moreover, since the amount of the received light in the photodetector 59 increases, the signal level and the S/N ratio of the signal which are outputted from each light-receiving component which constitutes the photodetector 59 can be raised.

Since the light beam by which incidence is carried out to the coupling lens 52 has the optimal optical intensity distribution for the wave length according to the optical pickup device of this preferred embodiment, the light beam incorporated by the object lens 60 can secure the optimal RIM for the wave length.

Therefore, without causing enlargement and high cost, it can respond to two or more kinds of information storage mediums, and the optimal optical spot for each information storage medium can be formed in the recording surface.

According to the optical disk drive of this preferred embodiments as for both DVD and CD, the optimal light spot can be formed in the recording surface also to each optical disk (DVD and CD), it can respond to both and it becomes possible to be stably perform the recording and reproduction of information with sufficient accuracy.

By the miniaturization of the optical pickup device 23, the miniaturization of the optical disk drive itself and reduction of the demand can also be promoted.

For example, when used as a portable device, carrying the optical pickup device 23 becomes easy and becomes usable for a long time.

Although this preferred embodiment explained the case where each optical element is arranged individually. It is not limited to only this example. Each optical element may be unified.

Figure 9:
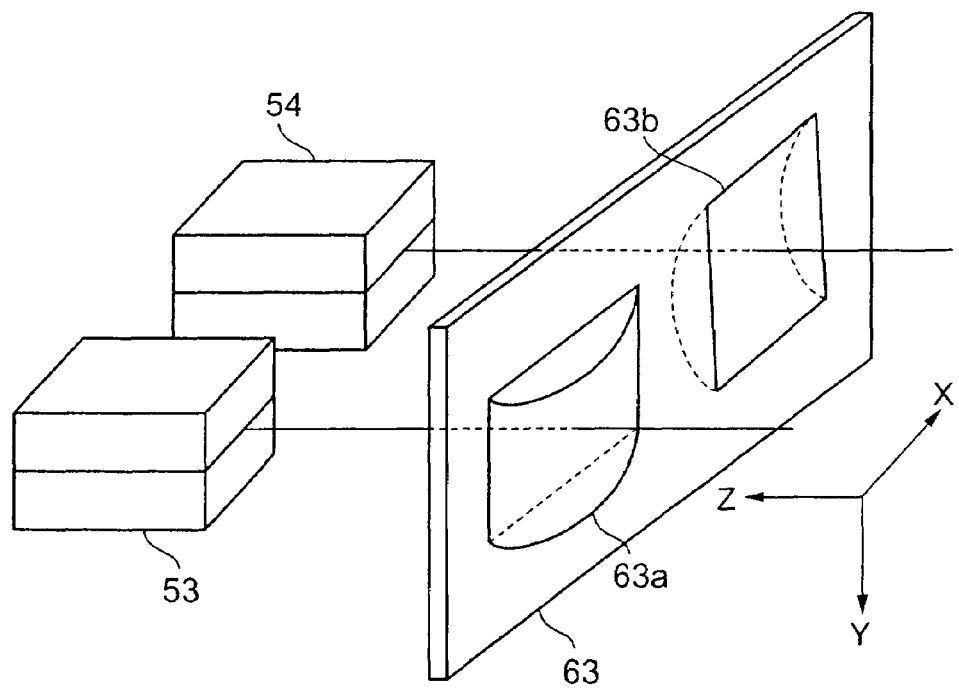
FIG. 9 is a diagram for explaining an example in which two cylindrical lenses are united.

For example, as shown in FIG. 9, it is possible to use the optical element 63 equipped with second lens portion 63b which has the optical function equivalent to first cylindrical-lens 55a, first lens portion 63a which has the equivalent optical function, and the second cylindrical-lens 56a.

That is, it can be considered that this optical element 63 is what unified first cylindrical-lens 55a and second cylindrical-lens 56a.

When performing positioning of first lens portion 63a to the first semiconductor laser 53, the optical element 63 is moved to X axis direction.

Even if the second lens portion 63b moves to X axis direction simultaneously at this time, it is changeless to the optical action of the second lens portion 63b to the light beam output from the second semiconductor laser 54.

Moreover, when performing positioning of second lens portion 63b to the second semiconductor laser 54, the optical element 63 is moved to Y-axis direction.

Even if the first lens portion 63a moves to Y-axis direction simultaneously at this time, it is changeless to the optical action of first lens portion 63a to the light beam output from the first semiconductor laser 53.

Since the direction of positioning to the semiconductor laser in first lens portion 63a and second lens portion 63b lies at right angles mutually, each lens portion can be arranged in the optimal location to each semiconductor laser, without interfering mutually.

Therefore, it becomes possible to simplify the attachment process and the adjustment process.

That is, work cost is reduced and low cost can be promoted. It is possible to add the mark for positioning to the semiconductor laser and the optical element.

It enables it to simplify the attachment process and the adjustment process.

Figure 10:
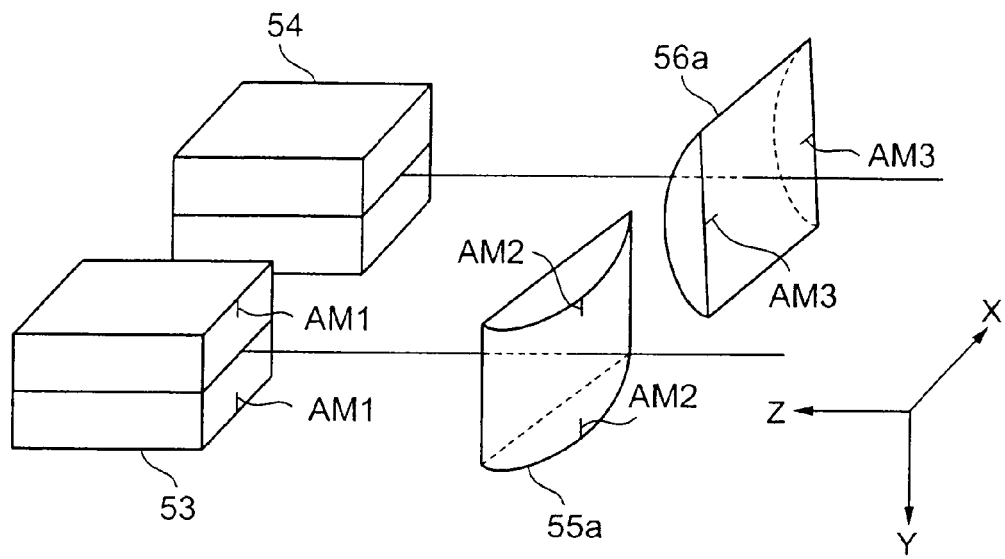
FIG. 10 is a diagram for explaining an example in which a mark for positioning is added to each of the semiconductor laser and the cylindrical lenses.

In the above-mentioned preferred embodiment, in order to carry out positioning to X axis direction to the first semiconductor laser 53, as shown in FIG. 10, as for first cylindrical-lens 55a, it is good to add the mark of the shape of a straight line prolonged in the direction (Y axis direction) which intersects perpendicularly with the activation layer of the first semiconductor laser 53 to the first semiconductor laser 53 and first cylindrical-lens 55a side.

At the attachment process, the location of the first semiconductor laser 53 and first cylindrical-lens 55a can be correctly doubled by making in agreement the mark AM 1 by the side of the first semiconductor laser 53, and the mark AM 2 by the side of first cylindrical-lens 55a.

On the other hand, in order to carry out positioning to Y axis direction to the second semiconductor laser 54 as shown in FIG. 10, it is possible to add the mark to the second cylindrical-lens 56a prolonged in the direction (X axis direction) parallel to the activation layer of the second semiconductor laser 54 to the second cylindrical-lens 56a side.

At the attachment process, the location of the second semiconductor laser 54 and second cylindrical-lens 56a can be correctly doubled by making in agreement the activation layer of the second semiconductor laser 54, and the mark AM 3 by the side of second cylindrical-lens 56a.

Since the thickness of the activation layer in the semiconductor laser is usually about 0.2 micrometers, it can use the activation layer as a mark for positioning.

The mark for positioning is not limited to the straight-line-like mark.

Moreover, it is not limited to the location shown in FIG. 10 also about the location which adds the mark for positioning.

It becomes possible to discriminate the front flesh side of the optical element by the mark for positioning.

If there are the location gap at the time of attaching each semiconductor laser (mounting gap) and the gap of the activation layer in each semiconductor laser, the outgoing direction of the light beam output from each semiconductor laser may not be in agreement.

If the outgoing direction of the light beam output from each semiconductor laser has shifted, since the coupling lens will be commonized, the light beam output from one of the semiconductor laser causes the optical-axis gap to the optical axis of the object lens.

Figure 11A:
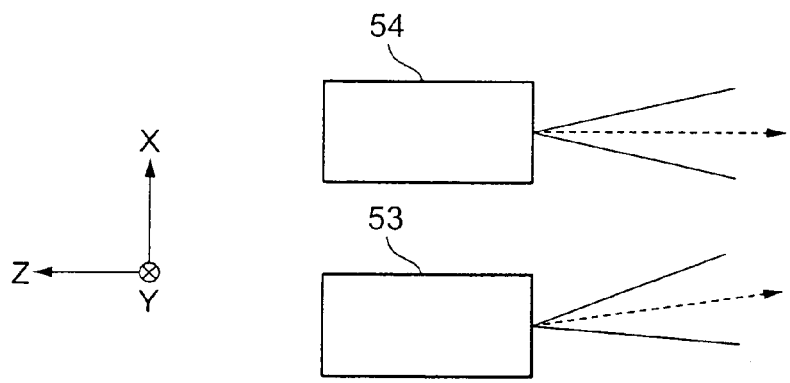
FIG. 11A and FIG. 11B are diagrams for explaining an example in which the outgoing direction of the light beam with the maximum intensity is changed by the optical element.
Figure 11B:
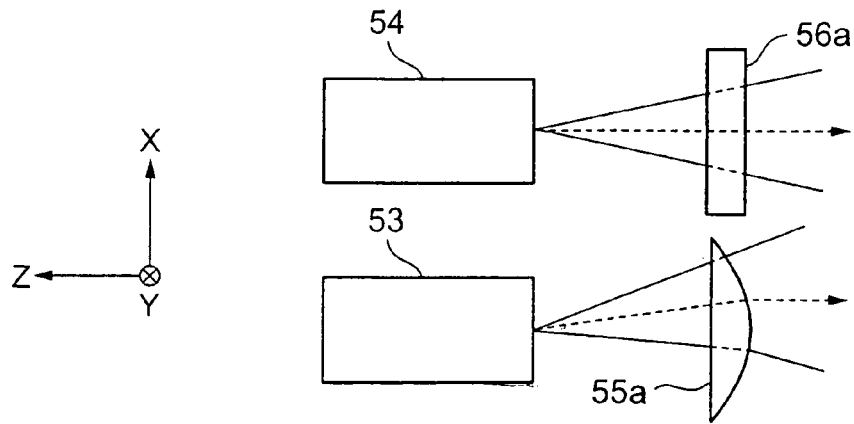

For example, as shown in FIG. 11B as shown in FIG. 11A, when the outgoing direction of the light beam output from the first semiconductor laser 53 is not in agreement with Z axis direction in XZ plane in the above-mentioned preferred embodiment By shifting the location about X axis direction of first cylindrical-lens 55a, the outgoing direction of the light beam through the first cylindrical-lens 55a can be made mostly in agreement with Z-axis direction.

This becomes possible to reduce the optical-axis gap to the optical axis of the object lens 60.

Next, the arrangement location of the optical elements 55 and 56 is considered.

The light-emission point of the first semiconductor laser 53 emitting light and the light-emission point of the second semiconductor laser 54 are arranged in close proximity about the X-axis direction.

Figure 12A:
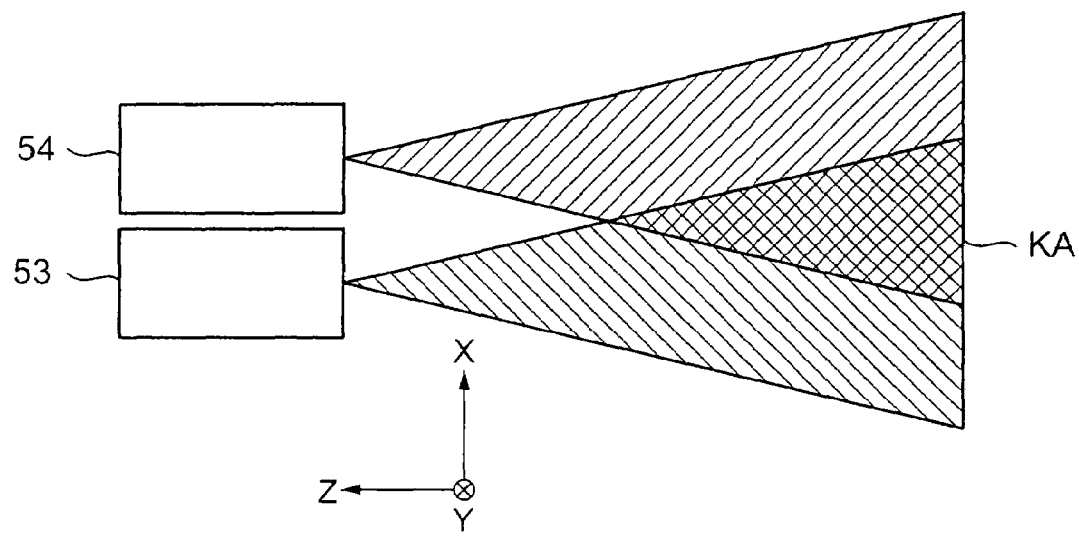
FIG. 12A and FIG. 12B are diagrams for explaining the overlapping range of the light beam output from the first semiconductor laser and the light beam output from the second semiconductor laser.

As shown in FIG. 12A, the range (interaction region) KA with which the range through which the light beam output from the first semiconductor laser 53 passes, and the range through which the light beam output from the second semiconductor laser 54 passes lap exists near the point of each semiconductor laser emitting light.

Figure 12B:
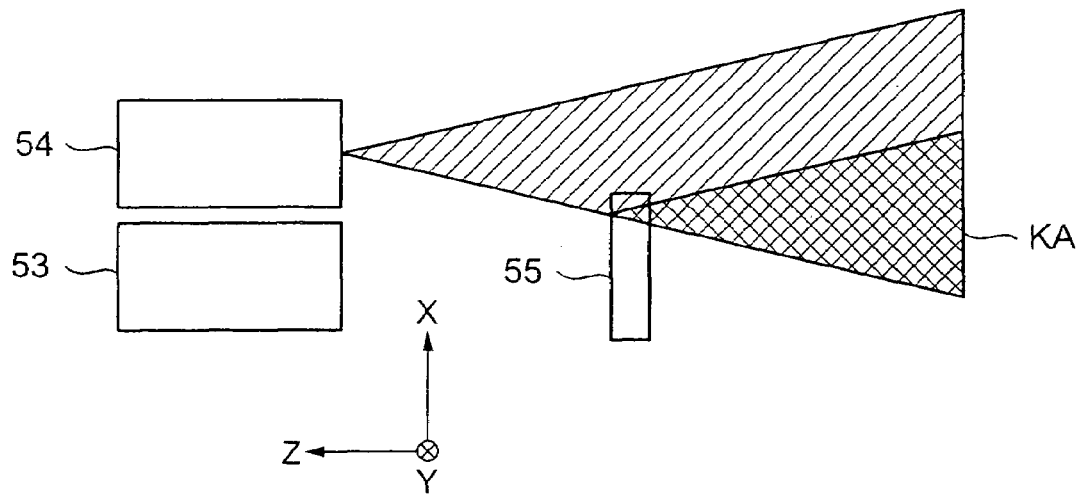

For example, if the first optical element 55 is arranged in the location including the interaction region KA as shown in FIG. 12B, the periphery portion of the light beam which came out of the second semiconductor laser 54, and is put will pass the first optical element 55.

Un-arranging, such as decline in optical efficiency, aggravation of aberration, and generating of the stray light, may arise.

In order to make it the light beam output from the semiconductor laser other than the corresponding semiconductor laser not pass, as for each optical element, arranging to the semiconductor laser side is more desirable than the interaction region KA respectively.

Figure 13:
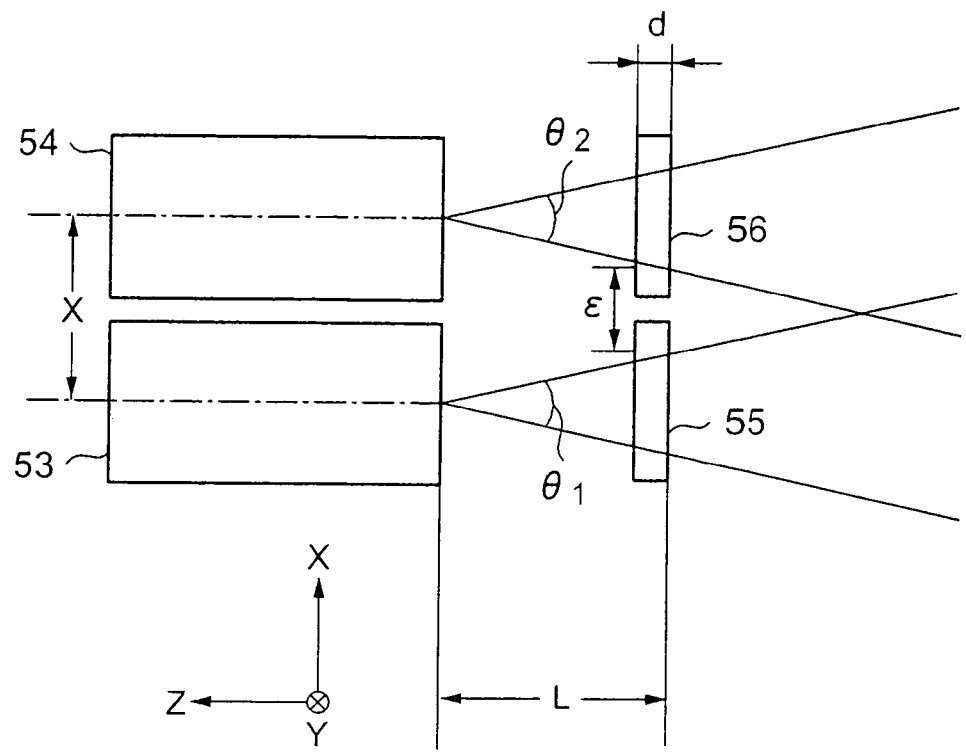
FIG. 13 is a diagram for explaining the arrangement of the optimal location of the optical element.

As shown in FIG. 13, the distance z from the light-emission point of the light source to an outgoing plane of the optical element in the Z-axis direction of XYZ orthogonal coordinate system with XY plane being the outgoing plane meets requirement conditions:

$$d \leq z \leq (x-\epsilon)/\{\tan(\theta 1/2)+\tan(\theta 2/2)\}$$

where x indicates a distance in the X axis direction between the light-emission point of the light source 53 and the light-emission point of the adjacent light source 54 in proximity to the light source 53, θ1 indicates an angle of divergence of the first light beam output in the Z axis direction from the light source 53, θ2 indicates an angle of divergence of the second light beam output in the Z axis direction from the adjacent light source 54, d indicates a thickness in the Z axis direction of the optical element 55, and ϵ indicates a width of a region in the x axis direction, the region being interposed between an optical path of the first light beam and an optical path of the second light beam, and neither the first light beam nor the second light beam passing through the region.

The minimum value of the distance z in the Z-axis direction of the light-emission point and the outgoing surface of the optical element 55 will be set to d. Therefore, what is necessary is just to make it the distance z in the Z-axis direction of the light-emission point and the outgoing side of the optical element serve as the value within the limits indicated by the above-mentioned requirement conditions.

Figure 14:
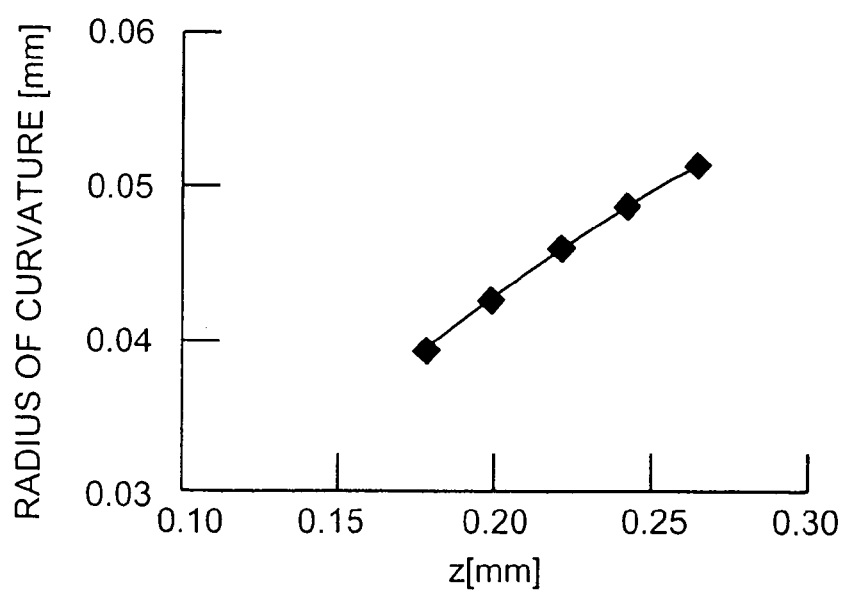
FIG. 14 is a diagram for explaining the relationship between the radius of curvature of the optical element and the distance z when the angle of divergence is doubled.

For example, the optical element which doubles the angle of divergence, the radius of curvature of the optical element becomes large, so that the distance z is large, as the relation between the radius of curvature and the distance z is shown in FIG. 14.

Generally, if the radius of curvature becomes large, processing of the lens becomes easy and can lower the manufacturing cost.

Moreover, while the allowable error in the attachment process becomes large and the dependability after attachment improves, it becomes possible to simplify the adjustment process and work cost can be lowered.

It is desirable to use the optical element which has the greatest radius of curvature within the limits which meet the above conditions as the first optical element 55 and the second optical element 56.

Since the light source unit package is miniaturized, although it is in the inclination which arranges the photodetector in the location close to the semiconductor laser, it is necessary to consider that the quantity of light of the return light beam does not fall.

When the optical element is especially arranged in the front face of the point of the semiconductor laser emitting light, it returns also not only to the effective range of the optical element but to un-effective ranges, and it is necessary to make it the light beam not pass.

Since the permeability of light is not 100% in the un-effective range, either, even if the return light beam passes through the un-effective range, it is for the amount of the received light in the photodetector to fall.

Figure 15:
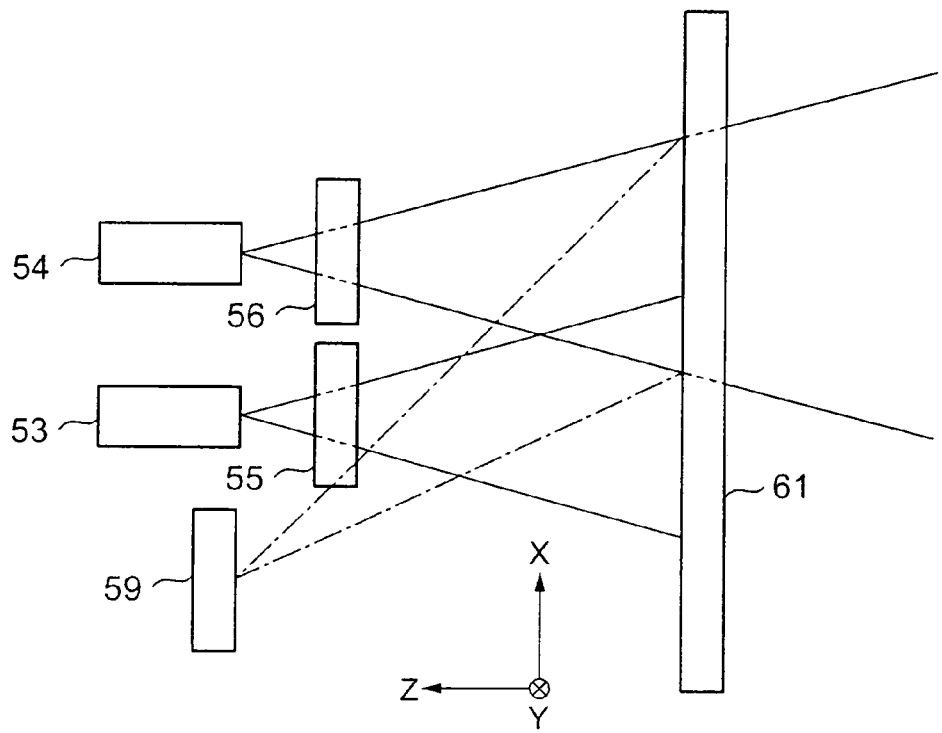
FIG. 15 is a diagram for explaining an example in which the return light beam passes through a part of the optical element.

In the above-mentioned preferred embodiment, as shown in FIG. 15, when it diffracts by the polarization hologram 61, slitting and the hole are made in the un-effective range of the first optical element 55.

It is appropriate to make the return light beam not pass the first optical element 55.

Thus, the light source unit package can be miniaturized, without reducing the amount of the received light in the photodetector 59.

Although the above-mentioned preferred embodiment explained the case where the cylindrical lens is used as an optical element for changing the angle of divergence of the light beam output from each semiconductor laser, it is possible to use not only this but the spherical lens, the aspheric lens, the aspherical-surface cylindrical lens, the aspherical-surface cylindrical lens, etc.

In the above-mentioned preferred embodiment, the astigmatism occurs at the same time it changes the angle of divergence, since the cylindrical lens of the first page is used.

It is because it has the focus about the direction which intersects perpendicularly with the cylinder axis to power being 0 (focal-distance infinity) about the cylinder axis direction of the cylindrical lens.

Therefore, what is necessary when the astigmatism poses the problem is just to use the optical element which corrects the astigmatism at the same time it changes the angle of divergence. Such an optical element is, for example, the plain-anamorphic lens, the plain-toroidal lens, the positive (negative) meniscus lens, the anamorphic-anamorphic lens, the toroidal-toroidal lens, and the toroidal-anamorphic lens.

Figure 16:
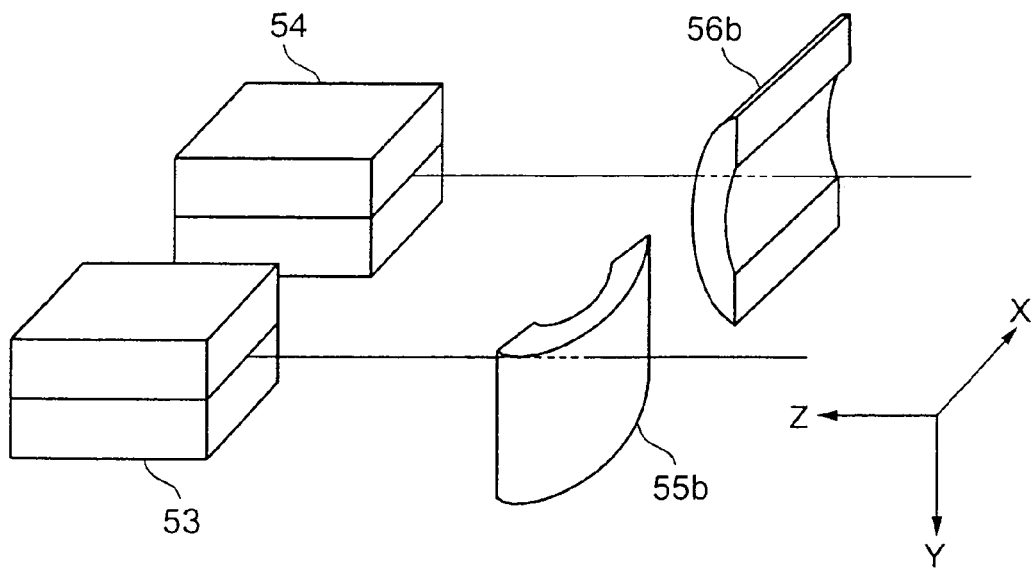
FIG. 16 is a diagram for explaining an example in which the meniscus lens is used as the optical element.
Figure 17:
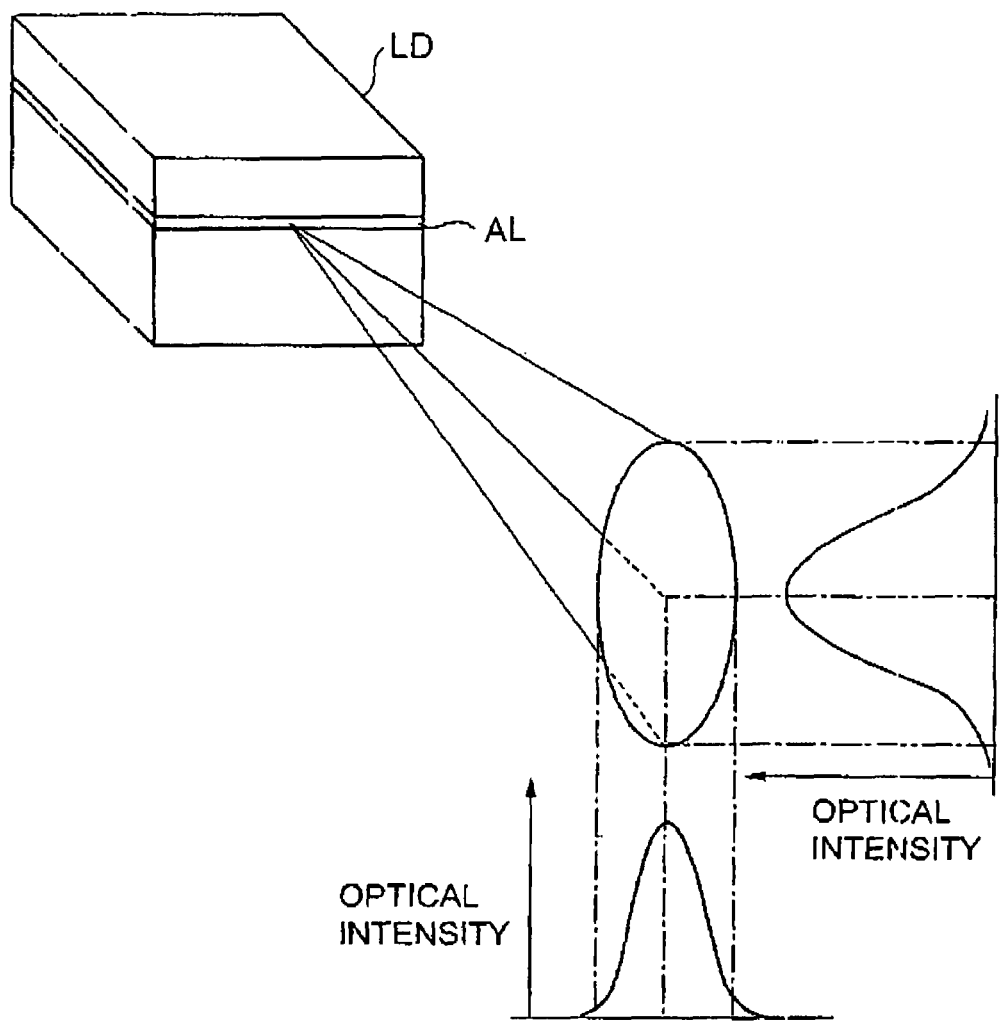
FIG. 17 is a diagram for explaining a relationship between the intensity distribution of the light beam output from the semiconductor laser and the location of the activation layer thereof.
Figure 18:
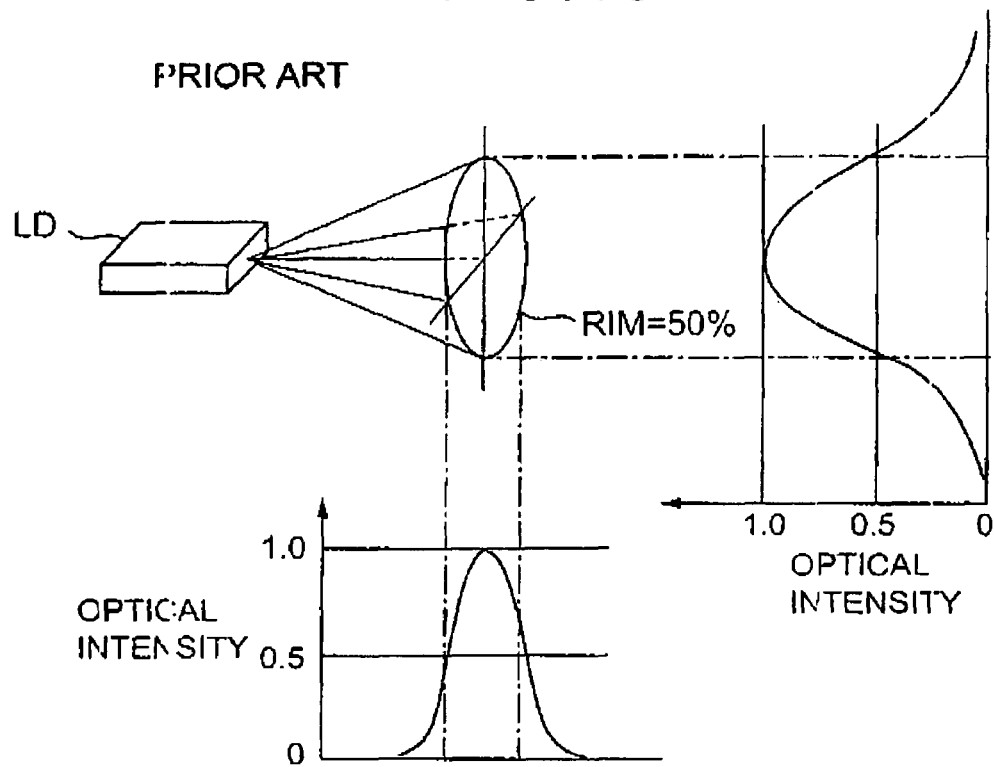
FIG. 18 is a diagram for explaining a case in which the rim intensity of the light beam output from the semiconductor laser is equal to 50%.
Figure 19:
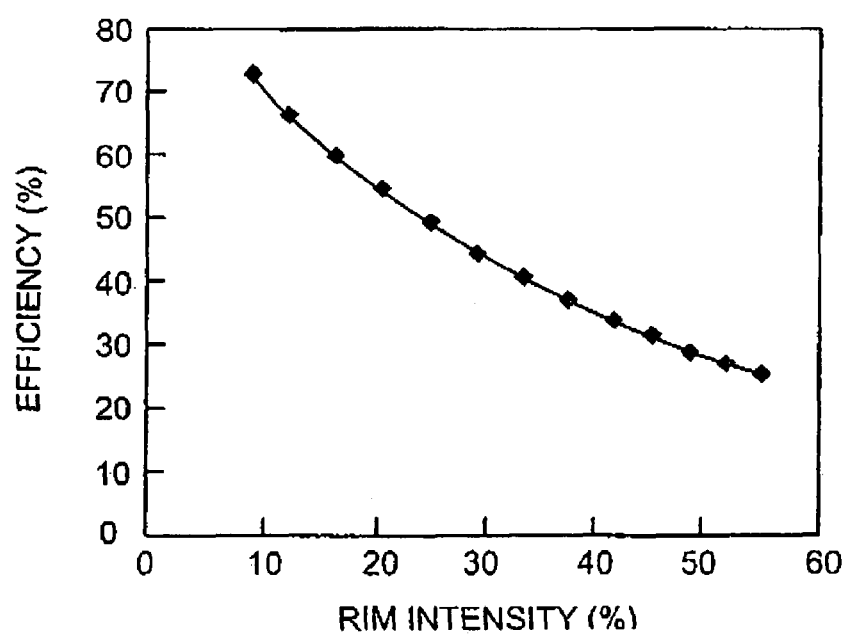
FIG. 19 is a diagram for explaining a relationship between the efficiency and the rim intensity of the light beam output from the semiconductor laser.

For example, in using the meniscus lens, as shown in FIG. 16, to the light beam output from the first semiconductor laser 53, it uses positive-meniscus-lens 56b to the light beam output from the second semiconductor laser 54 using negative-meniscus-lens 55b.

While changing each angle of divergence, it becomes possible to correct the astigmatic.

In the above-mentioned preferred embodiment, when there is no first optical element 55, the RIM of Y axis direction in the light beam incorporated by the object lens 60 among the light beams output from the first semiconductor laser 53 is about 30%.

Alternatively, the RIM of Y-axis direction may be smaller than 30%. In such a case, as for Y axis direction and X axis direction, it is appropriate to use the optical element which enlarges both the divergence angle $\theta 1Y$ in YZ plane of the light beam output from the first semiconductor laser 53, and the divergence angle $\theta 1Z$ in XZ plane, instead of first cylindrical-lens 55a, so that it may become RIM=30%.

Similarly, in the above-mentioned preferred embodiment, when there is no second optical element 56, the RIM of X axis direction in the light beam incorporated by the object lens 60 among the light beams output from the second semiconductor laser 54 is about 15%.

Alternatively, the RIM of X-axis direction may be larger than 15%. In such a case, as for Y axis direction and X axis direction, it is appropriate to use the optical element which enlarges both the angle-of-divergence $\theta 2Y$ in YZ plane of the light beam output from the second semiconductor laser 54, and the angle-of-divergence $\theta 2Z$ in XZ plane, instead of the second cylindrical-lens 56a, so that it may become RIM=15%.

The above-mentioned preferred embodiment has explained the case where the second cylindrical-lens 56a which reduces the angle of divergence of the light beam which outputs the angle of divergence of the light beam output from the first semiconductor laser 53 from first cylindrical-lens 55a to enlarge and the second semiconductor laser 54 is used. The present invention is not limited to this example.

When the optimal coupling lens for the light beam output from the first semiconductor laser 53 is used, the first cylindrical-lens 55a is unnecessary.

In this case, since the amount of change of the angle of divergence becomes large to the light beam output from the second semiconductor laser 54, it is good to use the different optical element from the second cylindrical-lens 56a.

When the optimal coupling lens for the light beam output from the second semiconductor laser 54 is used, second cylindrical-lens 56a is unnecessary.

In this case, since the amount of change of the angle of divergence becomes large to the light beam output from the first semiconductor laser 53, it is good to use the different optical element from first cylindrical-lens 55a.

Although the above-mentioned preferred embodiment explained the case where the wavelength of the light beam output from the light source is the two kinds, the present invention is not limited to this example.

The above-mentioned preferred embodiment explained the case where the polarization hologram 61 is used as a branch optical element for branching the return light beam in the direction of the light-receiving side of the photodetector 59.

It is possible to use not only this but the non-polarized hologram, the beam splitter, the polarization beam splitter, etc.

In this case, when the branch optical element does not have polarization nature, the quarter-wave plate 62 is unnecessary.

The above-mentioned preferred embodiment explained the case where the light-emission portion EL and the light-receiving portion RL are unified.

It is possible to arrange individually not only this but also the light-emission portion EL, and the light-receiving portion RL, respectively.

The above-mentioned preferred embodiment explained the case where it is the divergence light in which the configuration of the light beam of are outputting from the light source has the intensity distribution of the ellipse form.

It is possible to be the divergence light in which the configuration of the light beam of are outputting not only from this but also from the light source has the almost circular intensity distribution.

In the above-mentioned preferred embodiment, when target RIM is 30% when the optical disk 15 is DVD, and the optical disk 15 is CD, the case where target RIM is 15% has been explained. The present invention is not limited to this example.

The above-mentioned preferred embodiment explained the case where the optical module LM and the polarization hologram 61 are unified. It is not necessary to unify not only this but also the optical module LM, and the polarization hologram 61.

As explained above, according to the light source unit of the present invention, both the optical intensity distributions of the light beam output from two or more light sources can be optimized.

While outputting the light beam by which the optical intensity distribution is optimized according to the light source unit package of the present invention, without causing enlargement and high cost, it is stabilized and the light beam from the outside can be received.

According to the optical element of the present invention, the optical intensity distributions of the two incoming beams can be changed with sufficient accuracy.

According to the optical pickup device of the present invention, without causing enlargement and high cost, it can respond to two or more kinds of information storage mediums, and the optimal optical spot for each information storage medium can be formed.

According to the optical disk drive of the present invention, it can respond to two or more kinds of information storage mediums, and it is stabilized and access at the high speed can be performed.

Figure 20:
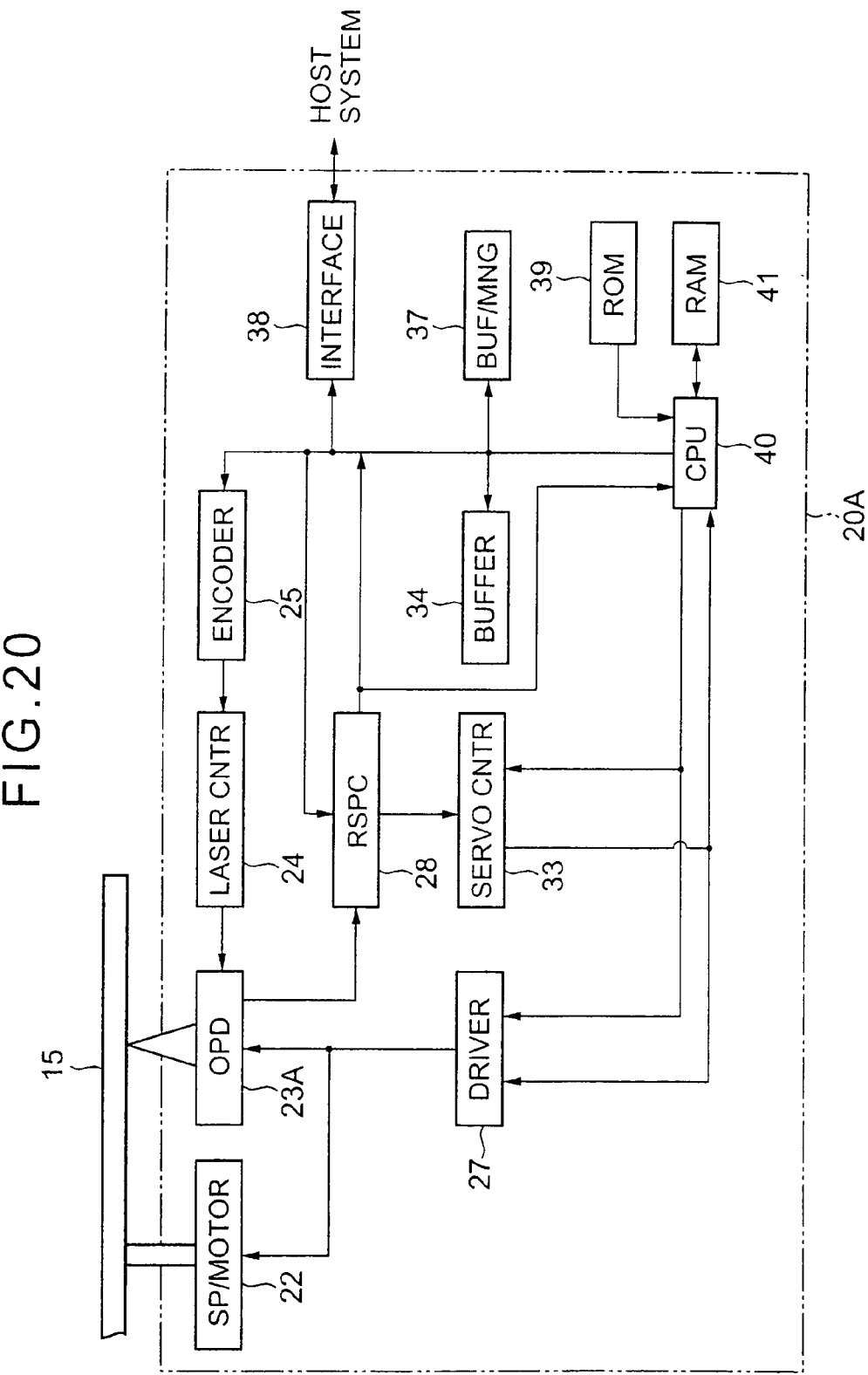
FIG. 20 is a block diagram of the optical disk drive in another preferred embodiment of the present invention.

FIG. 20 shows the composition of the optical-disk-drive 20A in one first preferred embodiment in which the optical pickup device concerning the present invention is included.

The optical-disk-drive 20A shown in FIG. 20 comprises the spindle motor 22 for carrying out the rotation drive of the optical disk 15 as an information storage medium, the optical-pickup-device 23A, the laser control circuit 24, the encoder 25, the motor driver 27, the reproduction signal processing circuit 28, the servo controller 33, the buffer RAM 34, the buffer manager 37, the interface 38, the ROM 39, the CPU 40, and the RAM 41.

The optical-pickup-device 23A is provided for receiving the received light from the recording surface and for focusing the laser light on the recording surface of the optical disk 15.

The reproduction signal processing circuit 28 detects the wobble signal, the RF signal, the servo signal (the focal error signal, the track error signal), etc. based on the output signal of the optical-pickup-device 23A.

And the reproduction signal processing circuit 28 extracts address information, the synchronizing signal, etc. based on the wobble signal.

The address information extracted is outputted to the CPU 40, and the synchronizing signal is outputted to the encoder 25.

Furthermore, after the reproduction signal processing circuit 28 performs error-correction processing to the RF signal, it is stored in the buffer RAM 34 through the buffer manager 37.

Moreover, the servo signal is outputted to the servo controller 33 from the reproduction signal processing circuit 28.

The servo controller 33 generates the various control signals which control the optical-pickup-device 23A based on the servo signal, and outputs them to the motor driver 27.

The buffer manager 37 notifies I/O of the data to the buffer RAM 34 to the CPU 40 that it manages and the accumulated amount of data becomes the predetermined value.

The motor driver 27 controls the optical-pickup-device 23A and the spindle motor 22 based on directions of the control signal from the servo controller 33, and the CPU 40.

It is written in synchronizing with the synchronizing signal from the reproduction signal processing circuit 28, and outputs data to the laser control circuit 24 while the above-mentioned encoder 25 takes out the data accumulated at the buffer RAM 34 through the buffer manager 37 based on directions of the CPU 40, performs addition of the error correction code etc. and creates the write-in data to the optical disk 15.

The laser control circuit 24 controls the output of the laser light output from the optical-pickup-device 23A based on directions of the write-in data from the encoder 25, and the CPU 40.

In addition, let one side of the two light sources of optical-pickup-device 23A mentioned later be the control object in the laser control circuit 24 based on directions of the CPU 40.

The interface 38 is the bi-directional communication interface with the host (for example, personal computer), and is based on the standard interfaces, such as ATAPI (AT Attachment Packet Interface) and SCSI (Small Computer System Interface).

The program described in code decipherable by the CPU 40 is stored in the ROM 39.

And the CPU 40 stores data required for control temporarily in the RAM 41 while controlling operation of each part of the above according to the program stored in the ROM 39.

Next, the composition of the optical-pickup-device 23A will be described with respect to FIG. 21 through FIG. 23.

Figure 21:
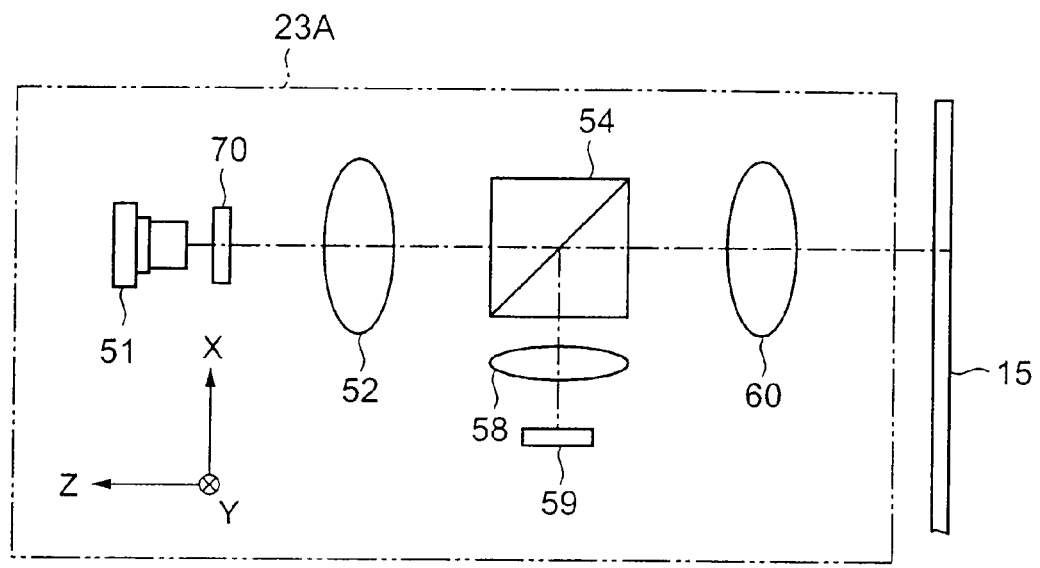
FIG. 21 is a diagram showing the composition of the optical system in the optical pickup device of FIG. 20.

The optical-pickup-device 23A is equipped with the light source unit 51 as shown in FIG. 21.

While leading the light beam output from the light source unit 51 to the recording surface of the optical disk 15 including the angle-of-divergence adjustment lens 70 as an adjustment optical element, the collimator lens 52, the beam splitter 54, the object lens 60, and the detection lens 58, it has the optical system which is reflected in respect of record and to which it returns and the light beam is led to the predetermined light-receiving location, the photodetector 59 arranged in the light-receiving location.

The light source unit 51, the optical system, and the photodetector 59 are attached by the position relation in the housing of the optical pickup device.

Figure 22:
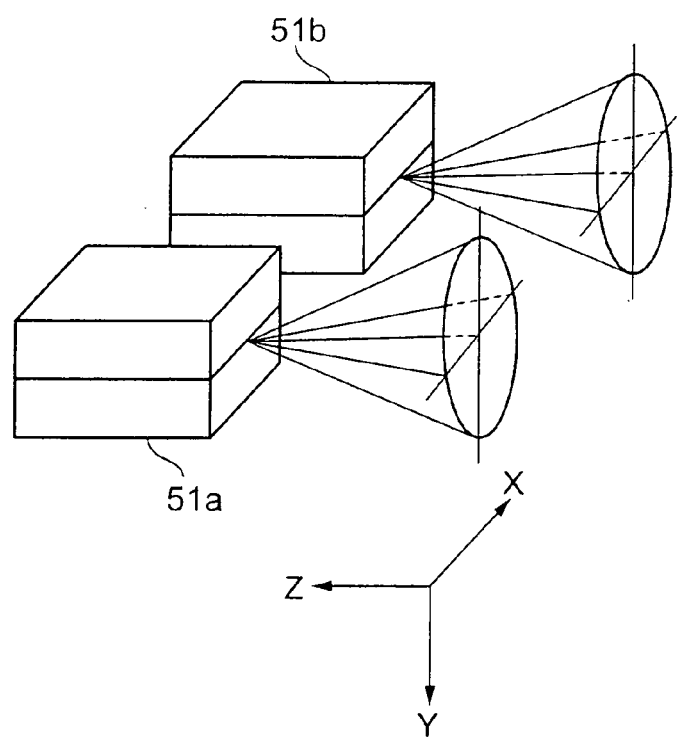
FIG. 22 is a diagram for explaining two semiconductor lasers in the light source unit of FIG. 21.

As shown in FIG. 22, the light source unit 51 is configured so that the first semiconductor laser 51a which outputs the laser light whose wavelength is 650 nm and the second semiconductor laser 51b which outputs the laser light whose wavelength is 780 nm may be included.

Each semiconductor laser arranged in proximity is mounted on the substrate, and only the predetermined distance leaves it and it is arranged in X axis direction. It is designed so that the outgoing direction of the maximum intensity of each light beam output from the light source unit 51 be the −Z direction.

The first semiconductor laser 51a is chosen when the optical disk 15 is DVD, and the second semiconductor laser 51b is chosen when the optical disk 15 is CD.

Figure 23:
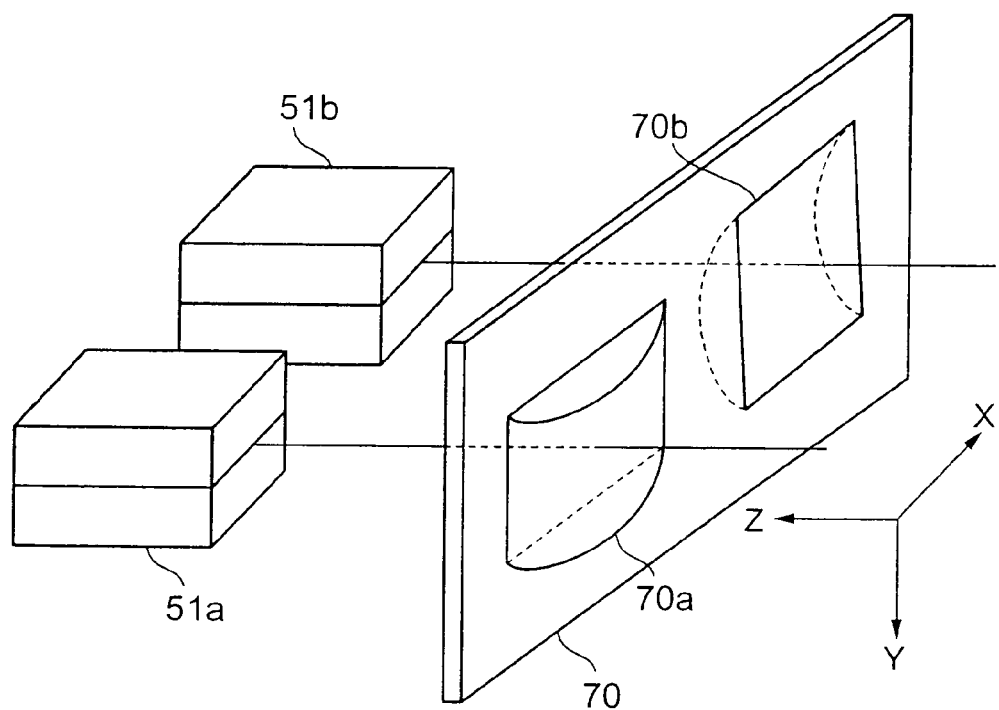
FIG. 23 is a diagram for explaining the optical element in the light source unit of FIG. 21.

The angle-of-divergence adjustment lens 70 is arranged at the −Z plane of the light source unit 51, and is shown in FIG. 23.

It is constituted including positive-meniscus-lens 70b which adjusts the angle of divergence of the light beam (the second light beam) output from the second semiconductor laser 51b (reduction), and the negative-meniscus-lens 70a which adjusts the angle of divergence of the light beam (the first light beam) output from the first semiconductor laser 51a (expansion).

If it is unified and the angle-of-divergence adjustment lens 70 shifts, as for the negative-meniscus-lens 70a and the positive-meniscus-lens 70b, both meniscus lenses will also shift only the same distance in the same direction.

In addition, the cylinder generating line in each meniscus lens lies at right angles mutually.

The collimator lens 52 is provided at the −Z plane of the angle-of-divergence adjustment lens 70, and converts the light beam through the angle-of-divergence adjustment lens 70 into the parallel light beam.

The beam splitter 54 is arranged at the −Z plane of the collimator lens 52.

The object lens 60 is arranged at the −Z plane of the beam splitter 54, focuses the light beam through the beam splitter 54 to form the light spot on the recording surface of the optical disk 15.

The detection lens 58 is arranged at the −X plane of the beam splitter 54, and the return light beam reflected by the beam splitter 54 is focused.

The photodetector 59 is arranged at the −X plane of this detection lens 58. In the photodetector 59, four division light-receiving components are used as in the usual optical disk drive.

The photodetector 59 receives the return light beam from the recording surface of the optical disk 15, and outputs the signal including wobble signal information, reproduction data information, focal error information, track error information, etc. as in the usual optical pickup device.

Referring back to FIG. 21, the operation of the optical-pickup-device 23A which is constituted as mentioned above will be described. The angle of divergence is expanded by the negative-meniscus-lens 70a, and after the light beam (the first light beam) output from the first semiconductor laser 51a is made into the parallel light beam by the collimator lens 52, it is incident to the beam splitter 54.

The first light beam through the beam splitter 54 is focused on the recording surface of the optical disk 15 as a minute light spot through the object lens 60.

On the other hand, the angle of divergence is reduced by the positive-meniscus-lens 70b, and after the light beam (the second light beam) output from the second semiconductor laser 51b is made into the parallel light beam by the collimator lens 52, it is incident to the beam splitter 54.

The second light beam through the beam splitter 54 is focused on the recording surface of the optical disk 15 as a minute light spot through the object lens 60.

The received light beam reflected from the optical disk 15 is converted into the parallel light beam by the object lens 60 as a return light beam, and it is incident to the beam splitter 54.

The return light beam which is output in the direction of −X by the beam splitter 54 is received by the photodetector 59 through the detection lens 58.

From the photodetector 59, the signal according to the amount of the received light is output to the reproduction signal processing circuit 28.

Next, the procedure of manufacturing the optical-pickup-device 23A will be described with reference to FIG. 24.

Figure 25A:
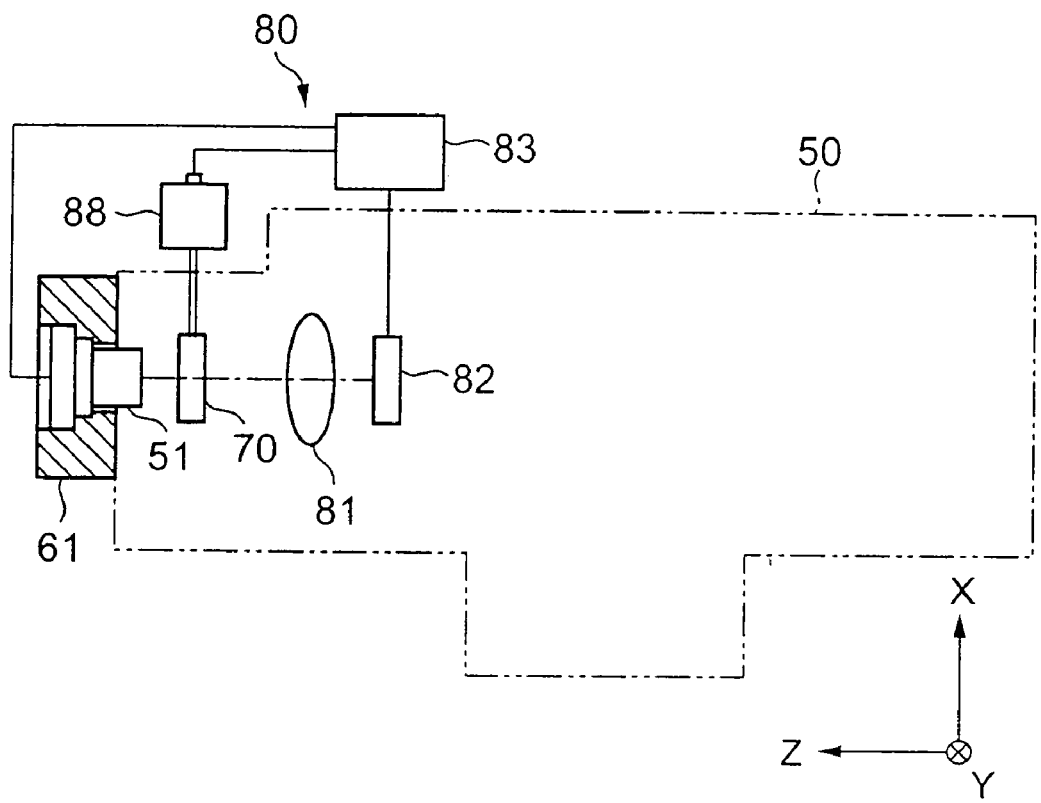
FIG. 25A and FIG. 25B are diagrams for explaining a slide guide used to fix the photodetector at a given position.

At step 401, as shown in FIG. 25A, the light source unit 51 and the angle-of-divergence adjustment lens 70 are attached to the housing 50 of the optical pickup device.

At this time, the light source unit 51 is attached, after having been held by the electrode holder 61 to the housing 50.

At step 403, as shown in FIG. 25 A, the collimator lens 81 as an optical element for making into the parallel light each light beam through each meniscus lens of the angle-of-divergence adjustment lens 70 is arranged to the −Z plane of the angle-of-divergence adjustment lens 70.

The collimator lens 81 is stationed so that the collimator lens 81 optical axis may be mostly in agreement with the collimator lens 52 optical axis.

Then, the light-receiving component 82 for detection as the first position transducer for receiving the light beam converted into the parallel light beam by the collimator lens 81 is arranged in the predetermined location by the −Z plane of the collimator lens 81.

Figure 25B:
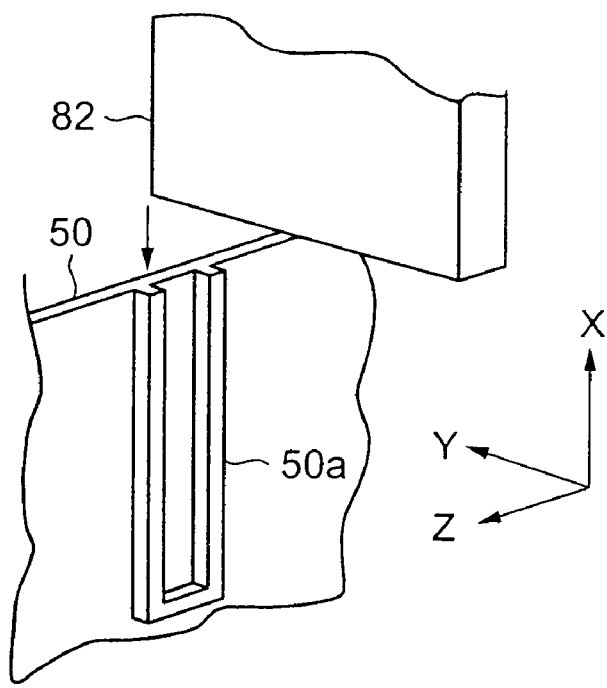

As shown in the wall by the side of one of Y-axis direction in FIG. 25B, the slide guide 50a of the shape of the U character projected inside is formed in the housing 50.

For this reason, the light-receiving component 82 for detection is correctly positioned along with the slide guide 50a in the above-mentioned predetermined location.

In addition, the collimator lens 81 and the light-receiving component 82 for detection may be unified.

Moreover, as shown in FIG. 25A, the measurement control device 83 are connected to the optical element 82 for detection.

Figure 26:
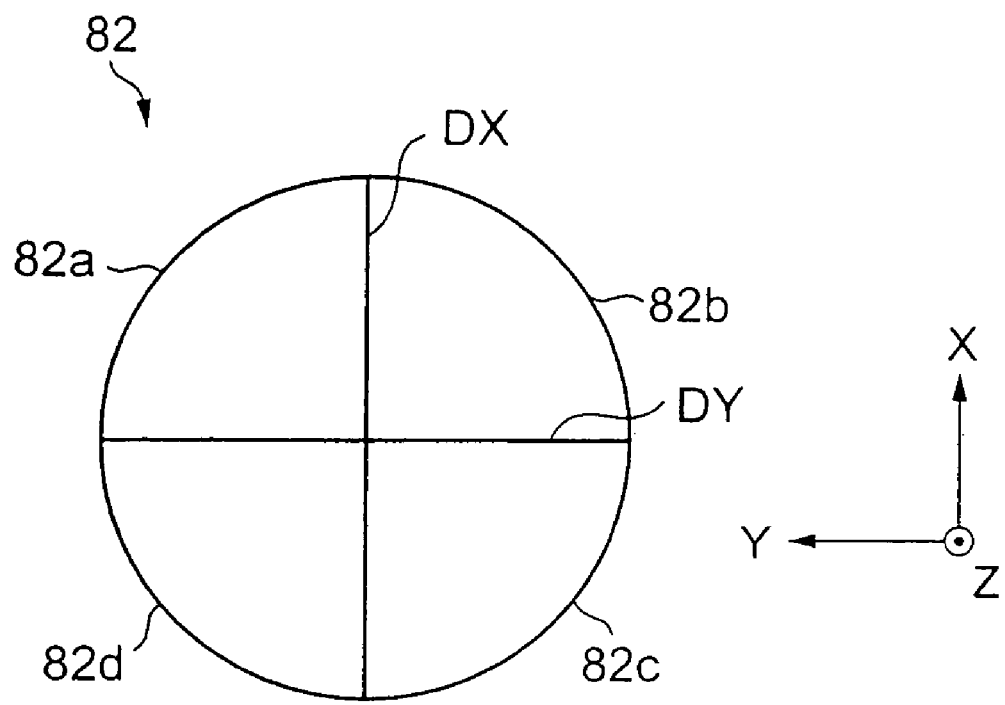
FIG. 26 is a diagram showing the photodetector in the optical pickup device of the preferred embodiment.

As a light-receiving component 82 for detection, as shown in FIG. 26, the four-division light-receiving components separated by the parting line DX of X axis direction and the parting lines DY of Y axis direction are used.

The light-receiving component 82 for detection includes the first light-receiving component 82a, the second light-receiving component 82b, the third light-receiving component 82c, and the fourth light-receiving component 82d.

It is the +X plane (the upper left side) of the parting line DY at the +Y plane of the parting line DX.

The +X plane (the upper right side) of the parting line DY by the first light-receiving component 82a and −Y plane of the parting line DX of the second light-receiving component 82b.

Let the −X plane (the lower left side) of the parting line DY be the fourth light-receiving component 82d for the −X plane (the lower right side) of the parting line DY by the −Y plane of the parting line DX by the third light-receiving component 82c and +Y plane of the parting line DX.

And the photo-electric-conversion signal in each partial light-receiving component is outputted to the measurement control device 83.

The intersection of each parting line is made into the origin/datum in this preferred embodiment, and the location based on the intensity of the light-receiving light beam shall be shown by making Y axis direction into the Y coordinate, making X axis direction as the X coordinate.

The drive unit 88 is attached in the angle-of-divergence adjustment lens 70 at step 405.

This drive unit 88 drives the angle-of-divergence adjustment lens 70 to X axis direction and Y-axis direction based on directions of the measurement control device 83.

Figure 27:
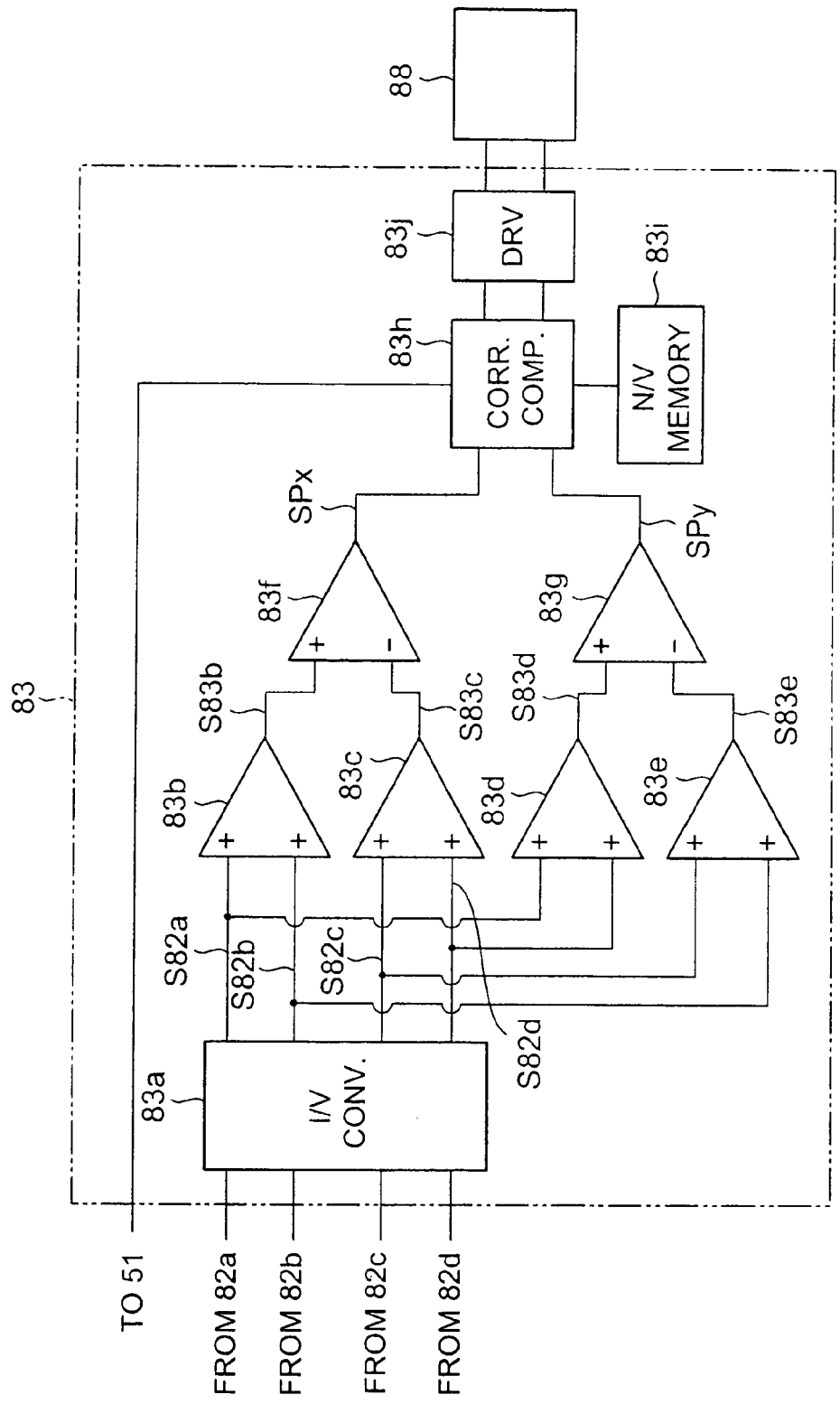
FIG. 27 is a diagram showing the detection control device in the optical pickup device of the preferred embodiment.

The measurement control device 83 provide the output signals from the first light-receiving component 82a, as shown in FIG. 27.

Converting into the electrical-potential-difference signal S82a, and the output signal from the second light-receiving component 82b is converted into the electrical-potential-difference signal S82b.

The output signal from the third light-receiving component 82c is converted into the electrical-potential-difference signal S82c.

The I-V conversion circuit 83a for changing the output signal from the fourth light-receiving component 82d into the electrical-potential-difference signal S82d.

The adder 83b provides addition of the signal S82a and signal S82b, and the adder 83c provides addition of the signal S82c and signal S82d. The adder 83e provides addition of the signal S82b and signal 82c, and the adder 83d provides addition of the signal S82a and signal S82d.

The subtractor 83f provides the difference signal of the output-signal S83c of the adder 83c and the output-signal S83b of the adder 83b.

The subtractor 83g provides the difference signal of the output-signal S83d of the adder 83d and the output-signal S83e of the adder 83e.

The compensation computation circuit 83h calculate the amount of location compensation of the angle-of-divergence adjustment lens 70 based on the output signal SPx of the subtractor 83f and the output signal SPy of the subtractor 83g.

In the non-volatile memory 83i, various information required for the operation of the compensation computation circuit 83h and the amount of location compensation are stored, and the driver 83j which outputs the drive signal to the drive unit 88 based on the operation results of the compensation computation circuit 83h.

The compensation computation circuit 83h also controls the on/off switching of each semiconductor laser.

The signal SPx is computed by the operation processing of the following formula (1), and the signal SPy is computed by the operation processing of the following formula (2).

$$SPx = (S82a + S82b) - (S82c + S82d) \quad (1)$$

$$Spy = (S82a + S82d) - (S82b + S82c) \quad (2)$$

The location compensation of the angle-of-divergence adjustment lens 70 is directed to the measurement control device 83. Thereby, in the measurement control device 83, location compensation processing of the following steps 407-step 419 is performed.

At step 407, the first semiconductor laser 51a is set in ON state by the compensation computation circuit 83h, so that the first light beam is output from the light source unit 51.

This first light beam is received by the light-receiving component 82 for detection through the collimator lens 81, after the angle of divergence is expanded by the negative-meniscus-lens 70a.

From each partial light-receiving component which constitutes the light-receiving component 82 for detection, the signal according to the amount of the received light is outputted to the measurement control device 83.

In the measurement control device 83, the above-mentioned operation processing is performed and the signal SPx and signal SPy are computed.

At step 409, based on the signal SPx and signal SPy, the coordinates (Px1, Py1) of the intensity center location of the first light beam in the light-receiving side of the light-receiving component 82 for detection are computed, and the result is stored in the non-volatile memory 83i by the compensation computation circuit 83h.

The first semiconductor laser 51a is set in OFF state by the compensation computation circuit 83h, and the emission of the first light beam is stopped.

At step 411, the second semiconductor laser 51b is set in ON state by the compensation computation circuit 83h, and the second light beam is output from the light source unit 51.

This second light beam is received by the light-receiving component 82 for detection through the collimator lens 81, after the angle of divergence is reduced by the positive-meniscus-lens 70b.

From each partial light-receiving component which constitutes the light-receiving component 82 for detection, the signal according to the amount of the received light is outputted to the measurement control device 83.

In the measurement control device 83, the above-mentioned operation processing is performed and the signal SPx and signal SPy are computed.

At step 413, the coordinates (Px2, Py2) of the intensity center location of the second light beam in the light-receiving side of the light-receiving component 82 for detection is computed by the compensation computation circuit 83h based on the signal SPx and signal SPy.

The second semiconductor laser 51b is set in OFF state by the compensation computation circuit 83h, and the emission of the second light beam is stopped.

At step 415, the coordinates (Px1, Py1) of the intensity center location of the first light beam and the coordinates (Px2, Py2) of the intensity center location of the second light beam are in agreement with the compensation computation circuit 83h.

Based on the following formula (3), the amount Mx of location compensation of the angle-of-divergence adjustment lens 70 about X axis direction is computed, and the amount My of location compensation of the angle-of-divergence adjustment lens 70 about Y axis direction is computed based on the following formula (4).

$$Mx = Rx \times (Px2 - Px1) \quad (3)$$

$$My = Ry \times (Py1 - Py2) \quad (4)$$

where Rx is a value acquired by the following formula (5) when the angle-of-divergence adjustment lens 70 is moved by a distance Tx in X axis direction and the amount of movement in X axis direction of the intensity center location of the light beam received by the light-receiving component 82 is indicated by tx.

$$Rx = Tx/tx \quad (5)$$

Moreover, Ry is a value acquired by the following formula (6) when the angle-of-divergence adjustment lens 70 is moved by a distance Ty in Y axis direction and the amount of movement in Y axis direction of the intensity center location of the light beam received by the light-receiving component 82 is indicated by ty.

$$Ry = Ty/ty \quad (6)$$

Rx and Ry are beforehand calculated by theoretical calculation or the experiment, and are stored in the non-volatile memory 83i.

The amounts Mx and My of location compensation of the angle-of-divergence adjustment lens 70 are outputted to the driver 83j from the compensation computation circuit 83h.

At step 417, based on the amounts Mx and My of location compensation of the angle-of-divergence adjustment lens 70, the drive signal is generated by the driver 83j and it is outputted to the drive unit 88.

At step 419, the drive unit 88 drives the angle-of-divergence adjustment lens 70 based on the drive signal. Thereby, location compensation processing of the angle-of-divergence adjustment lens 70 by the measurement control device 83 is completed.

And the angle-of-divergence adjustment lens 70 is fixed to the housing 50 with the screws.

At step 421, the collimator lens 81 and the light-receiving component 82 for detection are removed from the optical path.

Moreover, the drive unit 88 is also removed from the angle-of-divergence adjustment lens 70.

At step 423, after attaching the remaining optical parts (the collimator lens 52 in FIG. 21, the beam splitter 54, the object lens 60, the detection lens 58) and the remaining photodetector 59 which are not attached until now according to the design value in the housing 50, the manufacture of optical-pickup-device 23A is completed by the processing attaching the lid (covering) of the housing.

At this time, the optical system, the light source unit 51, and the photodetector 59 are attached by the ideal location relation.

Next, processing operation in the case of recording data on the optical disk 15 is briefly explained using the above-mentioned optical-disk-drive 20A.

It can be distinguished from the intensity of the received light from the recording surface whether the optical disk 15 is CD or DVD.

Usually, this distinction is performed at the time of loading, when the optical disk 15 is set to the predetermined location of optical-disk-drive 20A.

It is also possible to distinguish the kind of optical disk 15 based on TOC (Table Of Contents) information, PMA (Program Memory Area) information, the wobble signal, etc. which are beforehand recorded on the optical disk 15.

The distinction result is notified to the laser control circuit 24, and the semiconductor laser of the control object is chosen by the laser control circuit 24.

Therefore, it is assumed that one of the semiconductor laser is already chosen here.

The CPU 40 notifies the purport that the command of the record request is received from the host to the reproduction signal processing circuit 28 while outputting the control signal for controlling rotation of the spindle motor 22 based on the specified record rate to the motor driver 27, if the command of the record request is received from the host system.

Moreover, the CPU 40 accumulates the data received from the host to the buffer RAM 34 through the buffer manager 37.

If rotation of the optical disk 15 reaches the predetermined linear velocity, based on the output signal of the photodetector 59, the reproduction signal processing circuit 28 will detect the track error signal and the focal error signal, and will output them to the servo controller 33.

Based on the track error signal, the servo controller 33 drives the tracking actuator of optical-pickup-device 23A through the motor driver 27, and corrects the tracking error.

Based on the focal error signal, the servo controller 33 drives the focusing actuator of the optical-pickup-device 23A through the motor driver 27, and corrects the focusing error.

Thus, the tracking control and focusing control are performed.

The reproduction signal processing circuit 28 acquires address information based on the output signal of the photodetector 59, and notifies it to the CPU 40.

And the CPU 40 outputs the specified signal which controls the seeking motor of the optical-pickup-device 23A so that it writes in and optical-pickup-device 23A is located in the start point to the motor driver 27 based on address information.

If the notice that the amount of data accumulated from the buffer manager 37 at the buffer RAM 34 exceeded the predetermined value is received, the CPU 40 is written in the encoder 25 and directs creation of data.

If the CPU 40 determines that the location of optical-pickup-device 23A writes in based on address information, and it is the start point, it will be notified to the encoder 25.

The encoder 25 records write-in data on the optical disk 15 through the laser control circuit 24 and optical-pickup-device 23A.

Next, processing operation in the case of reproducing the data currently recorded on the optical disk 15 using optical-disk-drive 20A mentioned above is explained briefly.

In addition, it is assumed that one of the semiconductor laser is already chosen like record processing.

The CPU 40 notifies the purport that the command of the reproduction request is received from the host to the reproduction signal processing circuit 28 while outputting the control signal for controlling rotation of the spindle motor 22 based on the reproduction rate to the motor driver 27, if the command of the reproduction request is received from the host.

If rotation of the optical disk 15 reaches the predetermined linear velocity, tracking control and focal control will be performed like the case of the above-mentioned record processing.

Like the case of the above-mentioned record processing, the reproduction signal processing circuit 28 detects address information, and notifies it to the CPU 40.

The CPU 40 outputs the specified signal which controls the seeking motor so that it reads and optical-pickup-device 23A is located in the start point to the motor driver 27 based on address information.

If the CPU 40 determines that the location of optical-pickup-device 23A reads, and it is the start point based on address information, it will be notified to the reproduction signal processing circuit 28.

After the reproduction signal processing circuit 28 detects RF signal based on the output signal of the photodetector 59 and performs error-correction processing etc., it is accumulated to the buffer RAM 34.

The buffer manager 37 transmits to the host through the interface 38, when the reproduction data accumulated at the buffer RAM 34 are assembled as sector data.

In addition, tracking control and focal control are performed at any time until record processing and the regeneration are completed.

Figure 24:
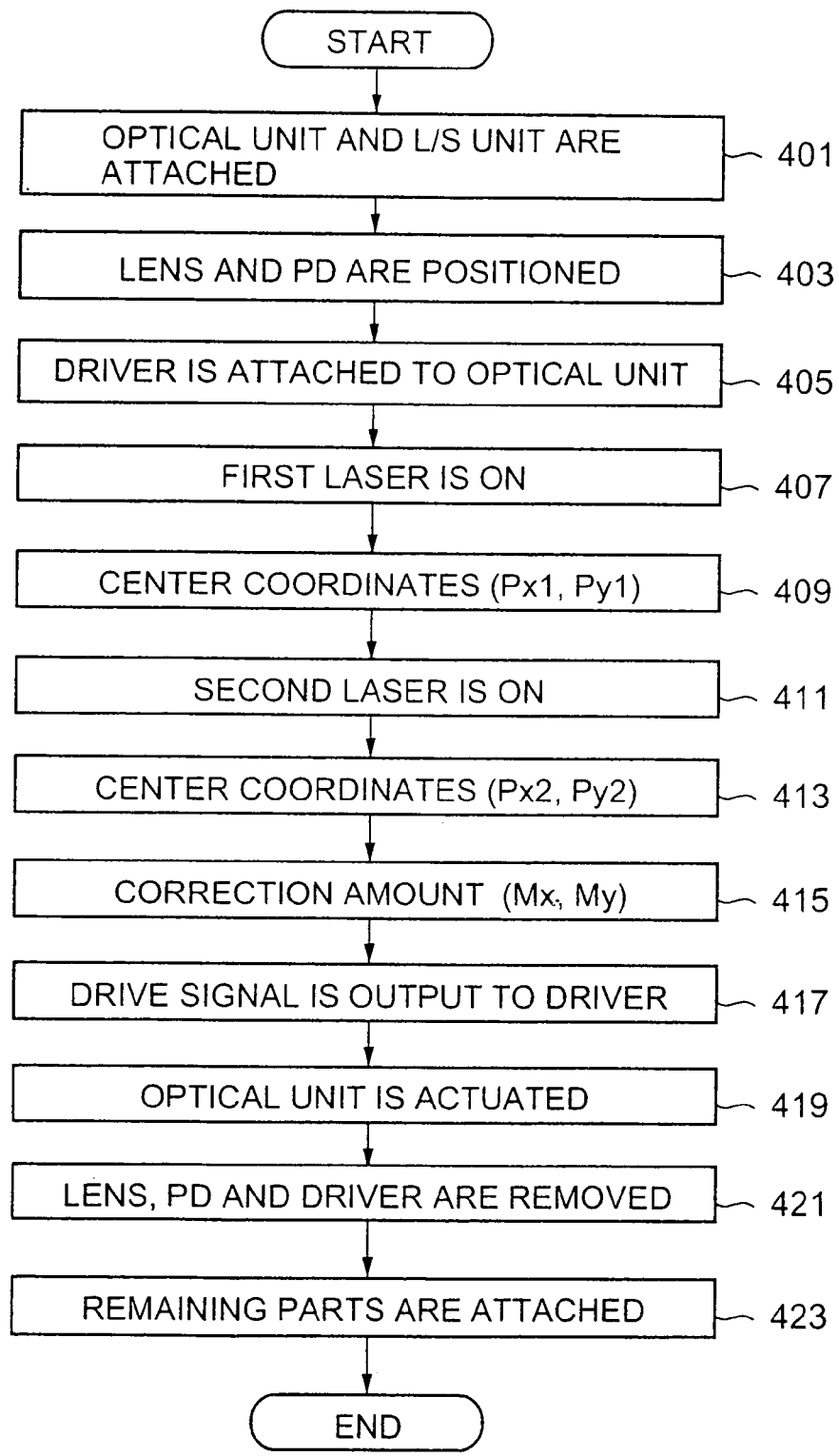
FIG. 24 is a flowchart for explaining a method of manufacture of the optical pickup device of the preferred embodiment.

In this preferred embodiment, the information acquisition process of the manufacture approach concerning the present invention is carried out by processing of step 403 of FIG. 24—step 415, and the compensation process is carried out by processing of step 417 of FIG. 24, and step 419 so that clearly from the above explanation.

Moreover, the processor is realized in optical-disk-drive 20A concerning this preferred embodiment by the reproduction signal processing circuit 28 and the program performed by the CPU 40 and this the CPU 40.

As explained above, according to the manufacture approach of the optical pickup device concerning this preferred embodiment, it is the phase which attached the light source unit 51 and the angle-of-divergence adjustment lens 70.

The first semiconductor laser 51a and second semiconductor laser 51b are made to emit light one by one, the first light beam to which the angle of divergence is expanded by negative-meniscus-lens 70a, and the second light beam to which the angle of divergence is reduced by positive-meniscus-lens 70b are received with the light-receiving component 82 for detection, respectively, and the intensity center location of each light beam is detected, respectively.

When the intensity center location of each light beam is not in agreement, the mounting location of the angle-of-divergence adjustment lens 70 is corrected so that the intensity center location of each light beam may be in agreement.

Even if the outgoing direction of the first light beam when it is output from the light source unit 51 and the outgoing direction of the second light beam are not mutually in agreement, when the angle-of-divergence adjustment lens 70 is passed, the outgoing direction of each light beam is mutually in agreement.

Therefore, it is possible to correct the deviation of the outgoing direction of each light beam output from the plurality of light sources.

Moreover, since cheap 4 division light-receiving component is used as a light-receiving component 82 for detection, location compensation processing of the angle-of-divergence adjustment lens 70 can be performed at low cost.

Figure 28:
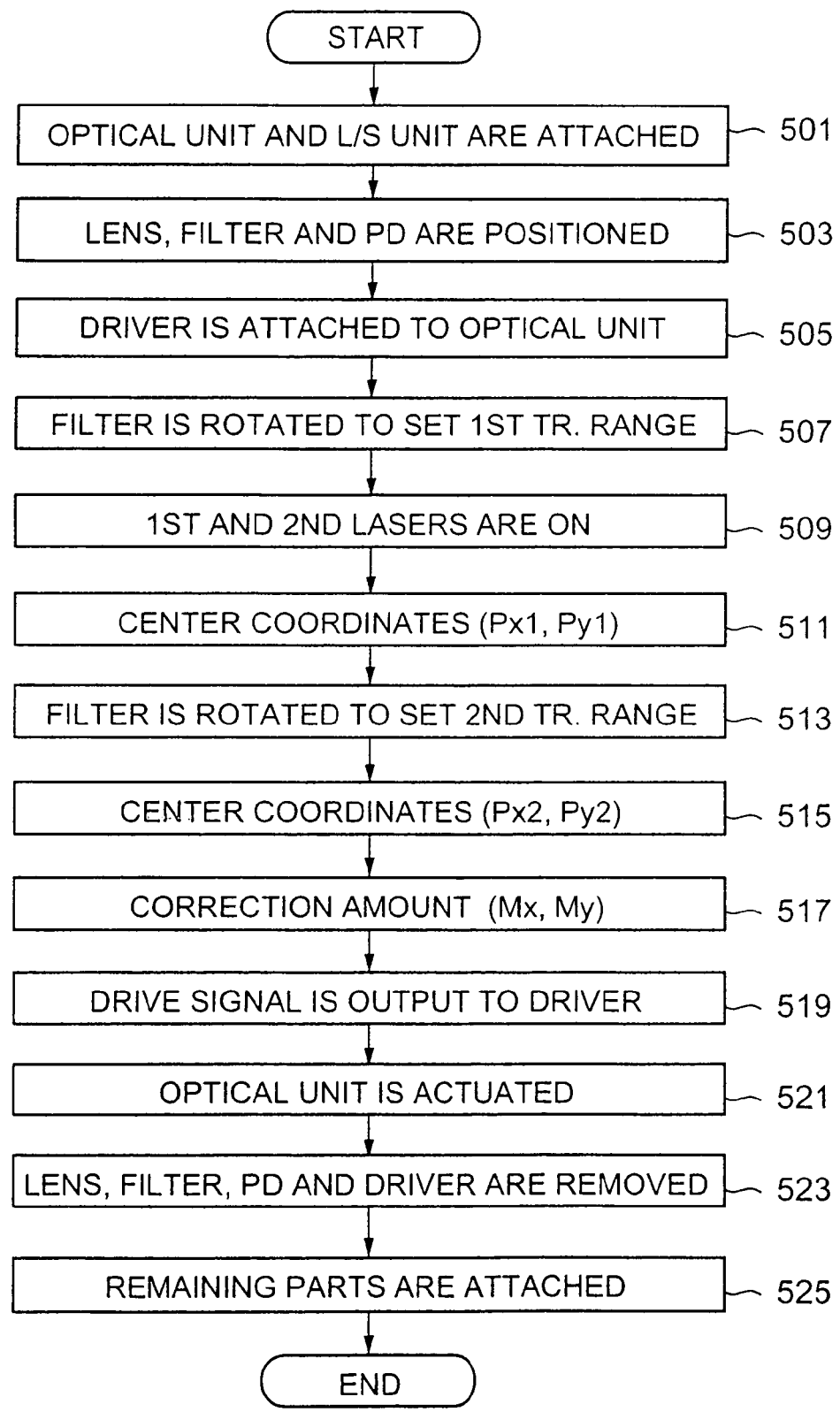
FIG. 28 is a flowchart for explaining a method of manufacture of the optical pickup device of another preferred embodiment of the present invention.

The preferred embodiment of FIG. 28 has the description at the point using the filter for choosing either the first light beam and the second light beam while making first semiconductor laser 51a and second semiconductor laser 51b emit light simultaneously in the case of location compensation processing of the angle-of-divergence adjustment lens mentioned above.

In addition, in addition to this, the composition of the optical pickup device and the optical disk drive etc. is the same as that of the preferred embodiment of FIG. 24 mentioned above.

Therefore, the explanation shall be omitted while using the sign same about the component equivalent to the first preferred embodiment mentioned above while explaining difference with the preferred embodiment of FIG. 24 below.

The procedure of manufacturing optical-pickup-device 23A in the preferred embodiment is shown to FIG. 28 by the flow chart.

At step 501, the same processing as the above-mentioned step 401 is performed.

At step 503, the collimator lens 81 is stationed in the predetermined location like the above-mentioned step 403.

Figure 29A:
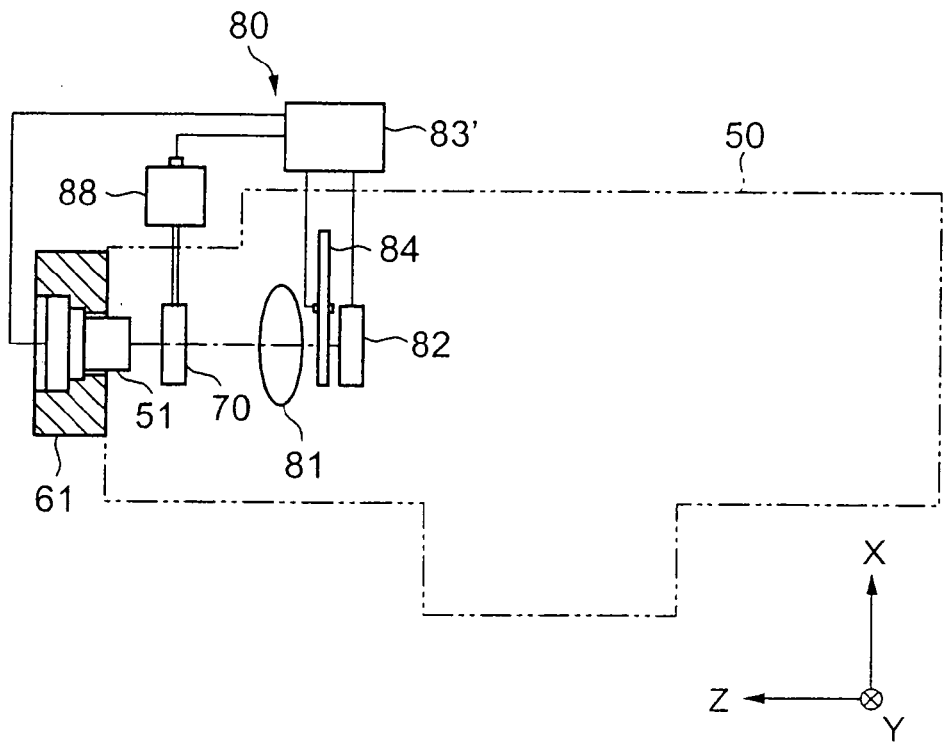
FIG. 29A and FIG. 29B are diagrams for explaining a filter in the optical pickup device of the preferred embodiment.

Next, as shown in FIG. 29A, the filter 84 is arranged to the −Z plane of the collimator lens 81.

In this step, it is arranged so that the light beam is converted into the parallel light beam by the collimator lens 81 and it is incident to a part of the filter 84 (the lower half of FIG. 29A).

Figure 29B:
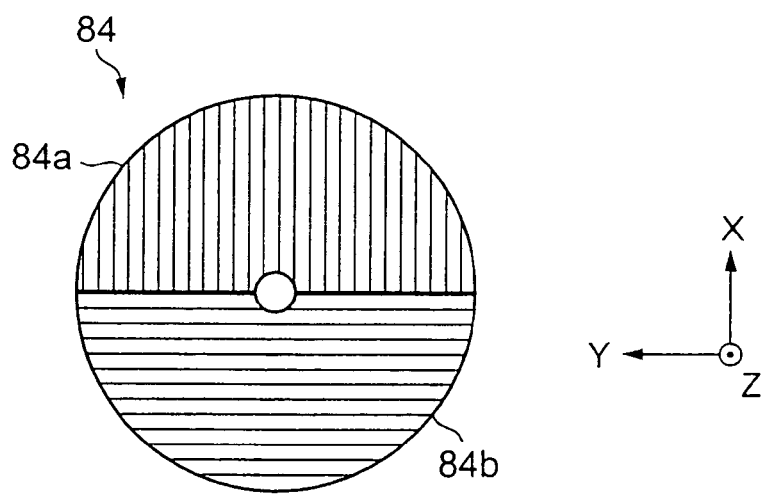

As shown in FIG. 29B, the filter 84 has a disk configuration and is divided into two penetration ranges (first penetration range 84a, second penetration range 84b) by the straight line passing through the center.

The first penetration range 84a has the property of making the first light beam penetrating alternatively, and the second penetration range 84b has the property of making the second light beam penetrating alternatively.

The filter 84 comprises the rotation drive mechanism, and can be rotated within XY plane with directions of measurement control-device 83' by setting the axis of rotation as the shaft of Z-axis direction passing through the center.

Then, the light-receiving component 82 for detection is arranged to the −Z plane of the filter 84.

As shown in FIG. 29A, the measurement control-device 83' is connected to the optical element 82 for detection.

As shown in FIG. 30, the measurement control device 83' uses, instead of the above-mentioned circuit 83h of the measurement control device 83, the compensation computation circuit 83h' having the additional function to control the filter 84.

Other composition is the same as that of the measurement control device 83, and a description thereof will be omitted.

At step 505, the same processing as the above-mentioned step 405 is performed.

And location compensation of the angle-of-divergence adjustment lens 70 is directed to the measurement control-device 83'.

Thereby, in the measurement control-device 83', location compensation processing of the following steps 507-521 is performed.

At step 507, rotation of the filter 84 is controlled by the compensation computation circuit 83h' so that the light beam is converted into the parallel light beam by the collimator lens 81 and it is incident to the first penetration range 84a.

At step 509, the first semiconductor laser 51a and second semiconductor laser 51b are set in ON state by the compensation computation circuit 83h', and the first light beam and second light beam are output from the light source unit 51.

After the angle of divergence is expanded by the negative-meniscus-lens 70a, the first light beam is incident to the filter 84 through the collimator lens 81.

After the angle of divergence is reduced by the positive-meniscus-lens 70b, the second light beam is incident to the filter 84 through the collimator lens 81.

In the filter 84, only the first light beam passes through it, and the first light beam is received by the light-receiving component 82 for detection.

From each partial light-receiving component which constitutes the light-receiving component 82 for detection, the signal according to the amount of the received light is outputted to the measurement control-device 83'.

In the measurement control-device 83', the signal SPx and signal SPy are computed as in the previous preferred embodiment.

At step 511, the same processing as the above-mentioned step 409 is performed.

At step 513, rotation of the filter 84 is controlled by the compensation computation circuit 83h' so that the filter 84 is rotated by 180 degrees, the light beam is converted into the parallel light beam by the collimator lens 81 and it is incident to the second penetration range 84b.

Thereby, in the filter 84, only the second light beam passes through it, and the second light beam is received by the light-receiving component 82 for detection.

From each partial light-receiving component which constitutes the light-receiving component 82 for detection, the signal according to the amount of the received light is outputted to the measurement control-device 83'.

In the measurement control-device 83', the signal SPx and signal SPy are computed as in the previous preferred embodiment.

At steps 515-521, the same processing as the above-mentioned steps 413-419 is performed.

The location compensation processing of the angle-of-divergence adjustment lens 70 by the measurement control-device 83' is thus completed.

At step 523, the collimator lens 81, the filter 84, and the light-receiving component 82 for detection are removed from the optical path. The drive unit 88 is also removed from the angle-of-divergence adjustment lens 70.

At step 525, the same processing as the above-mentioned step 423 is performed, and the manufacture of the optical-pickup-device 23A is completed.

At this time, the optical system, the light source unit 51, and the photodetector 59 are attached by the ideal location relation.

In this preferred embodiment, the information acquisition process of the manufacture approach concerning the present invention is carried out by the processing of steps 503-517, and the compensation process is carried out by the processing of steps 519 and 521.

Moreover, in the optical-disk-drive 20A of this preferred embodiment, the processing is realized like the preferred embodiment of FIG. 24 by the reproduction signal processing circuit 28 and the program performed by the CPU 40, and the recording processing and the reproduction processing are performed as in the preferred embodiment of FIG. 24.

Figure 31:
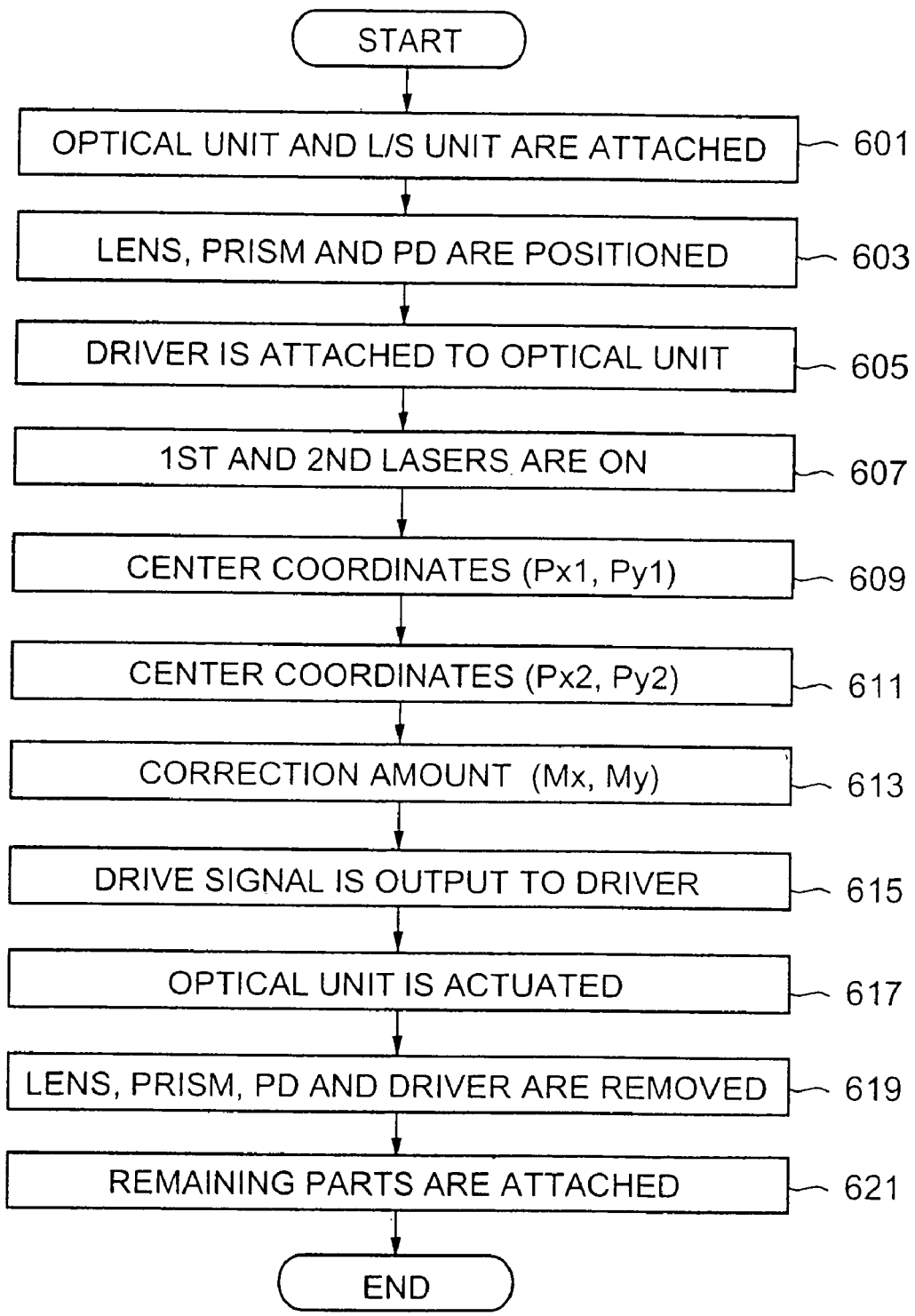
FIG. 31 is a flowchart for explaining a method of manufacture of the optical pickup device of another preferred embodiment of the present invention.

The preferred embodiment of FIG. 31 is characterized by using the dichroic prism as a branch optical element for separating the first light beam and the second light beam while controlling the first semiconductor laser 51a and second semiconductor laser 51b to emit light simultaneously in the case of location compensation processing of the angle-of-divergence adjustment lens 70.

In addition, the composition of the optical pickup device and the optical disk drive etc. is the same as that of the preferred embodiment of FIG. 24.

Therefore, the explanation shall be omitted while using the sign same about the component equivalent to the first preferred embodiment mentioned above while explaining focusing on difference with the preferred embodiment of FIG. 24 below.

The procedure of manufacturing optical-pickup-device 23A in this preferred embodiment is shown to FIG. 31 by the flow chart.

At step 601, the same processing as the above-mentioned step 401 is performed.

At step 603, the collimator lens 81 is first stationed like the above-mentioned step 403.

Figure 32A:
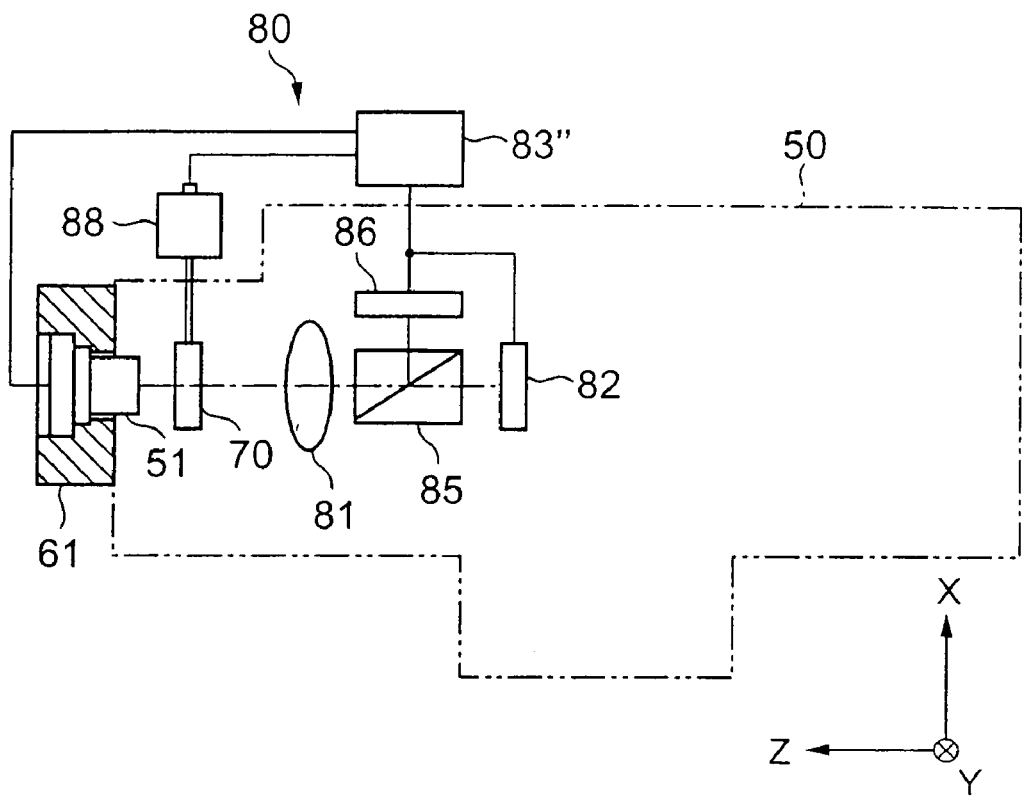
FIG. 32A and FIG. 32B are diagrams for explaining a photodetector in the optical pickup device of the preferred embodiment.

Next, as shown in FIG. 32A, the dichroic prism 85 is arranged to the −Z plane of the collimator lens 81.

The first light beam is made into the parallel light beam by the collimator lens 81 and it passes through the dichroic prism 85, and the second light beam is set up so that it may be reflected in the direction of +X by the dichroic prism 85.

The light-receiving component 82 for detection for receiving the first light beam through the dichroic prism 85 is arranged to the −Z plane of the dichroic prism 85, and the light-receiving component 86 for detection as the second position transducer for receiving the second light beam reflected in the direction of +X by the dichroic prism 85 is arranged to the +X plane of the dichroic prism 85.

Each light-receiving component for detection is arranged through the slide guide of the shape of the U character formed in the housing in the predetermined location, respectively.

Figure 32B:
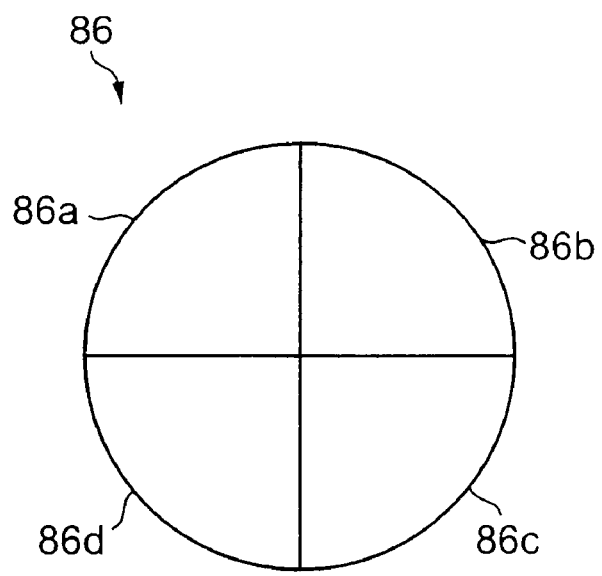

As a light-receiving component 86 for detection, as shown in FIG. 32B, the four-division light-receiving components (the first light-receiving component 86a, the second light-receiving component 86b, the third light-receiving component 86c, and the fourth light-receiving component 86d) as well as the light-receiving component 82 for detection is used.

As shown in FIG. 32A, measurement control-device 83" is connected to the optical element 82 for detection, and the optical element 86 for detection.

Figure 33:
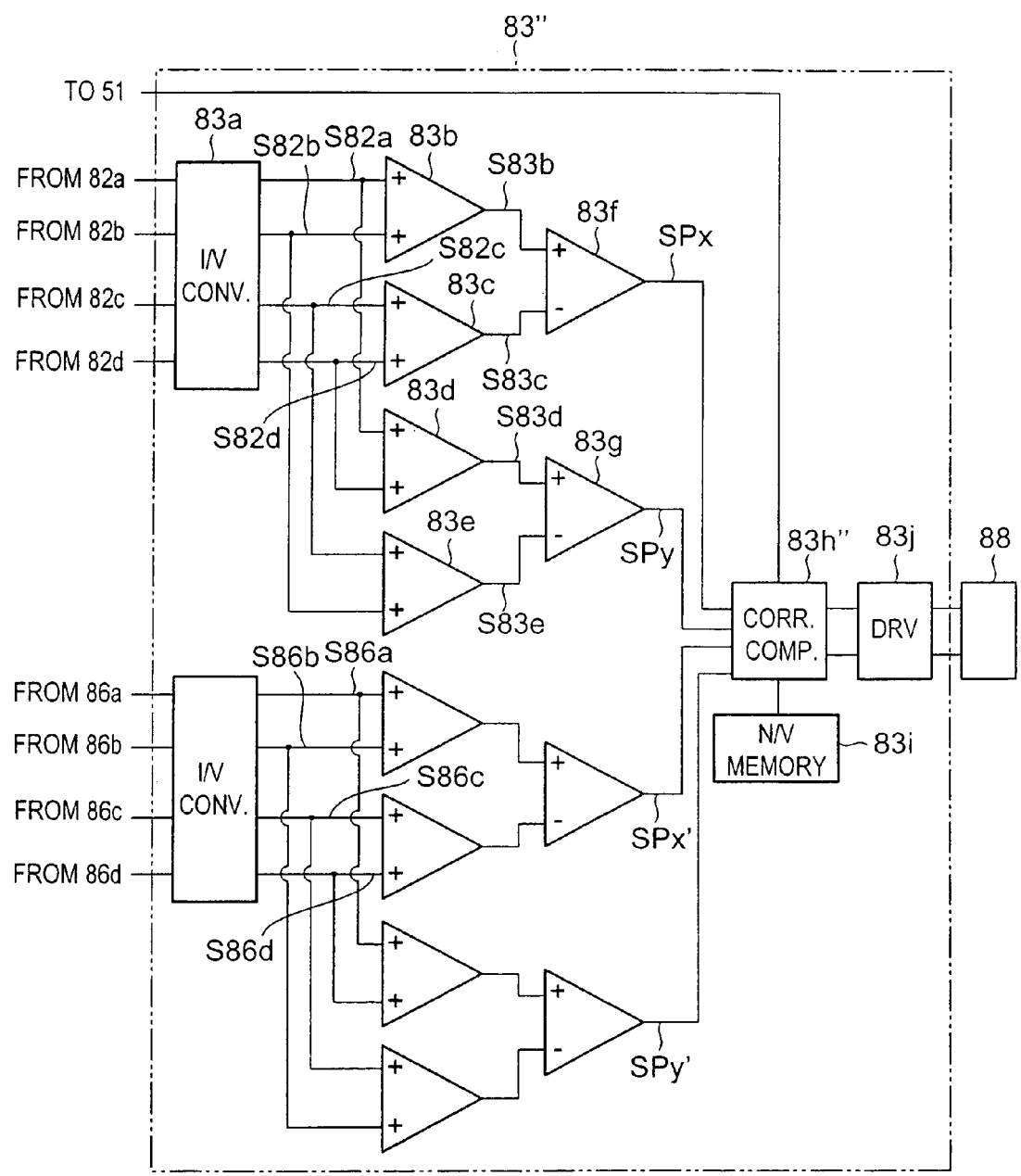
FIG. 33 is a diagram showing the detection control device in the optical pickup device of the preferred embodiment.

As the above-mentioned measurement control-device 83" is shown in FIG. 33, the adder and the subtractor from which signal SPy' is obtained for signal SPx' based on the following formula (8) based on the following formula (7) are added.

The signal S86a is the electrical-potential-difference signal which changed the output signal of the first light-receiving component 86a.

The signal S86b is the electrical-potential-difference signal which changed the output signal of the second light-receiving component 86b, signal S86c is the electrical-potential-difference signal which changed the output signal of the third light-receiving component 86c, and signal S86d is the electrical-potential-difference signal which changed the output signal of the fourth light-receiving component 86d.

The signal SPx' and signal SPy' are outputted to the compensation computation circuit 83h" with the signal SPx and signal SPy.

$$SPx'=(S86a+S86b)-(S86c+S86d) \quad (7)$$

$$SPy'=(S86a+S86d)-(S86b+S86c) \quad (8)$$

Other composition is the same as that of the measurement control device 83.

The explanation is omitted while using the same reference numeral for the below about the component equivalent to the measurement control device 83.

At step 605, the same processing as the above-mentioned step 405 is performed.

And location compensation of the angle-of-divergence adjustment lens 70 is directed to the measurement control-device 83".

Thereby, in the measurement control-device 83", location compensation processing of the following steps 607-617 is performed.

At step 607, the first semiconductor laser 51a and second semiconductor laser 51b are made the ON state by the compensation computation circuit 83h", and the first light beam and second light beam are output from the light source unit 51.

After the angle of divergence is expanded in negative-meniscus-lens 70a, the first light beam is incident to the filter 84 through the collimator lens 81.

After the angle of divergence is reduced in positive-meniscus-lens 70b, incidence of the second light beam is carried out to the dichroic prism 85 through the collimator lens 81.

The first light beam through the dichroic prism 85 is received with the light-receiving component 82 for detection.

From each partial light-receiving component which constitutes the light-receiving component 82 for detection, the signal according to the amount of the received light is outputted to the measurement control-device 83".

In the measurement control-device 83", the signal SPx and signal SPy are computed like the first preferred embodiment of the above.

The second light beam reflected by the dichroic prism 85 is received with the light-receiving component 86 for detection.

From each partial light-receiving component which constitutes the light-receiving component 86 for detection, the signal according to the amount of the received light is outputted to measurement control-device 83".

In the measurement control-device 83", the signal SPx' and signal SPy' are computed as mentioned above.

At step 609, the coordinates (Px1, Py1) of the intensity center position of the first light beam are computed by the compensation computation circuit 83h" based on the signal SPx and signal SPy.

At step 611, the coordinates (Px2, Py2) of the intensity center location of the second light beam are computed by the compensation computation circuit 83h" based on the signal SPx' and signal SPy'.

At steps 613-617, the same processing as the above-mentioned steps 415-419 is performed.

And location compensation processing of the angle-of-divergence adjustment lens 70 by the measurement control-device 83" is completed.

At step 619, the collimator lens 81, the dichroic prism 85, and the light-receiving components 82 and 86 for detection are removed from the optical path.

Moreover, the drive unit 88 is also removed from the angle-of-divergence adjustment lens 70.

At step 621, the same processing as the above-mentioned step 423 is performed, and the manufacture of the optical-pickup-device 23A is completed.

At this time, the optical system, the light source unit 51, and the photodetector 59 are attached by the ideal location relation.

In this preferred embodiment, the information acquisition process of the manufacture approach concerning the present invention is carried out by the processing of steps 603-613, and the compensation process is carried out by processing of steps 615 and step 617.

Moreover, in the optical-disk-drive 20A of this preferred embodiment, the processing is realized like the preferred embodiment of FIG. 24 by the reproduction signal processing circuit 28 and the program performed by the CPU 40, and recording processing and reproduction are performed like the preferred embodiment of FIG. 24.

As explained above, according to the manufacture approach of the optical pickup device concerning the present invention, the deviation of the outgoing direction of each of the light beams output from the plurality of light sources can be corrected with sufficient accuracy.

Moreover, according to the optical pickup device of the present invention, generating of the wavefront aberration resulting from the deviation of the outgoing direction of each of the light beams output from the plurality of light sources, and the reduction of optical efficiency can be controlled.

According to the optical disk drive concerning the present invention, it can respond to two or more kinds of information storage mediums, and it is stabilized with sufficient accuracy and access at the high speed to each information storage medium can be performed.

Figure 34:
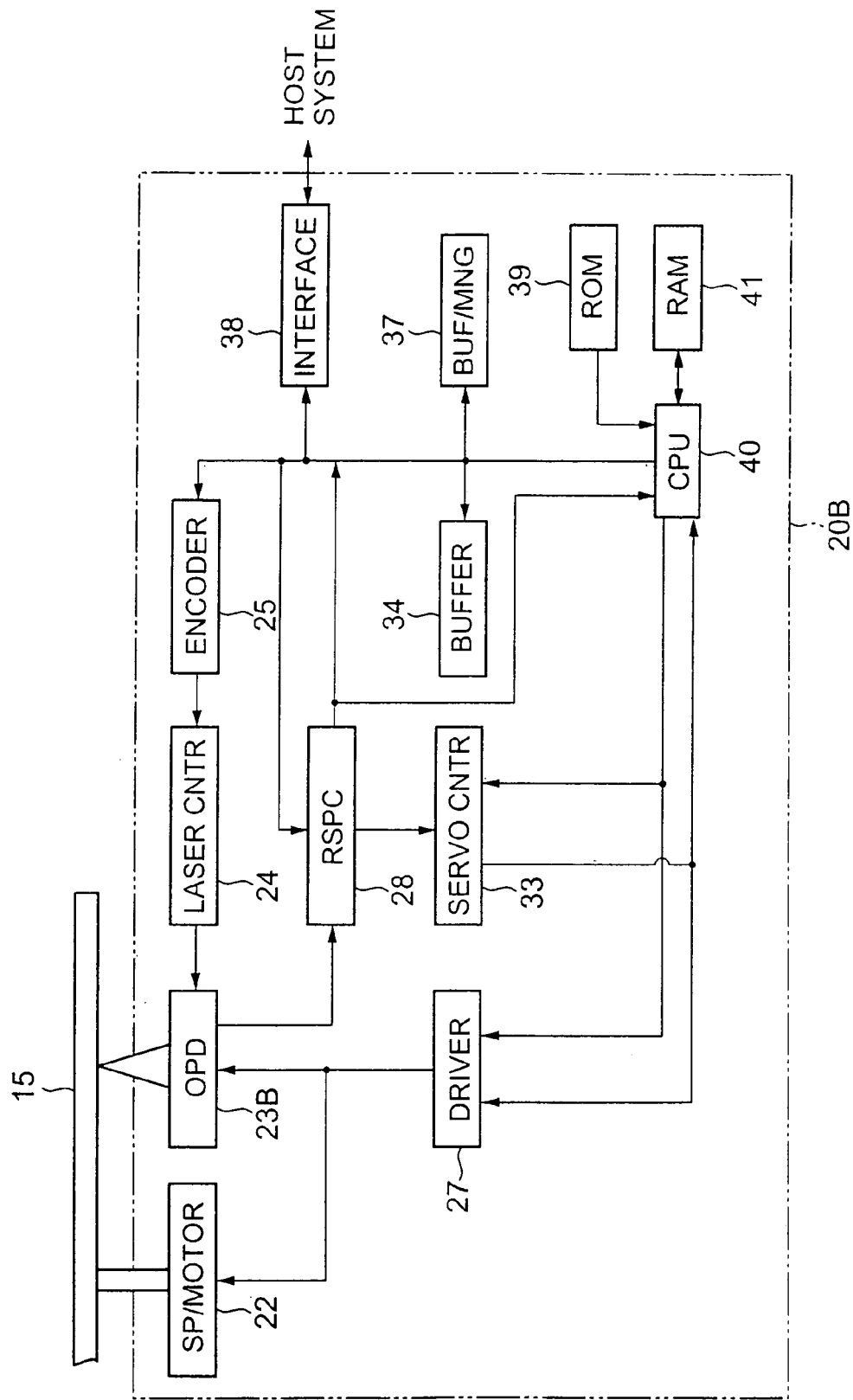
FIG. 34 is a block diagram of the optical disk drive in another preferred embodiment of the present invention.

Next, FIG. 34 shows the composition of the optical disk drive in another preferred embodiment of the present invention in which the optical pickup device of another preferred embodiment is provided.

The optical disk drive 20B in FIG. 34 comprises the spindle motor 22 for carrying out the rotation drive of the optical disk 15 as an information storage medium, the optical pickup device 23B, the laser control circuit 24, the encoder 25, the driver 27, the reproduction signal processing circuit 28, the servo controller 33, the buffer RAM 34, the buffer manager 37, the interface 38, the ROM 39, the CPU 40, the RAM 41, etc.

Moreover, in this preferred embodiment, the optical disk drive 20B can respond to the two kinds of optical disks, CD and DVD.

The optical pickup device 23B is provided for receiving the received light from the recording surface and for irradiating laser light to the recording surface of the optical disk 15 in which the tracks in the spiral or concentric formation are formed.

The reproduction signal processing circuit 28 of FIG. 34 converts into the electrical-potential-difference signal the current signal which is the output signal of the optical pickup device 23B, and detects the wobble signal, the RF signal, the servo signal (the focusing error signal, tracking error signal), etc. based on this electrical-potential-difference signal.

The reproduction signal processing circuit 28 extracts address information, the synchronizing signal, etc. from the wobble signal.

The address information extracted here is outputted to the CPU 40, and the synchronizing signal is outputted to the encoder 25.

Furthermore, after the reproduction signal processing circuit 28 performs error-correction processing etc. to RF signal, it is stored in the buffer RAM 34 through the buffer manager 37.

Moreover, the servo signal is outputted to the servo controller 33 from the reproduction signal processing circuit 28.

The servo controller 33 generates the control signal which controls the optical pickup device 23B based on the servo signal, and outputs it to the driver 27.

The buffer manager 37 will notify to the CPU 40, if I/O of the data to the buffer RAM 34 is managed and the accumulated amount of data becomes the predetermined value.

The driver 27 controls the optical pickup device 23B and the spindle motor 22 based on directions of the control signal from the servo controller 33, and the CPU 40.

The encoder 25 takes out the data accumulated at the buffer RAM 34 through the buffer manager 37 based on directions of the CPU 40, performs addition of the error correction code etc., and creates the write-in signal to the optical disk 15.

The encoder 25 outputs the write-in signal to the laser control circuit 24 synchronizing with the synchronizing signal from the reproduction signal processing circuit 28 based on the directions from the CPU 40.

The laser control circuit 24 controls the laser light output from the optical pickup device 23B based on the write-in signal from the encoder 25.

In addition, the laser control circuit 24 makes the control object one side of the two light sources of the optical pickup device 23B later mentioned based on directions of the CPU 40.

The interface 38 is the bi-directional communication interface with the host (for example, personal computer), and is based on the standard interfaces, such as ATAPI (AT Attachment Packet Interface) and SCSI (Small Computer System Interface).

The program described in code decipherable by the CPU 40 is stored in the ROM 39.

And the CPU 40 temporarily stores the data required for control in the RAM 41 while controlling operation of each part of the above according to the program stored in the ROM 39.

Next, the composition of the above-mentioned optical pickup device 23B will be explained with based on FIG. 35A and FIG. 35B.

Figure 35A:
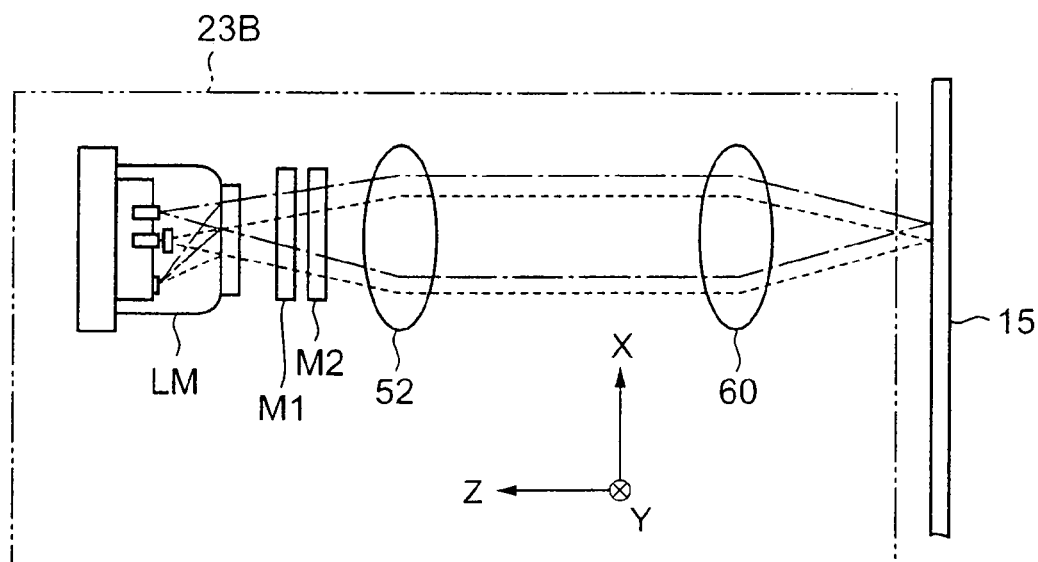
FIG. 35A and FIG. 35B are diagrams showing the composition of the optical pickup device of FIG. 34.

The optical pickup device 23B outputs the laser light whose wavelength is 660 nm or the laser light whose wavelength is 785 nm alternatively, as shown in FIG. 35A.

The optical pickup device 23B comprises the optical module LM which receives the return light beam from the recording surface of the optical disk 15, the first angle-of-divergence adjustment component M1, the second angle-of-divergence adjustment component M2, the coupling lens 52, the object lens 60, and the drive system (the focusing actuator, the tracking actuator, and seeking motor).

The optical module LM comprises the light-emission portion EL and the light-receiving portion RL as shown in FIG. 35 B.

The light-emission portion EL comprises the first semiconductor laser 53 which outputs the laser light whose wavelength is 660 nm, and the second semiconductor laser 54 which outputs the laser light whose wavelength is 785 nm.

The light-receiving portion RL comprises the light-receiving component 59 as a photodetector which branched by the hologram 61 as a branch optical element which branches the return light beam from the recording surface of the optical disk 15, and the hologram 61 and which returns and receives the light beam.

The first semiconductor laser 53 is chosen when the optical disk 15 is DVD, and the second semiconductor laser 54 is chosen when the optical disk 15 is CD.

Let the outgoing direction of maximum intensity of the light beam output from each semiconductor laser be the −Z direction in this preferred embodiment.

Figure 36:
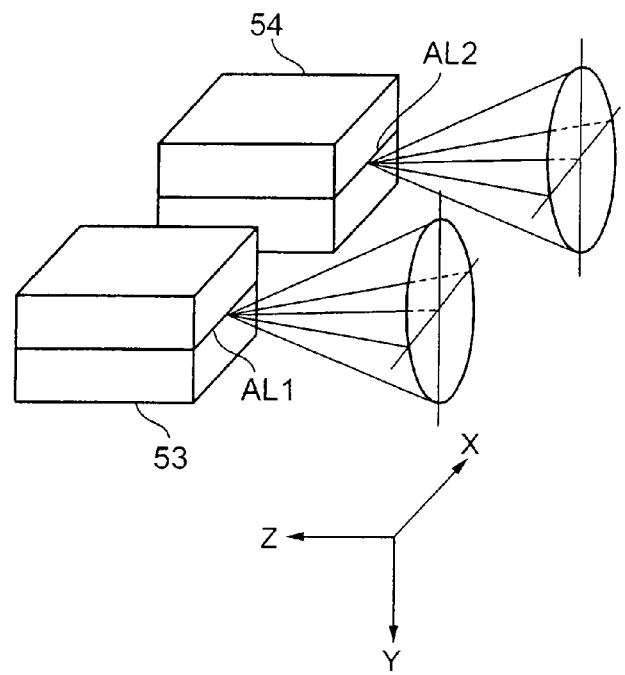
FIG. 36 is a diagram for explaining the configuration of light beams output from the first semiconductor laser and the second semiconductor laser.

In this preferred embodiment, as shown in FIG. 36, the first semiconductor laser 53 and the second semiconductor laser 54 are arranged so that the activation layers AL1 and AL2 may become parallel to XZ plane.

Therefore, the light beam output from each semiconductor laser is divergence light with the optical intensity distribution of the ellipse form which makes Y-axis direction the direction of the transverse.

Figure 37A:
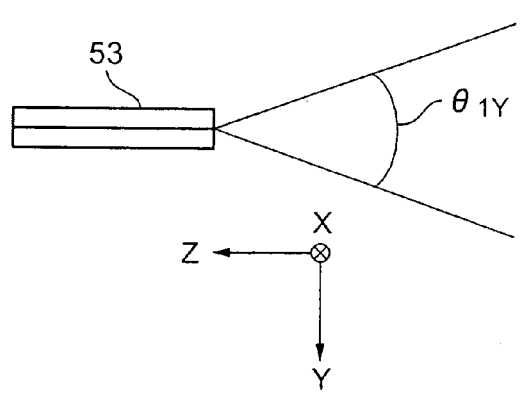
FIG. 37A and FIG. 37B are diagrams for explaining the angle of divergence of the light beam output from the first semiconductor laser.
Figure 37B:
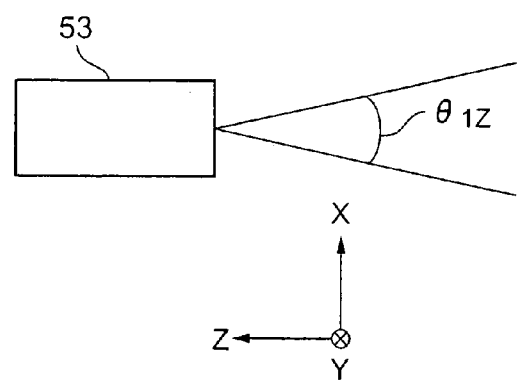

The light beam (the first outgoing beam) with the angle of divergence θ1Y in YZ plane and the angle of divergence θ1Z in XZ plane, output from the first semiconductor laser 53, has the relation of θ1Y>θ1Z, rather than is the same, as shown in FIG. 37A and FIG. 37B.

Figures 38A, 38B:
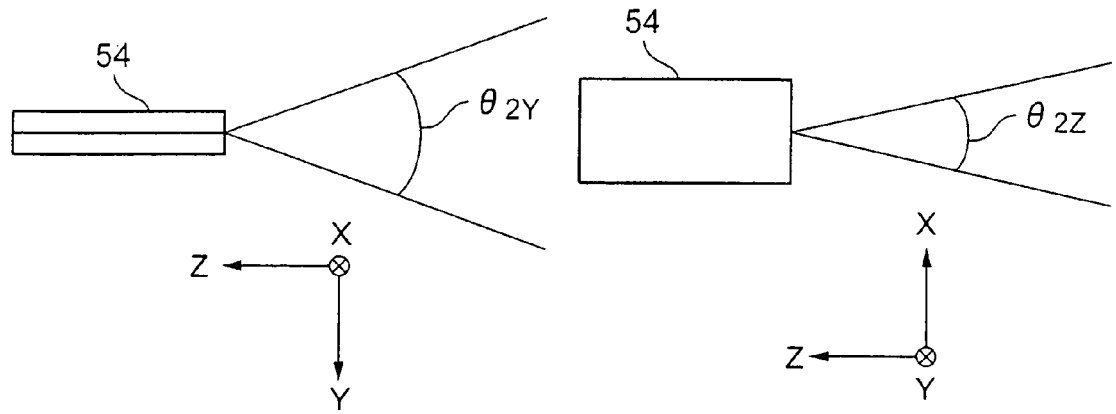
FIG. 38A and FIG. 38B are diagrams for explaining the angle of divergence of the light beam output from the second semiconductor laser.

Similarly, the light beam (the second outgoing beam) with the angle of divergence θ2Y in YZ plane and the angle of divergence θ2Z in XZ plane, output from the second semiconductor laser 54, has the relation of θ2Y>θ2Z, rather than is the same, as shown in FIG. 38A and FIG. 38B.

Figure 35B:
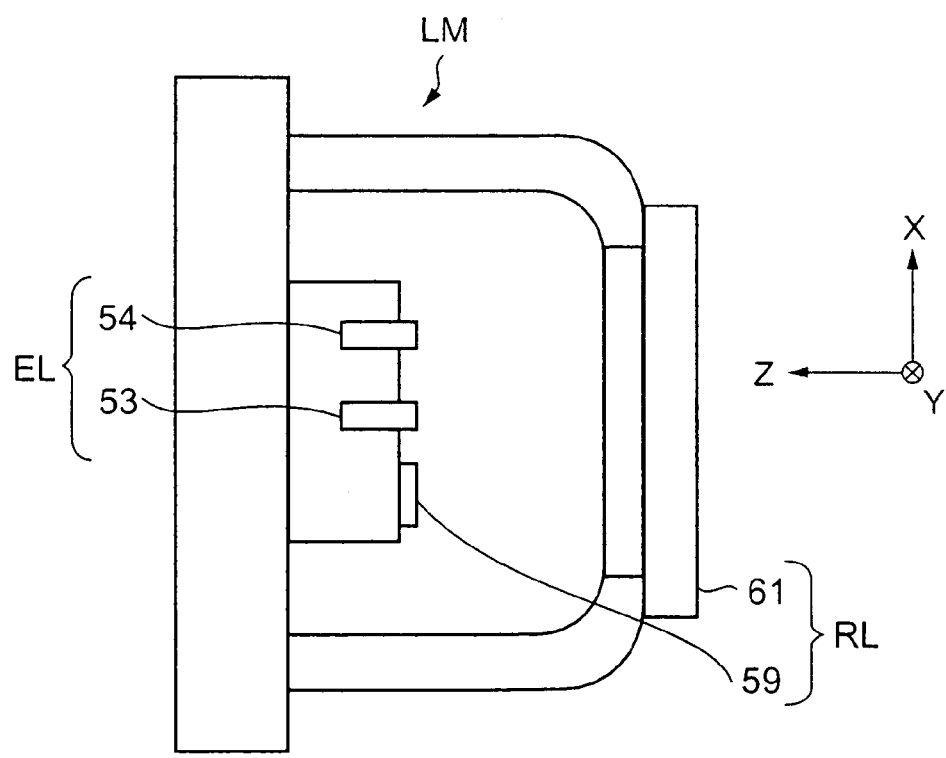

Referring to FIG. 35B, the above-mentioned hologram 61 fixed to the output aperture is arranged at the −Z plane of each semiconductor laser.

The photodetector 59 contains two or more light-receiving components which output the optimal signal for detecting the wobble signal, the reproduction signal, and the servo signal.

Referring to FIG. 35A, the angle-of-divergence adjustment component M1 of the first is arranged at the −Z plane of the optical module LM.

The first angle-of-divergence adjustment component M1 has wavelength-selection nature, and adjusts the angle of divergence of the first outgoing beam alternatively.

The angle-of-divergence adjustment component M2 of the second is arranged at the −Z plane of the first angle-of-divergence adjustment component M1.

This second angle-of-divergence adjustment component M2 has wavelength-selection nature, and adjusts the angle of divergence of the second outgoing beam alternatively.

As the first angle-of-divergence adjustment component M1 and the second angle-of-divergence adjustment component M2, the optical element using the ingredient from which the index of refraction differs with wavelength, for example like the polymer liquid crystal is used.

Figure 39:
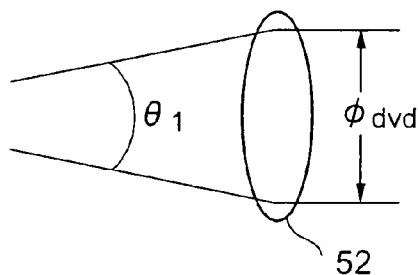
FIG. 39 is a diagram for explaining the diameter of the light beam passing through the coupling lens.

When the focal distance of the coupling lens 52 is set to fcl, the diameter of beam φdvd of the first outgoing beam through the coupling lens 52 can be calculated by the following formula (31), as shown in FIG. 39. Here, θ1 is the angle of divergence of the first outgoing beam incident to the coupling lens 52.

$$\phi dvd = 2 \times fcl \times \sin(\theta 1/2) \tag{31}$$

The diameter of beam φ cd of the second outgoing beam through the coupling lens 52 can be calculated by the following formula (32).

Here, θ2 is the angle of divergence of the second outgoing beam incident to the coupling lens 52.

$$\phi cd = 2 \times fcl \times \sin(\theta 2/2) \tag{32}$$

Figure 40:
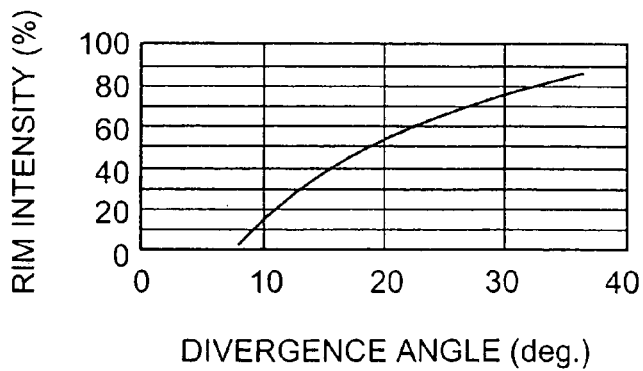
FIG. 40 is a diagram for explaining the relationship between the divergence angle and the rim intensity of the light beam incident to the coupling lens.

The rim intensity will become high, if the correlation is between the angles of divergence of the light beam and the rim intensity, which is incident to the coupling lens 52, and the angle of divergence becomes large, as shown in FIG. 40.

When designing more highly than the rim intensity in the case of CD the rim intensity in the case of DVD, it is necessary to satisfy the following formula (33).

$$\phi dvd > \phi cd \tag{33}$$

That is, it is necessary to satisfy the following formula (34).

$$\theta 1 > \theta 2 \tag{34}$$

For example, θ1 will become 7.7 degrees if the focal distance fcl of the coupling lens 52 is 11 mm in order to make the rim intensity in the case of CD into 15% (optical efficiency=about 50%) for the rim intensity in the case of DVD 30% (optical efficiency=about 45%), θ2 will become 11 degrees.

Figure 41A:
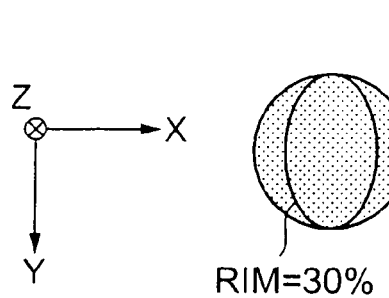
FIG. 41A and FIG. 41B are diagrams for explaining the rim intensity of the light beam received by the object lens when the angle of divergence is not adjusted.

Although the light beam Bdvd incorporated by the object lens 60 among the first outgoing beam is the rim intensity=30% mostly about Y axis direction in this preferred embodiment when there is no first angle-of-divergence adjustment component M1 as shown in FIG. 41A, about X axis direction, it shall be the rim intensity<30%.

Figure 41B:
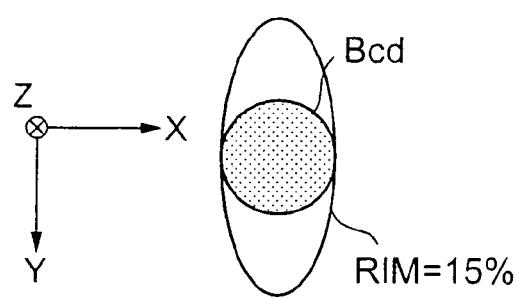

As shown in FIG. 41 B, when there is no second angle-of-divergence adjustment component M2, although the light beam Bcd incorporated by the object lens 60 among the second outgoing beam is rim intensity=15% about X axis direction, it shall be rim intensity>15% about Y axis direction.

The first angle-of-divergence adjustment component M1 doubles the angle of divergence θ1Z within XZ plane of the first outgoing beam (θ1Y/θ1Z>1).

Figure 42A:
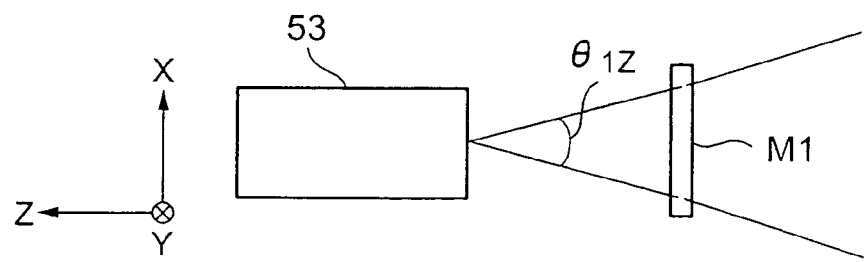
FIG. 42A and FIG. 42B are diagrams for explaining the adjustment of the divergence angle by the adjustment optical element.

Thereby, as shown in FIG. 42A, the angle of divergence within XZ plane of the first outgoing beam through the first angle-of-divergence adjustment component M1 becomes larger than the angle of divergence θ1Z, and becomes almost equal to the angle of divergence θ1Y within YZ plane.

The light beam incorporated by the object lens 60 becomes rim intensity=30% about X-axis direction.

The second angle-of-divergence adjustment component M2 doubles the angle of divergence θ2Y within YZ plane of the second outgoing beam (θ2Z/θ2Y<1).

Figure 42B:
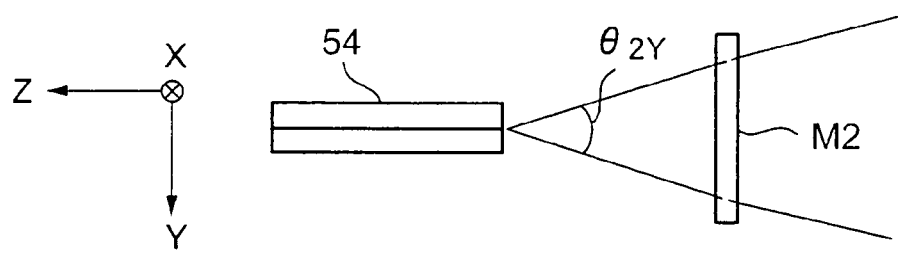

Thereby, as shown in FIG. 42 B, the angle of divergence within YZ plane of the second outgoing beam through the second angle-of-divergence adjustment component M2 becomes smaller than the angle of divergence θ2Y, and becomes almost equal to the angle of divergence θ2Z within XZ plane.

The light beam incorporated by the object lens 60 becomes the rim intensity=15% about Y-axis direction.

The coupling lens 52 is arranged at the −Z plane of the second angle-of-divergence adjustment component M2, and makes the first outgoing beam and the second outgoing beam parallel light, respectively.

The above-mentioned object lens 60 is arranged at the −Z plane of the coupling lens 52.

The object lens 60 condenses the light beam through the coupling lens 52, and forms the optical spot on the recording surface of the optical disk 15.

The action of the optical pickup device 23B constituted as mentioned above is explained.

First, the case where the optical disk 15 is DVD is explained.

The light beam output from the first semiconductor laser 53 is incident to the hologram 61.

The angle of divergence in XZ plane of the first angle-of-divergence adjustment component M1 in the light beam through the hologram 61 is expanded.

After this light beam penetrates the second angle-of-divergence adjustment component M2 as it is and serves as parallel light with the coupling lens 52, it is focused on the recording surface of the optical disk 15 as a minute spot through the object lens 60.

Let again the received light reflected in respect of record of the optical disk 15 be parallel light with the object lens 60 as a return light beam.

After this return light beam penetrates the collimator lens 52, incidence of it is carried out to the hologram 61 through the second angle-of-divergence adjustment component M2 and the first angle-of-divergence adjustment component M1.

The return light beam diffracted by the hologram 61 is received by the photodetector 59.

Each light-receiving component which constitutes the photodetector 59 outputs the current signal according to the amount of the received light to the reproduction signal processing circuit 28, respectively.

Next, the case where the optical disk 15 is CD is explained.

The light beam output from the second semiconductor laser 54 is incident to the hologram 61.

The light beam through the hologram 61 penetrates the first angle-of-divergence adjustment component M1 as it is, and it carries out incidence to the second angle-of-divergence adjustment component M2.

After the angle of divergence in YZ plane is reduced with the second angle-of-divergence adjustment component M2 and this light beam serves as parallel light with the coupling lens 52, it is focused on the recording surface of the optical disk 15 as a minute spot through the object lens 60.

Let again the received light reflected in respect of record of the optical disk 15 be parallel light with the object lens 60 as a return light beam.

After this return light beam penetrates the collimator lens 52, incidence of it is carried out to the hologram 61 through the second angle-of-divergence adjustment component M2 and the first angle-of-divergence adjustment component M1.

The return light beam diffracted by the hologram 61 is received by the photodetector 59.

Each light-receiving component which constitutes the photodetector 59 outputs the current signal according to the amount of the received light to the reproduction signal processing circuit 28, respectively.

It can be distinguished from the intensity of the received light from the optical disk whether the optical disk 15 is CD or DVD.

Usually, this distinction is performed when the optical disk 15 is intercalated in the predetermined location of the optical disk drive 20B (at the time of loading).

It is also possible to distinguish the kind of optical disk 15 based on TOC (Table Of Contents) information, PMA (Program Memory Area) information, the wobble signal, etc. which are beforehand recorded on the optical disk 15.

The distinction result is notified to the laser control circuit 24, and either the first semiconductor laser 53 and the second semiconductor laser 54 are chosen by the laser control circuit 24.

Next, processing operation in the case of recording data on the optical disk 15 is briefly explained using the above-mentioned optical disk drive 20B.

In addition, selection of the semiconductor laser shall already have been performed.

The CPU 40 notifies the purport that the command of the record request is received from the host to the reproduction signal processing circuit 28 while outputting the control signal for controlling rotation of the spindle motor 22 based on the record rate to the driver 27, if the command of the record request is received from the host system.

The CPU 40 accumulates the data received from the host to the buffer RAM 34 through the buffer manager 37.

If rotation of the optical disk 15 reaches the predetermined linear velocity, based on the output signal of the photodetector 59, the reproduction signal processing circuit 28 will detect the tracking error signal and the focusing error signal, and will output them to the servo controller 33.

In the servo controller 33, the tracking actuator and focusing actuator of the optical pickup device 23B are driven through the driver 27 based on the tracking error signal and focusing error signal from the reproduction signal processing circuit 28.

The track gap and the focal gap are corrected.

The reproduction signal processing circuit 28 acquires address information based on the output signal of the photodetector 59, and notifies it to the CPU 40.

The CPU 40 outputs the specified control signal which controls the seeking motor of the optical pickup device 23B so that it writes in and the optical pickup device 23B is located in the start point to the driver 27 based on the address information.

If the notice that the amount of data accumulated from the buffer manager 37 at the buffer RAM 34 exceeded the predetermined value is received, the CPU 40 is written in the encoder 25 and directs creation of the signal.

If the CPU 40 determines that the location of the optical pickup device 23B writes in based on address information, and it is the start point, it will be notified to the encoder 25.

The encoder 25 records the write-in signal on the optical disk 15 through the laser control circuit 24 and the optical pickup device 23B.

Next, processing operation in the case of reproducing the data currently recorded on the optical disk 15 using the optical disk drive 20B mentioned above is explained briefly.

In addition, selection of the semiconductor laser shall be carried out as described above, and shall already have been performed.

The CPU 40 notifies the purport that the command of the reproduction request is received from the host to the reproduction signal processing circuit 28 while outputting the control signal for controlling rotation of the spindle motor 22 based on the reproduction rate to the driver 27, if the command of the reproduction request is received from the host system.

If rotation of the optical disk 15 reaches the predetermined linear velocity, tracking control and focal control of the object lens 60 will be performed like the case of the above-mentioned record processing.

Like the case of the above-mentioned record processing, the reproduction signal processing circuit 28 detects address information, and notifies it to the CPU 40.

The CPU 40 outputs the specified control signal which controls the seeking motor so that it reads and the optical pickup device 23B is located in the start point to the driver 27 based on address information.

If the CPU 40 determines that the location of the optical pickup device 23B reads and it is the start point based on address information, it will be notified to the reproduction signal processing circuit 28.

After the reproduction signal processing circuit 28 detects RF signal based on the output signal of the optical pickup device 23B and performs error-correction processing etc., it is accumulated to the buffer RAM 34.

The buffer manager 37 transmits to the host through the interface 38, when the reproduction data accumulated at the buffer RAM 34 are assembled as sector data.

In addition, as mentioned above, the reproduction signal processing circuit 28 detects the focusing error signal and the tracking error signal based on the output signal from the optical pickup device 23B, and corrects the focal gap and the track gap at any time through the servo controller 33 and the driver 27, until record processing and the regeneration are completed.

In the optical disk drive concerning this preferred embodiment, the processor is realized by the program performed by the reproduction signal processing circuit 28, the CPU 40, and this the CPU 40 so that clearly from the above explanation.

However, the present invention is not limited to this example.

It is appropriate also to constitute a part of the composition realized by the processing according to the program by the CPU 40 by hardware. Or it is appropriate also to constitute all the composition by hardware.

As explained above, according to the optical pickup device concerning this preferred embodiment, the angle of divergence θ1Z within XZ plane of the light beam output from the first semiconductor laser 53 is expanded twice (θ1Y/θ1Z>1) using the first angle-of-divergence adjustment component M1.

The light beam incorporated by the object lens 60 among the light beams which are output from the first semiconductor laser 53 becomes rim intensity=30% mostly also about X axis direction.

Therefore, it is possible to form the optimal optical spot for DVD on the recording surface thereof.

According to this preferred embodiment, the angle of divergence θ2Y within YZ plane of the light beam output from the second semiconductor laser 54 is reduced twice (θ2Z/θ2Y<1) using the second angle-of-divergence adjustment component M2.

The light beam incorporated by the object lens 60 among the light beams which are output from the second semiconductor laser 54 becomes rim intensity=15% mostly also about Y axis direction.

Therefore, most light beams which are output from the second semiconductor laser 54 will be incorporated by the object lens 60, and it becomes possible to raise optical efficiency of it.

Therefore, it is possible to form the optimal optical spot for CD in the recording surface thereof, and this can respond to improvement in the speed of the access rate.

Since the light beam by which incidence is carried out to the coupling lens 52 has the optimal optical intensity distribution for the wavelength according to this preferred embodiment, the light beam incorporated by the object lens 60 can secure the optimal rim intensity for the wavelength.

Therefore, without causing enlargement and high cost, it can respond to two or more kinds of optical disks, and the optimal optical spot for each optical disk can be formed on the recording surface thereof.

According to this preferred embodiment, since the optical intensity distribution serves as the circle configuration mostly, the light beam through the coupling lens 52 can become possible [extracting the light beam to the diameter of the beam mostly made into the ideal], and can raise optical efficiency further.

According to this preferred embodiment, since the first angle-of-divergence adjustment component and the second angle-of-divergence adjustment component are arranged between the hologram and the coupling lens, the thing which diffracted by the hologram and which it returns and interferes in the light beam with the first angle-of-divergence adjustment component and the second angle-of-divergence adjustment component can be prevented.

Therefore, it becomes possible to stabilize the signal outputted from the photodetector.

According to the optical disk drive of this preferred embodiment, the optimal optical spot can be formed on the recording surface of each optical disk (DVD and CD), and it is possible to stably perform recording and reproduction of exact information. Furthermore, the miniaturization of the optical disk drive itself can also be promoted by the miniaturization of the optical pickup device 23.

For example, when used as a portable device, carrying the optical pickup device of the present invention becomes easy and becomes usable for a long time.

Although the above-mentioned preferred embodiment explained the case where the first angle-of-divergence adjustment component M1 and the second angle-of-divergence adjustment component M2 are arranged individually, it is not limited to this example.

The first angle-of-divergence adjustment component M1 and the second angle-of-divergence adjustment component M2 may be unified.

The components mark at the time of attachment can decrease, attachment work and tuning can be simplified, and it becomes possible to reduce work cost.

Although the above-mentioned preferred embodiment explained the case where the first angle-of-divergence adjustment component M1 is arranged at the light source side, it is not limited to this example.

The second angle-of-divergence adjustment component M2 may be arranged at the light source side.

Although the above-mentioned preferred embodiment explained the case where the optical element (the first angle-of-divergence adjustment component M1, second angle-of-divergence adjustment component M2) which has wavelength-selection nature as an optical element for changing the angle of divergence is used, it is not limited to this example.

Figure 43A:
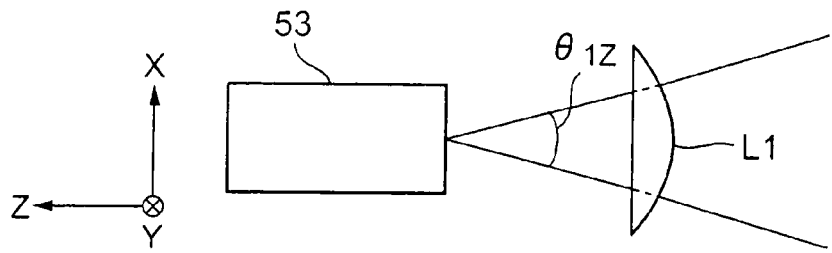
FIG. 43A and FIG. 43B are diagrams for explaining the adjustment of the divergence angle by the adjustment lens element.

As shown in FIG. 43A, it is possible to arrange the first lens L1 which changes the angle of divergence θ1Z within XZ plane twice (θ1Y/θ1Z>1) to the −Z plane of the first semiconductor laser 53.

Figure 43B:
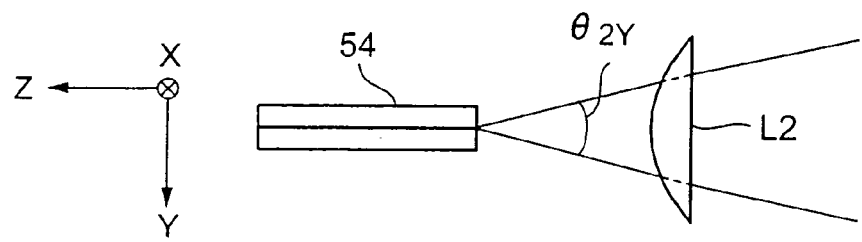

As shown in FIG. 43B, it is possible to arrange the second lens L2 which changes the angle of divergence θ2Y within YZ plane twice (θ2Z/θ2Y<1) to the −Z plane of the second semiconductor laser 54.

Figure 44:
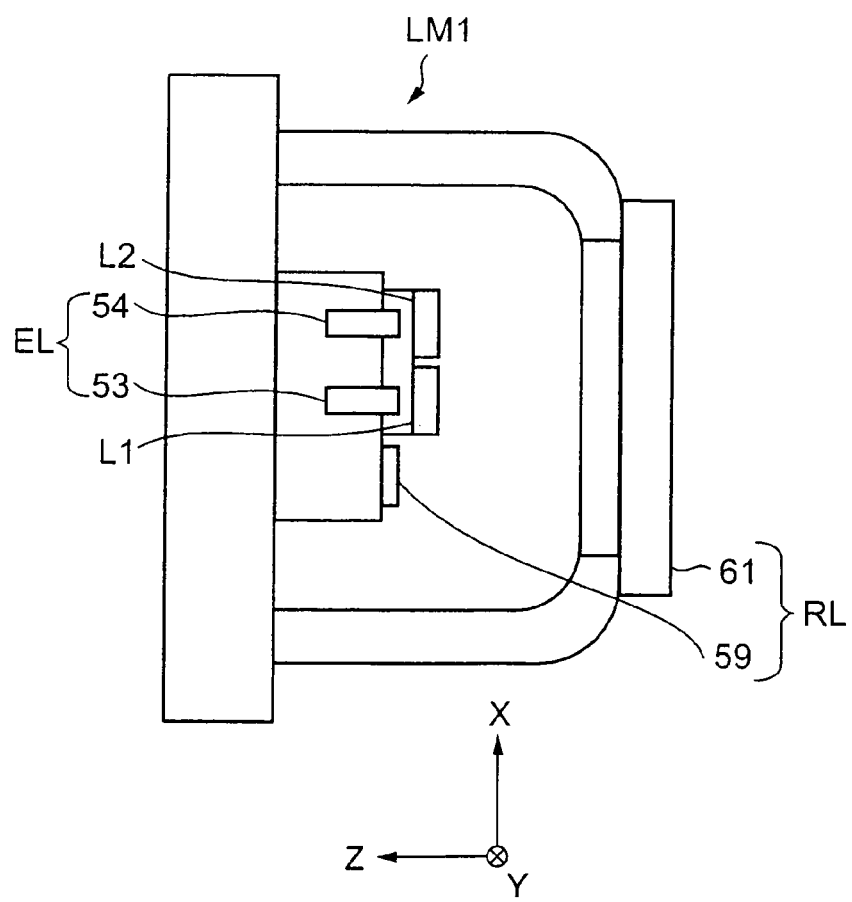
FIG. 44 is a diagram showing the composition of the optical module in which the first lens and the second lens are incorporated.

In this case, as shown in FIG. 44, the first lens L1 and the second lens L2 may be mounted in the optical module LM1, respectively.

Figure 45:
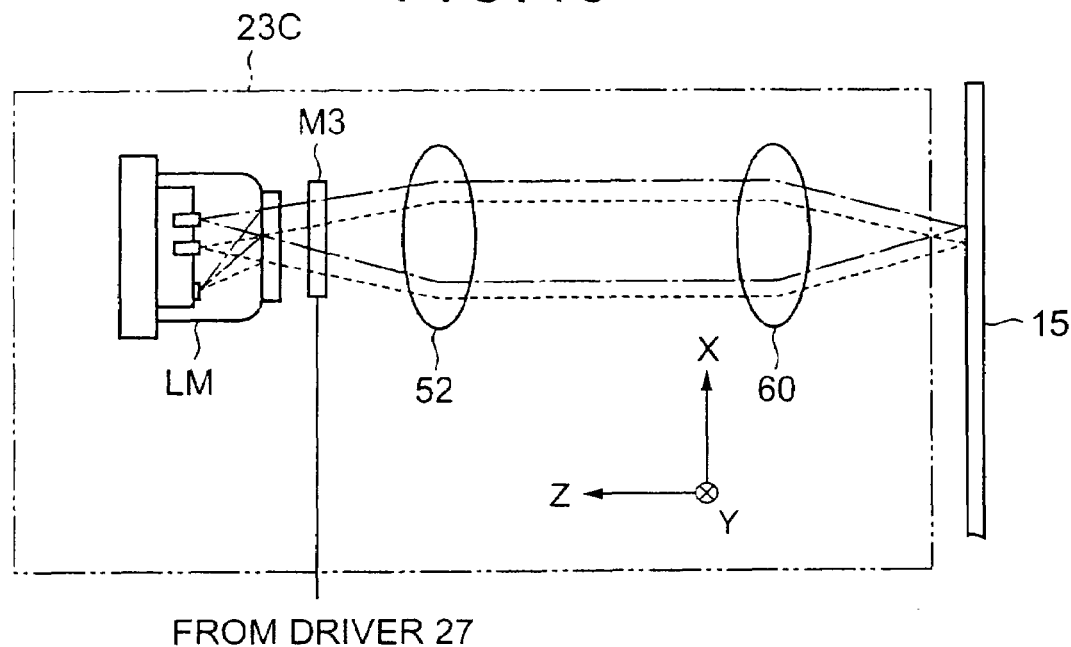
FIG. 45 is a diagram showing the composition of the optical pickup device in another preferred embodiment of the present invention.

Instead of the first angle-of-divergence adjustment component M1 and the second angle-of-divergence adjustment component M2, as shown in FIG. 45, it is possible to use the third angle-of-divergence adjustment component M3 which can control the amount of adjustments of the angle of divergence by the supply voltage.

Figure 46A:
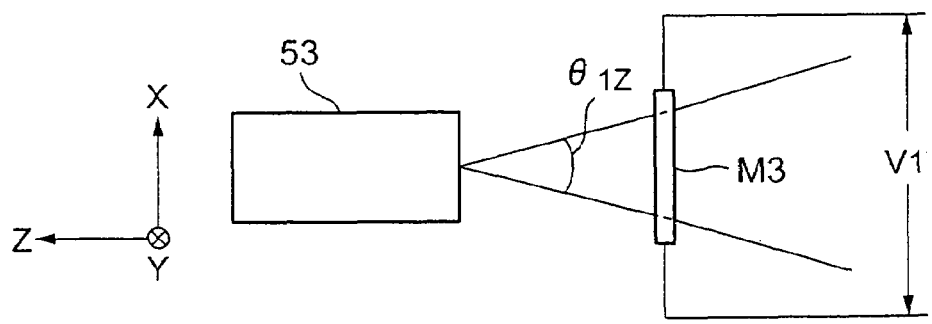
FIG. 46A and FIG. 46B are diagrams for explaining the adjustment of the divergence angle by the third adjustment optical element.
Figure 46B:
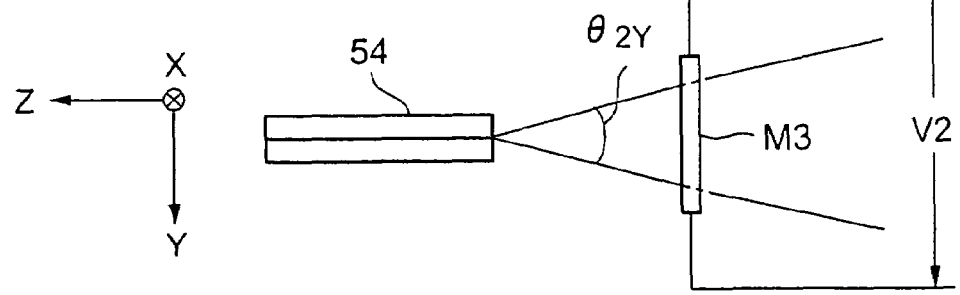

When the optical disk is DVD, as shown in FIG. 46 A, the electrical potential difference V1 is impressed to the third angle-of-divergence adjustment component M3 through the driver 27 by directions of the CPU 40, and the angle of divergence $\theta 1Z$ within XZ plane is expanded twice ($\theta 1Y/\theta 1Z>1$).

When the optical disk is CD, as shown in FIG. 46 B, the electrical potential difference V2 is impressed to the third angle-of-divergence adjustment component M3 through the driver 27 by directions of the CPU 40, and the angle of divergence $\theta 2Y$ within YZ plane is reduced twice ($\theta 2Z/\theta 2Y<1$).

As the third angle-of-divergence adjustment component M3, the crystalline-liquid lens as disclosed in Japanese Laid-Open Patent Application No. 5-54414 can be used.

Although the case where the rim intensity of Y axis direction in the light beam incorporated by the object lens 60 among the light beams which are output from the first semiconductor laser 53 is about 30% is explained by the above-mentioned preferred embodiment when there is no first angle-of-divergence adjustment component M1, it is not limited to this example.

For example, the rim intensity of Y-axis direction may be smaller than 30%.

In this case, the optical element which has the action which enlarges both the angle of divergence $\theta 1Y$ in YZ plane of the light beam output from the first semiconductor laser 53, and the angle of divergence $\theta 1Z$ in XZ plane instead of the first angle-of-divergence adjustment component M1 needs to use so that it may become the rim intensity=30% mostly about Y axis direction and X axis direction.

Although the case where the rim intensity of X axis direction in the light beam incorporated by the object lens 60 among the light beams which are output from the second semiconductor laser 54 is about 15% is explained by the above-mentioned preferred embodiment when there is no second angle-of-divergence adjustment component M2, it is not limited to this example.

For example, the rim intensity of X-axis direction may be larger than 15%.

In this case, the optical element which has the action which makes small both the angle of divergence $\theta 2Y$ in YZ plane of the light beam output from the second semiconductor laser 54, and the angle of divergence $\theta 2Z$ in XZ plane instead of the second angle-of-divergence adjustment component M2 needs to use so that it may become the rim intensity=15% mostly about Y axis direction and X axis direction.

Although the above-mentioned preferred embodiment explained the case where the second angle-of-divergence adjustment component M2 which makes small the first angle-of-divergence adjustment component M1 which enlarges the angle of divergence of the first outgoing beam, and the angle of divergence of the second outgoing beam is used, it is not limited to this example.

For example, when the optimal coupling lens for the first outgoing beam is used, the first angle-of-divergence adjustment component M1 is unnecessary.

In this case, since the amount of adjustments of the angle of divergence becomes large to the second outgoing beam, it is necessary to use the different optical element from the second angle-of-divergence adjustment component.

Moreover, when the optimal coupling lens for the second outgoing beam is used for example, the second angle-of-divergence adjustment component M2 is unnecessary.

In this case, since the amount of adjustments of the angle of divergence becomes large to the first outgoing beam, it is necessary to use the different optical element from the first angle-of-divergence adjustment component M1.

Although the above-mentioned preferred embodiment explained the case where the angle of divergence of the light beam output from each semiconductor laser is adjusted, and incidence is carried out to the coupling lens, it is not limited to this example.

When the light beam output from each semiconductor laser has satisfied the upper formula (34), it is not necessary to adjust the angle of divergence.

There may not be the first angle-of-divergence adjustment component M1 and the second angle-of-divergence adjustment component M2.

Even if it is this case, when rim intensity is greatly shifted from the value made into the ideal, it is possible to adjust the angle of divergence.

Although the above-mentioned preferred embodiment explained the case where the wavelength of the light beam output from the light source is the two kinds, the present invention is not limited to this.

Although the above-mentioned preferred embodiment explained the case where it comprises the light source which outputs the light beam whose wavelength is 660 nm, and the light source which outputs the light beam whose wavelength is 785 nm, the present invention is not limited to this.

For example, it is possible to use the light source which outputs the light beam whose wavelength is 405 nm, instead of one of the two light sources.

Although the above-mentioned preferred embodiment explained the case where the hologram is used as a branch optical element for branching the return light beam, it is not limited to this example.

For example, it is possible to use the polarization hologram.

By this, incidence of the light beam output from each semiconductor laser will be carried out to the coupling lens 52, without the quantity of light almost falling.

Therefore, high-speed access to the optical disk 15 is attained.

Moreover, since the amount of the received light in the photodetector 59 increases, the signal level and the S/N ratio of the signal which are outputted from each light-receiving component which constitutes the photodetector 59 can be raised.

In this case, the phase difference plate for giving optical phase difference like the quarter-wave plate is arranged between the coupling lens 52 and the object lens 60.

Moreover, it is possible to use the beam splitter instead of the hologram.

Although the above-mentioned preferred embodiment explained the case where the light-emission portion EL and the light-receiving portion RL unified, it is not limited to this example.

The light-emission portion EL and the light-receiving portion RL may be arranged individually, respectively.

Although the above-mentioned preferred embodiment explained the case where each semiconductor laser approached mutually and is arranged, it is not limited to this example.

Although the above-mentioned preferred embodiment explained the case where it is the divergence light in which the configuration of the light beam of are outputting from the light source has the optical intensity distribution of the ellipse form, it is not limited to this example.

It is possible to be the divergence light in which the configuration of the light beam of are outputting from the light source has the optical, almost circular intensity distribution.

Although the case where target rim intensity is 15% is explained by the above-mentioned preferred embodiment when target rim intensity is 30% when the optical disk is DVD, and the optical disk is CD, it is not limited to this example.

As for rim intensity, it is desirable that it is 10% or more, and is 70% or less.

If the rim intensity exceeds 70%, it will become difficult to secure the required quantity of light.

It is for enlarging the numerical aperture of the coupling lens, for considering as less than 10% of rim intensity, and causing the cost rise.

In the above-mentioned preferred embodiment, although the light beam output from each semiconductor laser explained the case where the angle of divergence is adjusted and the light beam is incident to the coupling lens so that the optical intensity distribution might serve as the circular configuration mostly, it is not limited to this example.

Although the above-mentioned preferred embodiment explained the case where the hologram 61 is one of the composition components of the optical module, it is not limited to this example.

It may dissociate with the optical module and the hologram 61 may be arranged.

Without causing enlargement and high cost according to the optical pickup device concerning the present invention, as explained above, it can respond to two or more kinds of information storage mediums, and is effective in the ability to form the optimal optical spot for each information storage medium.

According to the optical disk drive concerning the present invention, it can respond to two or more kinds of information storage mediums, and is effective in being stabilized and being able to perform access at the high speed.

The composition of the optical disk drive 120 of the preferred embodiment of the present invention is shown in FIG. 47.

The optical disk drive 120 shown in FIG. 47 comprises the spindle motor 22 for carrying out the rotation drive of the optical disk 15 as an information storage medium, the optical pickup device 123, the laser control circuit 24, the encoder 25, the motor driver 27, the reproduction signal processing circuit 28, the servo controller 33, the buffer RAM 34, the buffer manager 37, the interface 38, the ROM 39, the CPU 40, and the RAM 41.

In addition, the arrow in FIG. 47 does not show the flow of the typical signal or information, and does not express connection-related all of each block.

The optical pickup device 123 is equipment for receiving the received light from the recording surface of the optical disk while irradiating laser light to the recording surface of the optical disk in which the tracks in the spiral or concentric formation are formed.

The reproduction signal processing circuit 28 changes into the electrical-potential-difference signal the current signal which is the output signal of the optical pickup device 123, and detects the wobble signal, the RF signal, and the servo signal (the focusing error signal, tracking error signal) based on this electrical-potential-difference signal.

The reproduction signal processing circuit 28 extracts address information, the synchronizing signal, etc. from the wobble signal.

The extracted address information is outputted to the CPU 40 and the synchronizing signal is outputted to the encoder 25.

After the reproduction signal processing circuit 28 performs error-correction processing etc. to RF signal, it is stored in the buffer RAM 34 through the buffer manager 37.

Moreover, the servo signal is outputted to the servo controller 33 from the reproduction signal processing circuit 28.

The servo controller 33 generates the control signal which controls the optical pickup device 123 based on the servo signal, and outputs it to the motor driver 27.

The buffer manager 37 will notify to the CPU 40, if I/O of the data to the buffer RAM 34 is managed and the accumulated amount of data becomes the predetermined value.

The motor driver 27 controls the optical pickup device 123 and the spindle motor 22 based on directions of the control signal from the servo controller 33, and the CPU 40.

The encoder 25 takes out the data accumulated at the buffer RAM 34 through the buffer manager 37 based on directions of the CPU 40, performs addition of the error correction code etc., and creates the write-in data to the optical disk 15.

The encoder 25 outputs write-in data to the laser control circuit 24 synchronizing with the synchronizing signal from the reproduction signal processing circuit 28.

The laser control circuit 24 controls the output of the laser light output from the optical pickup device 123 based on directions of the write-in data from the encoder 25, and the CPU 40.

Let one side of the two light sources of the optical pickup device 123 based on directions of the CPU 40 be the control object in the laser control circuit 24.

The interface 38 is the bi-directional communication interface with the host system (for example, a personal computer), and is in conformity with the standards, such as ATAPI (AT Attachment Packet Interface) or SCSI (Small Computer System Interface).

The program described in code decipherable by the CPU 40 is stored in the ROM 39.

The CPU 40 controls operation of each part of the above according to the program stored in the ROM 39.

The CPU 40 temporarily stores the data required for control on the RAM 41.

Next, the composition of the above-mentioned optical pickup device 123 will be described with reference to FIG. 48.

Figure 48:
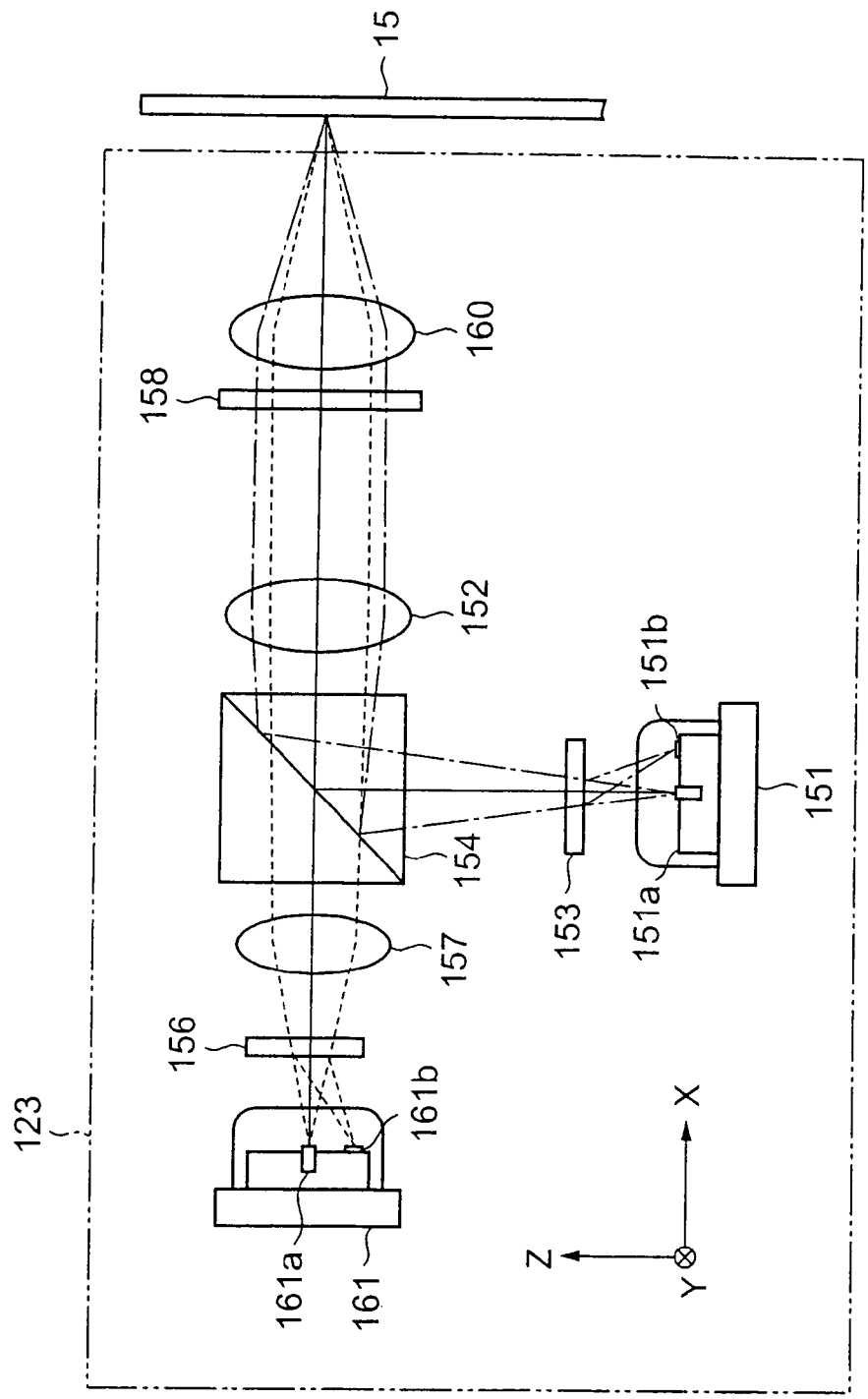
FIG. 48 is a diagram showing the composition of the optical system of the optical pickup device of FIG. 47.

The optical pickup device 123 outputs the light beam whose wavelength is 650 nm, as shown in FIG. 48. It outputs the light beam the first optical module 151 which receives the return light beam (650 nm return light beam) whose wavelength is 650 nm, and whose wavelength is 780 nm.

The second optical module 161 receives the return light beam (780 nm return light beam) whose wavelength is 780 nm. The optical pickup device 123 further includes the first hologram 153, the second hologram 156, the beam splitter 154, the collimator lens 152, the micro lens 157 as an optical element, the wavelength filter 158, the object lens 160, and the drive system (the focusing actuator, the tracking actuator, and seeking motor).

In addition, the first optical module 151 is chosen when the optical disk 15 is DVD, and the second optical module 161 is chosen when the optical disk 15 is CD.

The first optical module 151 contains first semiconductor laser 151*a* which outputs the light beam whose wavelength is 650 nm, and the first photodetector 151*b* as a photodetector which receives 650 nm return light beam.

The second optical module 161 contains the second semiconductor laser 161*a* as a light source which outputs the light beam whose wavelength is 780 nm, and the second photodetector 161b as a photodetector which receives 780 nm return light beam.

The first semiconductor laser 151a is arranged in the location which acts in the direction of +Z as the outgoing light beam, and the second semiconductor laser 161a is arranged in the location which acts in the direction of +X as the outgoing light beam.

Figure 49A:
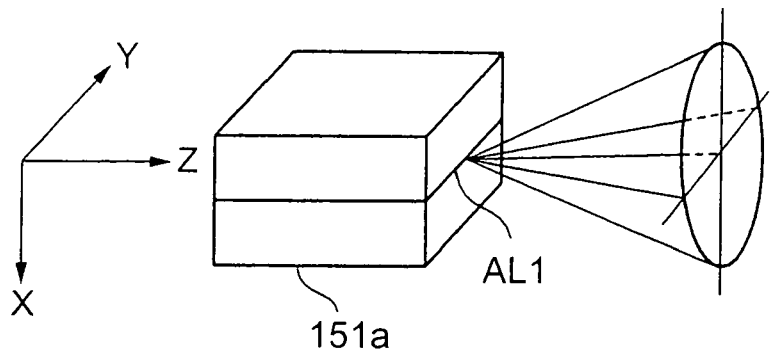
FIG. 49A and FIG. 49B are diagrams for explaining the configuration of the light beam output from each of the semiconductor lasers.

The light beam (650 nm outgoing beam) whose wave length output from the first semiconductor laser 151a is 650 nm has the elliptical intensity distribution which makes the perpendicular direction (X axis direction) the direction of the transverse to the activation layer AL1 of first semiconductor laser 151a, as shown in FIG. 49A.

Figure 49B:
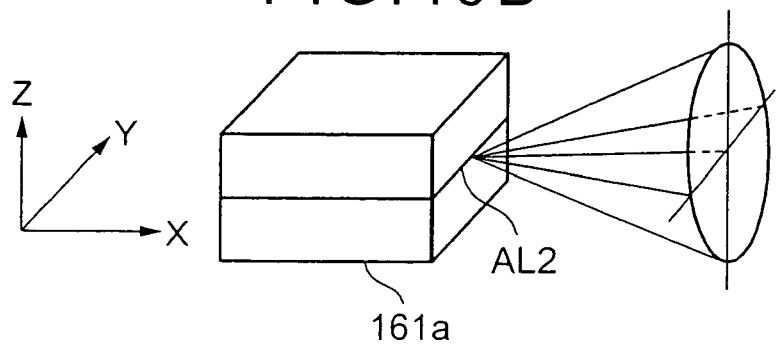

Moreover, the light beam (780 nm outgoing beam) whose wave length output from the second semiconductor laser 161a is 780 nm has the elliptical intensity distribution which makes the perpendicular direction (Z axis direction) the direction of the transverse to the activation layer AL2 of second semiconductor laser 161a, as shown in FIG. 49B.

The first hologram 153 is arranged on common 650 nm optical path length of the outgoing beam and 650 nm return light beam, and branches 650 nm return light beam in the direction of the light-receiving side of first photodetector 151b from the common optical path length.

The second hologram 156 is arranged on common 780 nm optical path length of the outgoing beam and 780 nm return light beam, and branches 780 nm return light beam in the direction of the light-receiving side of second photodetector 161b from the common optical path length.

The beam splitter 154 has high reflectivity to the light beam whose wavelength is 650 nm, comprises the dichroic mirror which has high permeability to the light beam whose wavelength is 780 nm, and is arranged at the light source side of the collimator lens 152.

The wavelength filter 158 is arranged between the collimator lens 152 and the object lens 160, and specifies the magnitude of the light beam received by the object lens 160 among the light beams output from the semiconductor lasers.

Figure 50:
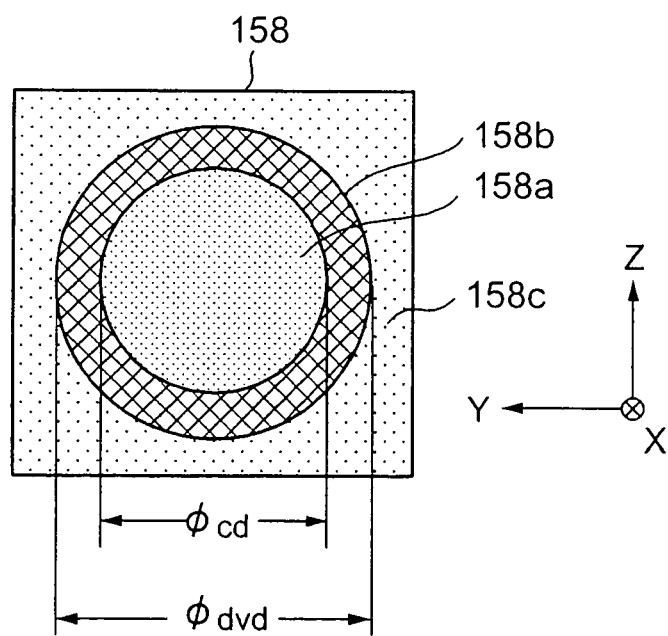
FIG. 50 is a diagram showing the composition of the wavelength filter.

This wavelength filter 158 includes the three regions (the first region 158a, the second region 158b, and the third region 158c) as shown in FIG. 50.

The first region 158a is a circular region which is located in a part for the central part of the wave-length filter 158, and has diameter $\phi$ cd.

The first region 158a has high permeability to both the light beams one having the wavelength 650 nm, and the other having the wavelength 780 nm.

The second region 158b is the region of the shape of a doughnut which touches the periphery of first region 158a.

The second region 158b has high permeability only to the light beam whose wavelength is 650 nm.

The third region 158c is a range included by neither the first range 158a nor the second range 158b, and has high reflectivity to both the light beams one having the wavelength 650 nm, and the other having the wavelength 780 nm.

Therefore, the light beam whose wavelength is 650 nm penetrates the inside of the circular range of diameter $\phi$ dvd which includes the first range 158a and the second range 158b, and the light beam whose wavelength is 780 nm penetrates only the inside of first range 158a.

Figure 51A:
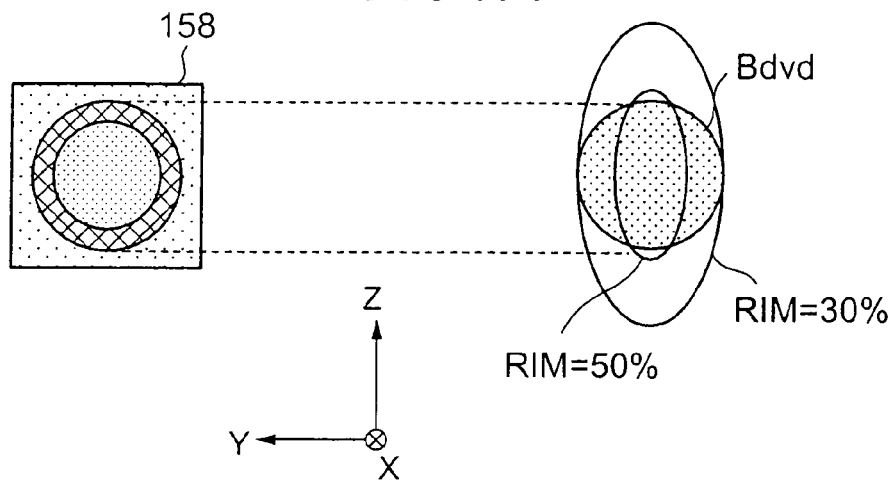
FIG. 51A and FIG. 51B are diagrams for explaining the rim intensity of each of the light beams received by the object lens when the micro lens is not used.

As shown in FIG. 51A, the focal distance of the collimator lens 152 is set up so that the minimum value of RIM in the light beam (650 nm received light beam) Bdvd whose wave length which penetrates the wave-length filter 158 and is incorporated by the object lens 160 is 650 nm may become about 30%.

Figure 51B:
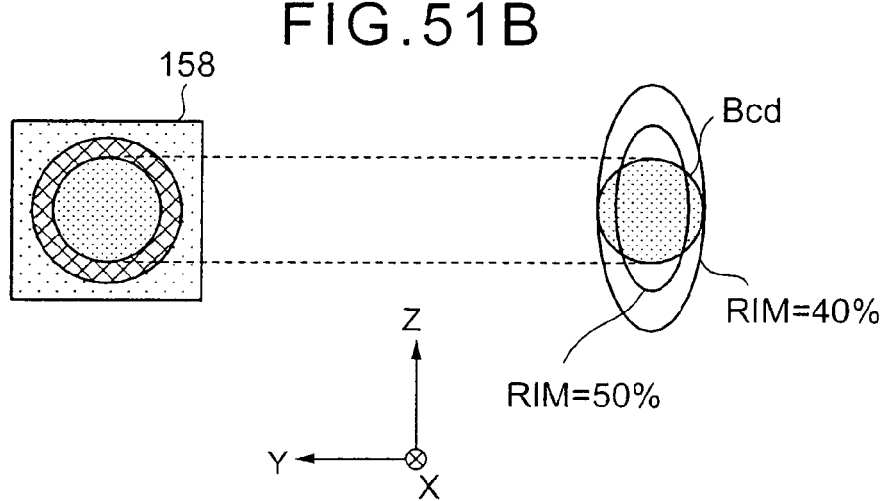

In this case, when there is no micro lens 157, as shown in FIG. 51B, the minimum value of RIM in the light beam (780 nm received light beam) Bcd whose wavelength which penetrates the wavelength filter 158 and is incorporated by the object lens 160 is 780 nm becomes about 40%.

The micro lens 157 has the convex-lens configuration, is arranged between the second optical module 161 and the beam splitter 154, and makes small the angle of divergence of 780 nm outgoing beam.

Figure 52:
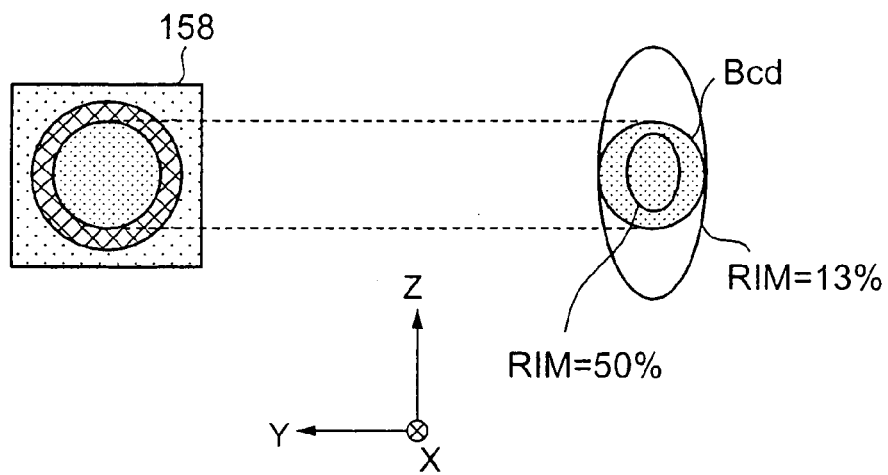
FIG. 52 is a diagram for explaining the rim intensity of the light beam received by the object lens when the micro lens is used.

As shown in FIG. 52, the focal distance and numerical aperture of the micro lens 157 are set up so that the minimum value of RIM in 780 nm received light beam Bcd may become about 13%.

The aberration compensation of the object lens 160 is carried out to the light beam the light beam whose wave length is 650 nm, and whose wavelength are 780 nm, respectively.

The arrangement location of the first optical module 151 is optimized so that 650 nm outgoing beam may serve as parallel light by the collimator lens 152.

Similarly, the second optical module 161 and the arrangement location of the micro lens 157 are optimized, respectively so that 780 nm outgoing beam may serve as parallel light by the collimator lens 152.

The first photodetector 151b and second photodetector 161b contain two or more light-receiving components which output the optimal signal for detecting the wobble signal, RF signal, the servo signal, etc. in the reproduction signal processing circuit 28, respectively.

The action of the optical pickup device 123 constituted as mentioned above is explained.

First, the case where the optical disk 15 is DVD will be described.

The light beam which is output in the +Z direction from the first semiconductor laser 151a is incident to the first hologram 153.

The light beam through the first hologram 153 is incident to the beam splitter 154.

After the light beam is reflected in the direction of +X by the beam splitter 154, it is converted into the parallel light beam by the collimator lens 152, and it is incident to the wavelength filter 158.

The light beam through the wavelength filter 158 is focused on the recording surface of the optical disk 15 (here DVD) as a minute light spot through the object lens 160.

After the received light (return light beam) reflected in respect of record of the optical disk 15 is again made into parallel light with the object lens 160 and penetrates the wave-length filter 158 and the collimator lens 152, incidence of it is carried out to the beam splitter 154.

The return light beam reflected in −Z direction by the beam splitter 154 is incident the first hologram 153.

The return light beam diffracted by the first hologram 153 is received by first photodetector 151b.

Each light-receiving component which constitutes first photodetector 151b outputs the current signal according to the amount of the received light to the reproduction signal processing circuit 28, respectively.

Next, the case where the optical disk 15 is CD will be described.

The light beam which is output in the direction of +X from the second semiconductor laser 161a is incident to the second hologram 156.

The angle of divergence is reduced by the micro lens 157, and the light beam through the second hologram 156 is incident to the beam splitter 154.

After the light beam passes through the beam splitter 154, it is converted into the parallel light beam by the collimator lens 152, and it is incident to the wavelength filter 158.

The light beam through the wavelength filter 158 is focused on the recording surface of the optical disk 15 (here CD) as a minute light spot through the object lens 160.

After the received light beam (return light beam) reflected from the recording surface of the optical disk 15 is again made into the parallel light beam by the object lens 160 and passes through the wavelength filter 158 and the collimator lens 152. The light beam is incident to the beam splitter 154.

The return light beam through the beam splitter 154 is incident to the second hologram 156 through the micro lens 157.

The return light beam diffracted by the second hologram 156 is received by the second photodetector 161b.

Each light-receiving component which constitutes the second photodetector 161b outputs the current signal according to the amount of the received light to the reproduction signal processing circuit 28, respectively.

It can be distinguished from the intensity of the received light from the recording surface of the optical disk whether the optical disk 15 is CD or DVD.

Usually, this distinction is performed by the CPU 40 when the optical disk 15 is loaded to the predetermined location of the optical disk drive 120.

Moreover, it is also possible to distinguish the kind of optical disk 15 based on the TOC (Table Of Contents) information, the PMA (Program Memory Area) information, the wobble signal, etc. which are beforehand recorded on the optical disk 15.

The distinction result is notified to the laser control circuit 24 from the CPU 40, and either the first optical module 151 and the second optical module 161 is chosen by the laser control circuit 24.

Next, processing operation in the case of recording data on the optical disk 15 is briefly explained using the above-mentioned optical disk drive 120.

Selection of the optical module shall be carried out and shall already have been performed.

The CPU 40 notifies the purport that the command of the record request is received from the host system to the reproduction signal processing circuit 28 while outputting the control signal for controlling rotation of the spindle motor 22 based on the specified record rate to the motor driver 27, if the command of the record request is received from the host system.

The CPU 40 accumulates the data received from the host system to the buffer RAM 34 through the buffer manager 37.

If rotation of the optical disk 15 reaches the predetermined linear velocity, the reproduction signal processing circuit 28 will detect the focusing error signal and the tracking error signal based on the output signal from the optical pickup device 123, and will output them to the servo controller 33.

Based on the focusing error signal and tracking error signal from the reproduction signal processing circuit 28, the servo controller 33 drives the focusing actuator and tracking actuator of the optical pickup device 123 through the motor driver 27, and corrects the focal gap and the track gap.

The reproduction signal processing circuit 28 acquires address information based on the output signal from the optical pickup device 123, and notifies it to the CPU 40.

The CPU 40 outputs the signal which is specified based on address information and which directs the seeking operation of the optical pickup device 123 that it writes in and the optical pickup device 123 is located in the start point to the motor driver 27.

If the notice that the amount of data accumulated from the buffer manager 37 at the buffer RAM 34 exceeded the predetermined value is received, the CPU 40 is written in the encoder 25 and directs creation of data.

Moreover, if the CPU 40 determines that the location of the optical pickup device 123 writes in based on address information, and it is the start point, it will be notified to the encoder 25.

The encoder 25 records write-in data on the optical disk 15 through the laser control circuit 24 and the optical pickup device 123.

Next, processing operation in the case of reproducing the data currently recorded on the optical disk 15 using the optical disk drive 120 mentioned above is explained briefly.

Selection of the optical module shall be carried out, and shall already have been performed.

The CPU 40 notifies the information that the command of the reproduction request is received from the host system to the reproduction signal processing circuit 28 while outputting the control signal for controlling rotation of the spindle motor 22 based on the reproduction rate to the motor driver 27, if the command of the reproduction request is received from the host system.

Like the case of the above-mentioned record, the reproduction signal processing circuit 28 corrects the focal gap and the track gap while notifying address information to the CPU 40.

The CPU 40 outputs the signal which is specified based on address information and which directs the seeking operation that it reads and the optical pickup device 123 is located in the start point to the motor driver 27.

If the CPU 40 determines that the location of the optical pickup device 123 reads based on address information, and it is the start point, it will be notified to the reproduction signal processing circuit 28.

After the reproduction signal processing circuit 28 detects RF signal based on the output signal of the optical pickup device 123 and performs error-correction processing etc., it is accumulated to the buffer RAM 34.

The buffer manager 37 transmits to the host system through the interface 38, when the reproduction data accumulated at the buffer RAM 34 are assembled as sector data.

As mentioned above, the reproduction signal processing circuit 28 detects the focusing error signal and the tracking error signal based on the output signal from the optical pickup device 123, and corrects the focal gap and the track gap at any time through the servo controller 33 and the motor driver 27, until record processing and the regeneration are completed.

The processor is realized in the optical disk drive of this preferred embodiment by the program performed by the reproduction signal processing circuit 28, and the CPU 40.

However, the present invention is not limited to this example.

It is good also as constituting some processors realized by processing according to the program by the CPU 40 by hardware. Or it is good also as constituting all the processors by hardware.

As explained above, according to the optical pickup device of this preferred embodiment, the angle of divergence of the light beam output from the second semiconductor laser 161a is made small by the micro lens 157 so that the minimum value of RIM in 780 nm received light beam may become about 13%.

Even if the collimator lens 152 by which wavelength is optimized by this to the light beam which is 650 nm is used, most light beams which are output from the second semiconductor laser 161a will be incorporated by the object lens 160, and it raises optical efficiency.

Since the light beam by which incidence is carried out to the collimator lens 152 has the optimal optical intensity distribution for the wavelength, it can secure the optimal RIM for the wavelength in the light beam incorporated by the object lens 160.

According to the optical pickup device of this preferred embodiment, by the case where they are the case where the optical disk 15 is DVD, and CD, since the collimator lens 152 and the object lens 160 are communalized, the miniaturization of the optical pickup device and low cost are promoted.

Therefore, according to the optical pickup device of this preferred embodiment, without causing enlargement and high cost, it can respond to two or more kinds of optical disks, and it is possible to form the optimal optical spot for each optical disk on the recording surface thereof.

According to the optical disk drive of this preferred embodiment, the optimal optical spot can be formed on the recording surface of each optical disk (DVD and CD), and it is possible to stably perform the high-speed access to each optical disk.

When the miniaturization of the optical disk drive itself and reduction of the demand can also be promoted, for example, the optical disk drive is used as portable by the miniaturization of the optical pickup device 123, and lightweight, carrying becomes easy and usable.

Although the above-mentioned preferred embodiment explained the case where the micro lens 157 is arranged between the beam splitter 154 and the second hologram 156, it is not limited to this example.

For example, the micro lens 157 may be arranged between the second hologram 156 and the second optical module 161.

The preferred embodiment of FIG. 53 has the description at the point of changing the angle of divergence of the light beam output from the first semiconductor laser 151a by the micro lens.

As shown in FIG. 53, instead of the micro lens 157 in the first preferred embodiment of the above, it has the concave-lens configuration and the micro lens 162 for enlarging the angle of divergence of the light beam output from the first semiconductor laser 151a is arranged between the beam splitter 154 and the first hologram 153.

Figure 54A:
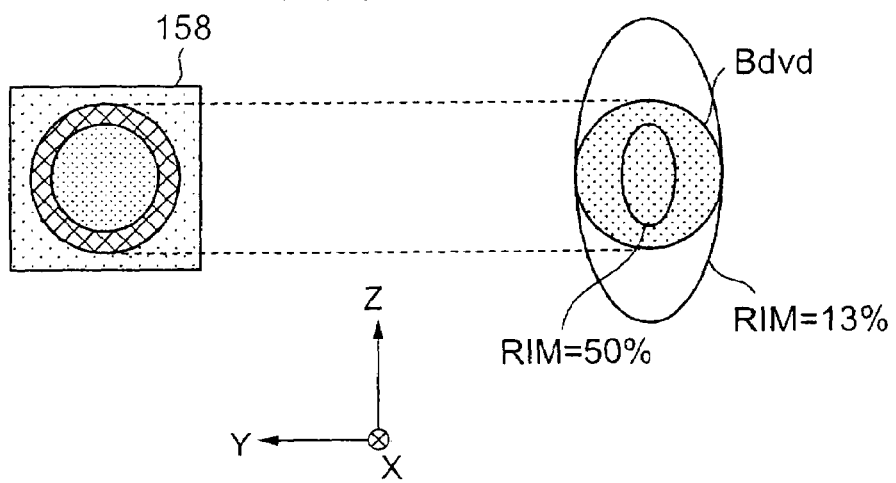
FIG. 54A and FIG. 54B are diagrams for explaining the rim intensity of each of the light beams received by the object lens when the micro lens is not used.
Figure 54B:
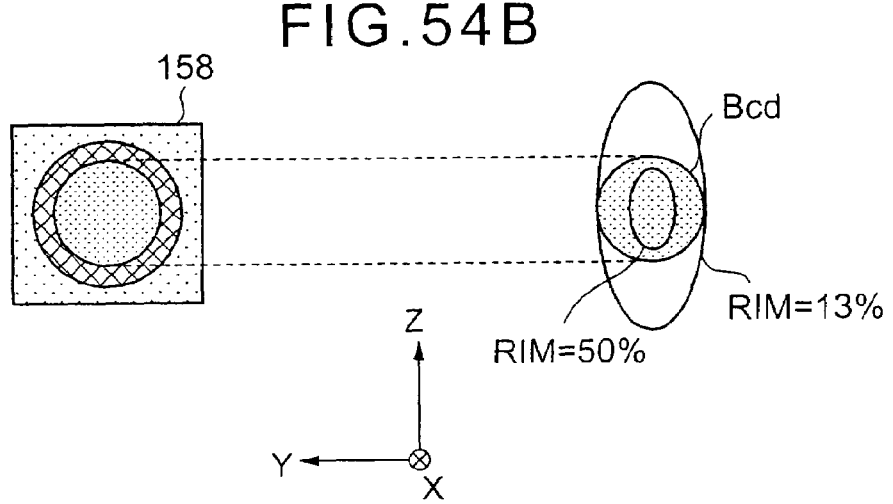

Moreover, instead of the above-mentioned collimator lens 152, as shown in FIG. 54 B, the collimator lens 163 to which the focal distance is set so that the minimum value of RIM in 780 nm received light beam Bcd might become about 13% is used.

The composition of the other optical pickup devices and the optical disk drive etc. is the same as that of the above-mentioned preferred embodiment.

While explaining focusing on difference with the above-mentioned preferred embodiment below, about the component equivalent to the above-mentioned preferred embodiment, the explanation is omitted using the same sign.

In the collimator lens 163, since wave length is optimized to the light beam which is 780 nm, as is shown in FIG. 54 A as an example, the minimum value of RIM in 650 nm received light beam Bdvd in case there is no micro lens 162 becomes about 13%.

Figure 55:
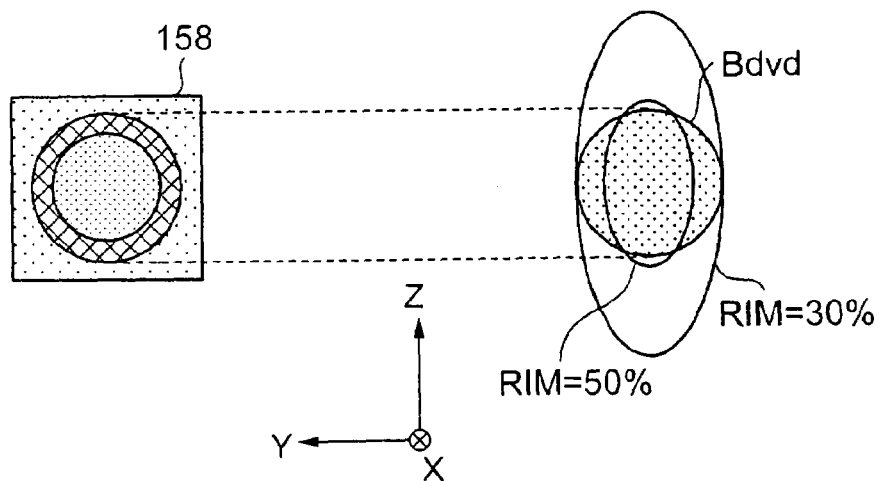
FIG. 55 is a diagram for explaining the rim intensity of the light beam received by the object lens when the micro lens is used.

As shown in FIG. 55, the focal distance and numerical aperture of the micro lens 162 are set up so that the minimum value of RIM in 650 nm received light beam Bdvd may become about 30%.

The action of the optical pickup device 123 constituted as mentioned above is explained.

First, the case where the optical disk 15 is DVD is explained.

The light beam which is output in the +Z direction from the first semiconductor laser 151a is incident to the first hologram 153.

The angle of divergence is enlarged by the micro lens 162, and the light beam through the first hologram 153 is incident to the beam splitter 154.

After the light beam is reflected in the direction of +X by the beam splitter 154, it is converted to the parallel light beam by the collimator lens 163, and it is incident to the wavelength filter 158.

The light beam through the wavelength filter 158 is focused on the recording surface of the optical disk 15 (here DVD) as a minute light spot through the object lens 160.

After the received light (return light beam) is reflected from the recording surface of the optical disk 15, it is again made into the parallel light beam by the object lens 160 and penetrates the wavelength filter 158 and the collimator lens 163. It is incident to the beam splitter 154.

The return light beam reflected in the −Z direction is incident to the first hologram 153 through the micro lens 163 by the beam splitter 154.

The return light beam diffracted by the first hologram 153 is received by the first photodetector 151b.

Each light-receiving component which constitutes the first photodetector 151b outputs the current signal according to the amount of the received light to the reproduction signal processing circuit 28, respectively.

Next, the case where the optical disk 15 is CD will be explained.

The light beam output in the direction of +X from the second semiconductor laser 161a is incident to the second hologram 156.

The light beam through the second hologram 156 is incident to the beam splitter 154.

After the light beam through the beam splitter 154 is converted into the parallel light beam by the collimator lens 163, it is incident to the wavelength filter 158.

The light beam through the wavelength filter 158 is focused on the recording surface of the optical disk 15 (here CD) as a minute light spot through the object lens 160.

After the received light (return light beam) reflected from the optical disk 15 is again made into the parallel light beam by the object lens 160 and passes through the wave-length filter 158 and the collimator lens 163, it is incident to the beam splitter 154.

The return light beam through the beam splitter 154 is incident to the second hologram 156.

The return light beam diffracted by the second hologram 156 is received by the second photodetector 161b.

Each light-receiving component which constitutes the second photodetector 161b outputs the current signal according to the amount of the received light to the reproduction signal processing circuit 28, respectively.

In the optical disk drive 120 of this preferred embodiment, reproduction of the data currently recorded on the optical disk 15 and recording of the data to the optical disk 15 are performed like the above-mentioned preferred embodiment.

The recording and reproduction processing is realized in the optical disk drive of this preferred embodiment by the program performed by the reproduction signal processing circuit 28 and the CPU 40.

However, the present invention is not limited to this. Alternatively, some of the processing according to the program by the CPU 40 may be realized by the hardware. Or all the processing may be realized by the hardware.

As explained above, according to the optical pickup device of this preferred embodiment, the collimator lens 163 is optimized to the light beam whose wavelength is 780 nm.

Moreover, the angle of divergence of the light beam output from the first semiconductor laser 151*a* is enlarged by the micro lens 162 so that the minimum value of RIM in 650 nm received light beam may become 30%.

The light beam by which incidence is carried out to the collimator lens 163 has the optimal optical intensity distribution for the wavelength.

In the light beam incorporated by the object lens 160, the optimal RIM for the wavelength is securable.

Therefore, it is possible to respond to two or more kinds of optical disks, and to form the optimal optical spot for each optical disk on the recording surface thereof without causing enlargement and high cost.

According to the optical pickup device of this preferred embodiment, in DVD and CD, since the collimator lens 163 and the object lens 160 are communalized, the miniaturization of the optical pickup device and low cost can be promoted.

According to the optical disk drive of this preferred embodiment, the optimal optical spot can be formed on the recording surface of each optical disk (CD and DVD). It is possible to acquire the same effectiveness as the optical disk drive of the above-mentioned preferred embodiment.

Although this preferred embodiment explained the case where the micro lens 162 is arranged between the beam splitter 154 and the first hologram 153, it is not limited to this example.

For example, the micro lens 162 may be arranged between the first hologram 153 and the first optical module 151.

Although the above-mentioned preferred embodiment explained the case where the first optical module 151 and first hologram 153 are arranged individually, it is not limited to these examples.

The first optical module 151 and first hologram 153 may be unified.

Although similarly the above-mentioned preferred embodiment explained the case where the second optical module 161 and second hologram 156 are arranged individually, it is not limited to these examples.

The second optical module 161 and second hologram 156 may be unified.

It becomes possible to promote the miniaturization of the optical pickup device.

The attachment process and the adjustment process can be simplified and work cost can be reduced.

Figure 56:
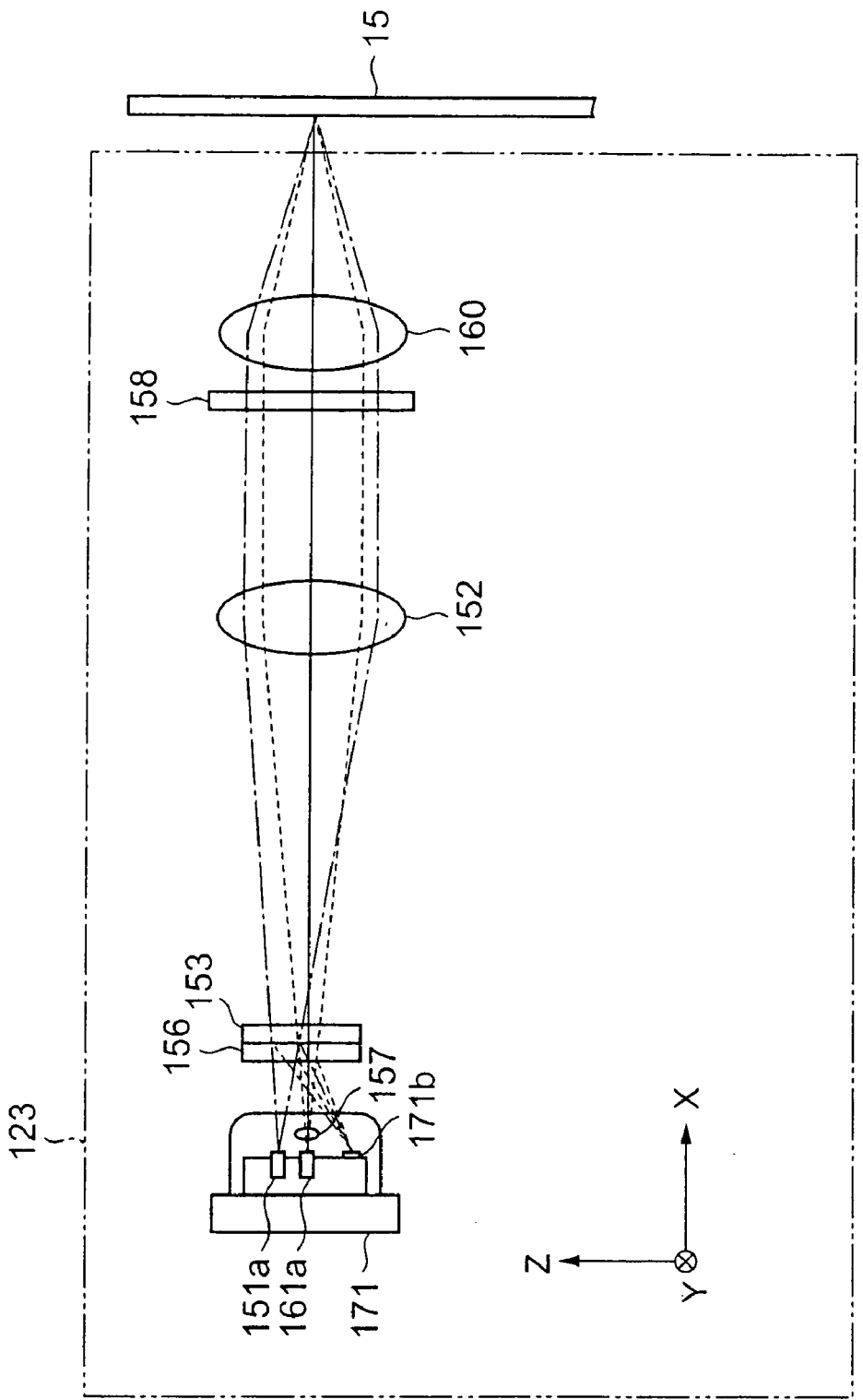
FIG. 56 is a block diagram of the optical disk drive in another preferred embodiment of the present invention.

The preferred embodiment of FIG. 56 has the description at the point which unified first semiconductor laser 151*a* and second semiconductor laser 161*a*.

As shown in FIG. 56, the third optical module 171 with which first semiconductor laser 151*a* and second semiconductor laser 161*a* have been arranged by approaching mutually is used instead of the first optical module 151 in the above-mentioned preferred embodiment, and the second optical module 161.

And the third photodetector 171*b* which receives 650 nm return light beam and 780 nm return light beam is used instead of first photodetector 151*b* and second photodetector 161*b*.

The third photodetector 171*b* and the micro lens 157 are mounted in the third optical module 171.

It is unified and the first hologram 153 and second hologram 156 are arranged between the collimator lens 152 and the third optical module 171.

In this preferred embodiment, the beam splitter 154 in the above-mentioned preferred embodiment is unnecessary.

The composition of the other optical pickup devices and the optical disk drive is the same as that of the above-mentioned preferred embodiment.

While explaining focusing on difference with the above-mentioned preferred embodiment below, about the component equivalent to the above-mentioned preferred embodiment, the explanation is omitted using the same sign.

First, the action of the optical pickup device 123 is explained about the case where the optical disk 15 is DVD.

The light beam outgoing in the direction of +X from the first semiconductor laser 151*a* is incident to the second hologram 156.

The light beam through the second hologram 156 is incident to the first hologram 153.

After the light beam through the first hologram 153 serves as parallel light by the collimator lens 152, it is incident to the wavelength filter 158.

The light beam through the wavelength filter 158 is focused on the recording surface of the optical disk 15 (here DVD) as a minute light spot through the object lens 160.

After the received light (return light beam) reflected in respect of record of the optical disk 15 is again made into parallel light with the object lens 160 and penetrates the wave-length filter 158 and the collimator lens 152, incidence of it is carried out to the first hologram 153.

It diffracts by the first hologram 153 and the return light beam through the second hologram 156 is received by third photodetector 171*b*.

Each light-receiving component which constitutes third photodetector 171*b* outputs the current signal according to the amount of the received light to the reproduction signal processing circuit 28, respectively.

Next, the case where the optical disk 15 is CD is explained.

The angle of divergence becomes small by the micro lens 157, and incidence of the light beam come out of and put in the direction of +X from the second semiconductor laser 161*a* is carried out to the second hologram 156.

The light beam through the second hologram 156 is further incident to the first hologram 153.

After the light beam through the first hologram 153 serves as parallel light by the collimator lens 152, it is incident to the wavelength filter 158.

The light beam through the wavelength filter 158 is focused on the recording surface of the optical disk 15 (here CD) as a minute light spot through the object lens 160.

After the received light (return light beam) reflected in respect of record of the optical disk 15 is again made into parallel light with the object lens 160 and penetrates the wave-length filter 158 and the collimator lens 152, incidence of it is carried out to the first hologram 153.

The return light beam through the first hologram 153 is incident to the second hologram 156.

The return light beam diffracted by the second hologram 156 is received by the third photodetector 171*b*.

Each light-receiving component which constitutes third photodetector 171*b* outputs the current signal according to the amount of the received light to the reproduction signal processing circuit 28, respectively.

In the optical disk drive 120 of this preferred embodiment, reproduction of the data currently recorded on record and the optical disk 15 of the data to the optical disk 15 is performed like the above-mentioned preferred embodiment.

The processing is realized in the optical disk drive of this preferred embodiment by the program performed by the reproduction signal processing circuit 28 and the CPU 40. However, the present invention is not limited to this example.

Hardware may constitute a part of the processing according to the program by the CPU 40. Or hardware may constitute all the processing.

As explained above, according to the optical pickup device of this preferred embodiment, the collimator lens 152 optimizes the light beam whose wavelength is 650 nm.

Moreover, the angle of divergence of the light beam output from the second semiconductor laser 161a is made small by the micro lens 157 so that the minimum value of RIM in 780 nm received light beam may become about 13%.

In DVD and CD, the collimator lens 152 and the object lens 160 are commonized.

Therefore, it becomes possible to acquire the same effectiveness as the optical pickup device of the above-mentioned preferred embodiment.

According to the optical pickup device of this preferred embodiment, since each semiconductor laser is contained and arranged in the same housing, it can promote the miniaturization of the optical pickup device.

Since each semiconductor laser is positioned with accuracy sufficient in the case of packaging, it can simplify attachment work and tuning. Low cost is promoted. The stability of the optical spot to mechanical vibration or the temperature change is raised by the light source unit package.

According to the optical pickup device of this preferred embodiment, third photodetector 171b is contained in the same housing as each semiconductor laser.

The miniaturization of the optical pickup device is promoted further.

The third photodetector 171b and each semiconductor laser are positioned with accuracy sufficient in the case of packaging. Attachment work and tuning are simplified. It becomes possible to promote low cost. The stability of the various signals outputted to the reproduction signal processing circuit 28 by the packaging to mechanical vibration or the temperature change is raised.

According to the optical disk drive of this preferred embodiment, the optimal light spot can be formed on the recording surface of each optical disk, and it is possible to acquire the same effectiveness as the optical disk drive of the above-mentioned preferred embodiment.

Although this preferred embodiment has explained the case where each semiconductor laser is arranged in parallel mutually, and the outgoing directions of the light beams are made the same direction (the direction of +X), it is not limited to this example.

For example, as shown in FIG. 57A, while the light-emission point arranges each semiconductor laser in the location which counters mutually, it is possible to use the optical module 172 equipped with triangle-like reflective mirror 172a which reflects the light beam output from each semiconductor laser in the same direction instead of the third optical module 171.

In this example, the light beam which is output in the +Z direction from the first semiconductor laser 151a is reflected in the direction of +X by the reflective mirror 172a.

On the other hand, the angle of divergence becomes small by the micro lens 157, and the light beam which is output in the −Z direction from the second semiconductor laser 161a is reflected in the direction of +X by the reflective mirror 172a.

In this example, it becomes possible to narrow spacing of the intensity center of 650 nm outgoing beam and the intensity center of 780 nm outgoing beam which carry out incidence to the collimator lens 152.

The configuration of the optical spot of each wavelength is improvable, respectively.

Moreover, as shown in FIG. 57B, the outgoing direction of each semiconductor laser is arranged in the location which intersects perpendicularly mutually, and the light beam which is output from one semiconductor laser may be made to penetrate, and the light beam which is output from the semiconductor laser of another side may use the optical module 173 including the dichroic prism 173a to reflect, instead of the third optical module 171.

In this example, the light beam outgoing in the direction of +X from the first semiconductor laser 151a passes through the dichroic prism 173a.

On the other hand, the angle of divergence is reduced by the micro lens 157, and the light beam which is output in the −Z direction from the second semiconductor laser 161a is reflected in the direction of +X by the dichroic prism 173a.

In this example, it becomes possible to make mostly in agreement the intensity center of 650 nm outgoing beam and the intensity center of 780 nm outgoing beam which carry out incidence to the collimator lens 152.

The configuration of the optical spot of each wavelength is improvable, respectively.

The first reflective film M1 which reflects alternatively the light beam output from the first semiconductor laser 151a when it has further the third semiconductor laser 174a which outputs the light beam whose wavelength is 400 nm as shown in FIG. 58.

The dichroic prism 174b including the second reflective film M2 which reflects alternatively the light beam output from the first semiconductor laser 151a, and the light beam output from the second semiconductor laser 161a can be used.

The intensity center of the light beam of are outputting from each semiconductor laser can be made mostly in agreement.

In this example, it is reflected in −Z direction by the first reflective film M1, and the light beam come out of and put in the direction of +X from the first semiconductor laser 151a is reflected in the direction of +X by the second reflective film M2.

The light beam which is output in the −Z direction from the second semiconductor laser 161a penetrates the first reflective film M1, and is reflected in the direction of +X by the second reflective film M2. The light beam output in the direction of +X from the third semiconductor laser 174a penetrates the second reflective film M2.

It is possible to make mostly in agreement the intensity center of 400 nm outgoing light beam and the intensity center of 650 nm outgoing light beam which is incident to the collimator lens 152, and the intensity center of 780 nm outgoing light beam.

The configuration of the optical spot of each wavelength is improvable, respectively.

In this case, it is possible to add the micro lens for changing the angle of divergence of the light beam output from the third semiconductor laser 174a if needed.

Figure 59A:
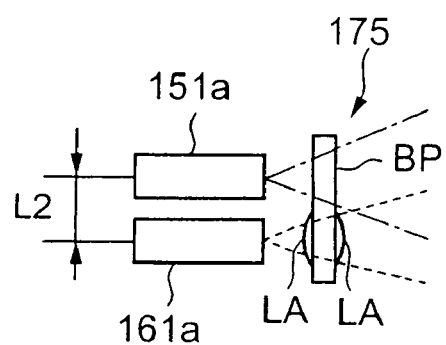
FIG. 59A, FIG. 59B and FIG. 59C are diagrams for explaining the composition of the micro lens and the transparent substrate.
Figure 59B:
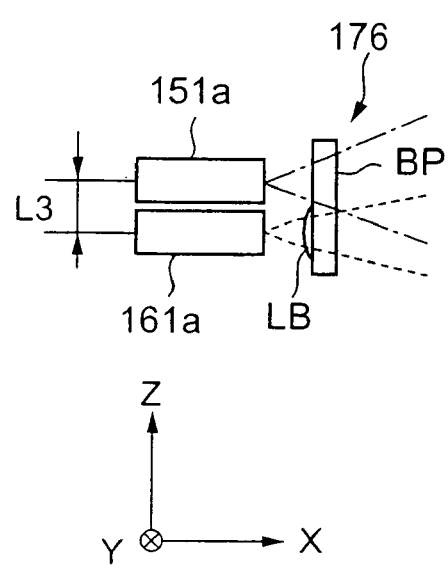
Figure 59C:
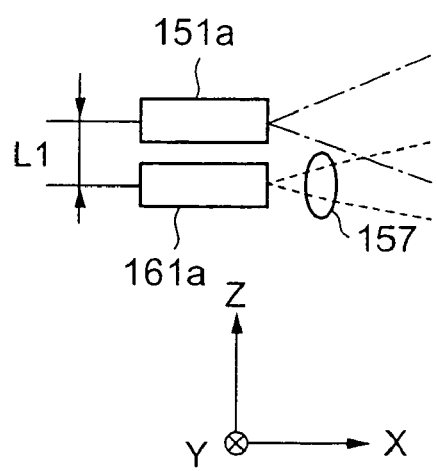

It may be made to penetrate without changing the angle of divergence of incoming beams, as shown in FIG. 59 A, and it is possible to use the lens unit 175 in which the lens portion LA which has the lens action equivalent to the micro lens 157 by etching etc. in the transparent substrate BP of predetermined thickness is formed instead of the micro lens 157.

In this case, incidence of the light beam output from the first semiconductor laser 151a is carried out to the ranges other than the lens portion LA of the lens unit 175 (penetration portion), and each semiconductor laser and the lens unit 175 are arranged so that incidence of the light beam output from the second semiconductor laser 161a may be carried out to the lens portion LA of the lens unit 175.

Thereby, the emitting light point spacing L2 of first semiconductor laser 151a and second semiconductor laser 161a about Z axis direction becomes possible to make it narrower than the emitting light point spacing L1 (FIG. 59 C) at the time of using the micro lens 157.

Moreover, since the lens unit 175 is the configuration where the micro lens 157 and the transparent substrate BP which does not influence the angle of divergence of incoming beams are unified, it can raise the workability of the attachment process and the adjustment process, and becomes possible to reduce work cost.

In addition, the lens unit 175 is easily producible compared with the micro lens 157.

In this preferred embodiment, as shown in FIG. 59 B, it is possible to use the lens unit 176 by which the lens portion LB which has the lens action equivalent to the micro lens 157 by etching etc. is formed on one field of the transparent substrate BP which does not influence the angle of divergence of incoming beams instead of the micro lens 157.

While arranging the field in which the lens portion LB is formed to the light source side, the light beam output from the first semiconductor laser 151a is incident to the regions other than the lens portion LB of the lens unit 176 (penetration portion), and each semiconductor laser and the lens unit 176 are arranged so that the light beam output from the second semiconductor laser 161a may be incident to the lens portion LB of the lens unit 176.

In this case, it becomes possible to make it still narrower than the emitting light point spacing L2 which mentioned above the emitting light point spacing L3 of first semiconductor laser 151a and second semiconductor laser 161a about Z axis direction.

Although this preferred embodiment explained the case where the distance of the light-emission point location of each semiconductor laser and the collimator lens 152 is almost equal, it is not limited to this example.

The light-emission point location of each semiconductor laser may be mutually shifted about the outgoing direction.

For example, the light beam which came out of second semiconductor laser 161a, and is put may not serve as the predetermined divergence light by the collimator lens 152 with the change action of the angle of divergence by the micro lens 157, the color aberration of the collimator lens 152, etc.

Figure 60A:
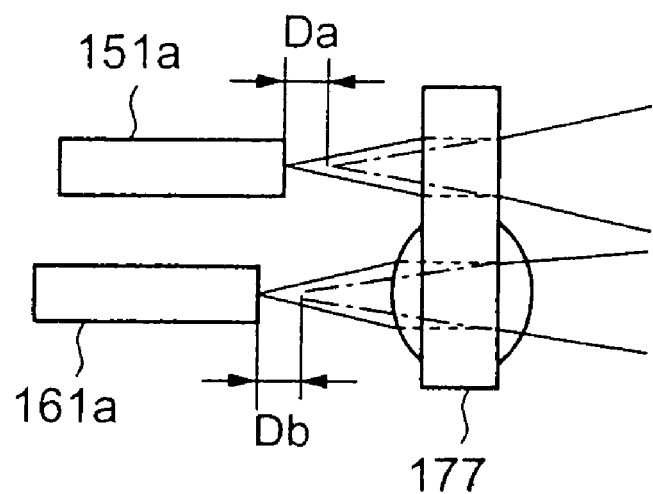
FIG. 60A and FIG. 60B are diagrams for explaining the deviation of the locations of the emission points of the semiconductor lasers.
Figure 60B:
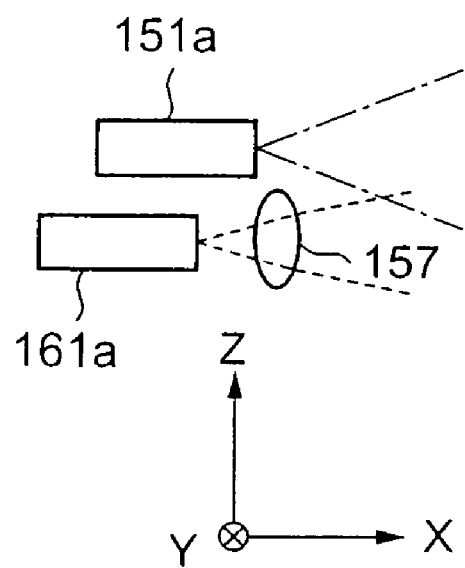

In this case, as shown in FIG. 60B, the light-emission point location of second semiconductor laser 161a can be shifted to X axis direction, and let the light beam output from the second semiconductor laser 161a be the predetermined divergence light by the collimator lens 152.

Thereby, even if the optical disk 15 is CD, it is stabilized and the optimal optical spot can be formed on the recording surface thereof.

Moreover, as shown at FIG. 60A in the above-mentioned case, it is possible to use the lens unit 177 instead of the micro lens 157.

The lens unit 177 has the function which makes almost equal the distance Da about X axis direction of the point of the appearance of 650 nm outgoing beam which carries out incidence to the collimator lens 152 emitting light, and the actual light-emission point, and distance Db about X axis direction of the point of the appearance of 780 nm outgoing beam which carries out incidence to the collimator lens 152 emitting light, and the actual light-emission point.

In the optical pickup device used for the optical disk drive which performs only reproduction of CD, since it is seldom necessary to make optical efficiency high, it may be necessary to change the angle of divergence of the light beam output from the second semiconductor laser 161a.

In the optical pickup device used for the optical disk drive which records on CD on the other hand, since it is necessary to make optical efficiency high, you have to change the angle of divergence of the light beam output from the second semiconductor laser 161a.

In this case, after mounting each semiconductor laser in the location optimized in consideration of the color aberration of the collimator lens 152, in the optical pickup device used for the optical disk drive which records on CD, the lens unit 177 can be intercalated and attachment accuracy predetermined only by performing positioning of the direction of the optical axis of the collimator lens 152 can be acquired.

In this case, by the case where the optical pickup device is used for record of CD, and the case where it is used only for reproduction of CD, it becomes possible to mount each semiconductor laser with the same production line, and the manufacturing cost can be reduced.

Moreover, it is possible to correct the color aberration of the collimator lens 152 by optimizing the configuration (for example, radius of curvature) and arrangement location of the micro lens instead of shifting the light-emission point location of each semiconductor laser.

This becomes possible to make mostly the light-emission point location of each semiconductor laser into the equal distance from the collimator lens 152, and the workability at the time of mounting each semiconductor laser improves.

In this preferred embodiment, the light beam output from the second semiconductor laser 161a is incident to the object lens 160 in response to the influence of the lens system of the two groups of the micro lens 157 and the collimator lens 152.

On the other hand, in response to the influence only of the collimator lens 152, the light beam output from the first semiconductor laser 151a is incident to the object lens 160.

Therefore, the allowable error of each arrangement location in the second semiconductor laser 161a and the attachment work of the micro lens 157 becomes very small compared with the allowable error of the arrangement location of first semiconductor laser 151a.

By arranging the micro lens 157 and the collimator lens 152 so that the mutual optical axis may be mostly in agreement, it can consider that the lens system which consists of the micro lens 157 and the collimator lens 152 is the one group, and it becomes possible to enlarge the allowable error of the arrangement location of second semiconductor laser 161a.

The attachment process and the adjustment process can be simplified and reduction of work cost is attained.

In addition, when the collimator lens is not used, the effectiveness mentioned above can be acquired by making the optical axis of the micro lens, and the optical axis of the object lens mostly in agreement.

Although this preferred embodiment explained the case where the third optical module 171 and each hologram are arranged individually, it is not limited to this example.

The third optical module 171 and each hologram may be unified. Thereby, the miniaturization of the optical pickup device can be promoted.

Although this preferred embodiment explained the case where each of 650 nm return light beams and 780 nm return light beams is received by third photodetector 171b, it is not limited to this example.

The photodetector which receives 650 nm return light beam, and the photodetector which receives 780 nm return light beam may be arranged individually, respectively.

The required signal should just be outputted from the optical pickup device 123 in the reproduction signal processing circuit 28.

Although the above-mentioned preferred embodiment explained the case where the focal distance of the collimator lens 152 is set up so that the minimum value of RIM in 650 nm received light beam might become about 30%, it is not limited to this example.

For example, it is possible to use the collimator lens set up so that the minimum value of RIM in 780 nm received light beam might become about 13%.

In this case, the micro lens 163 which enlarges the angle of divergence of the light beam output from the first semiconductor laser 151a like the above-mentioned preferred embodiment is used.

Figure 61A:
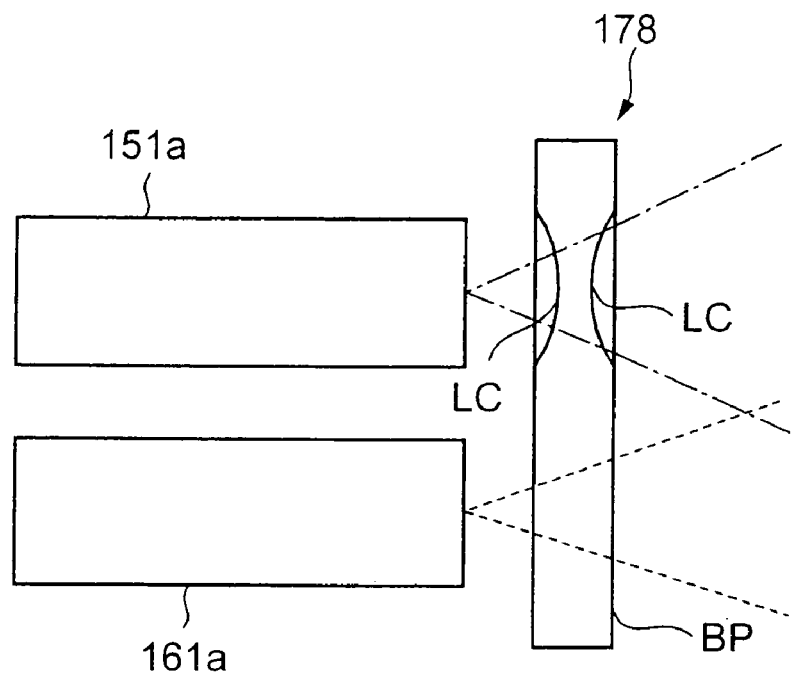
FIG. 61A and FIG. 61B are diagrams for explaining the composition of the micro lens and the transparent substrate.
Figure 61B:
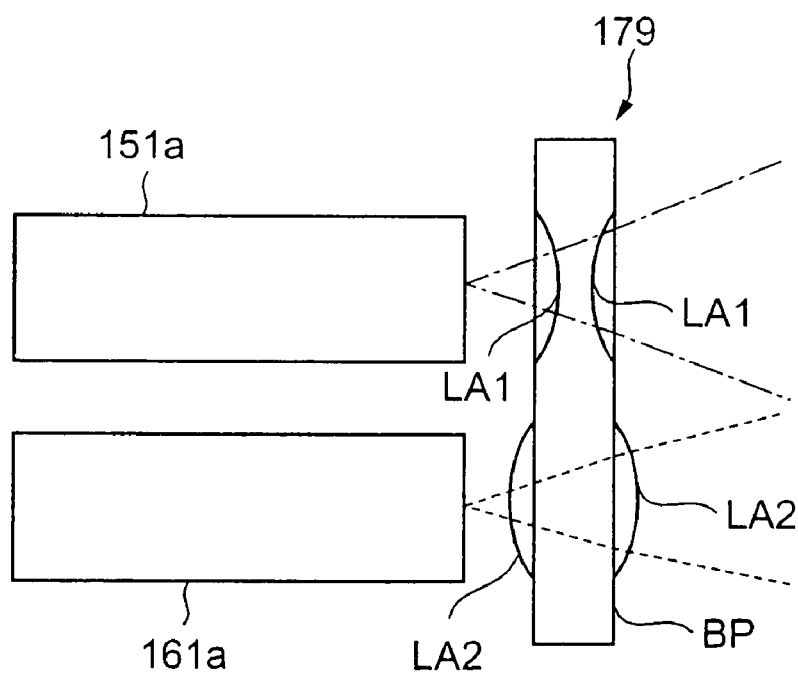

As shown in FIG. 61 A, it is possible to use the lens unit 178 in which the lens portion LC which has the lens action equivalent to the micro lens 163 by etching etc. in the transparent substrate BP of predetermined thickness which does not influence the angle of divergence of incoming beams is formed instead of the micro lens 163.

Moreover, it is etching etc. to the transparent substrate BP of predetermined thickness which does not influence the angle of divergence of incoming beams as the minimum value of RIM in 650 nm received light beam is 30% or less, and it is shown in FIG. 61 B, when using the collimator lens (collimator lens currently optimized by neither 650 nm outgoing beam nor 780 nm outgoing beam) set up so that the minimum value of RIM in 780 nm received light beam might become 13% or more.

It is possible to use the lens unit 179 in which the second lens portion LA 2 which has the lens action which makes small the first lens portion LA 1 which has the lens action which enlarges the angle of divergence of the light beam output from the first semiconductor laser 151a, and the angle of divergence of the light beam output from the second semiconductor laser 161a is formed instead of the micro lens 163.

Although each above-mentioned preferred embodiment explained the case where the semiconductor laser and the photodetector are mounted in the same housing, it is not limited to these examples.

The semiconductor laser and the photodetector may be mounted individually, respectively.

Although each above-mentioned preferred embodiment explained the case where the non-polarized hologram for which the diffraction efficiency does not depend in the polarization direction of incoming beams, respectively is used as the first hologram 153 and the second hologram 156, it is not limited to these examples.

It is possible to use for either [at least] the first hologram 153 or the second hologram 156 the polarization hologram from which the diffraction efficiency differs by the polarization direction of incoming beams.

For example, to the polarization direction of the light beam output from the semiconductor laser, the diffraction efficiency is low, and incidence of the light beam output from the semiconductor laser by using the polarization hologram set up so that the diffraction efficiency might become high to the polarization direction of the return light beam is carried out to the collimator lens 152, without the quantity of light almost falling.

Therefore, access at the high speed to the optical disk 15 is attained.

Moreover, since the amount of the received light in the photodetector increases, the signal level and the S/N ratio of the signal which are outputted from the photodetector can be raised.

In this case, it is necessary to arrange phase difference grant means, such as the quarter-wave plate, between the collimator lens 152 and the object lens 160.

Instead of either the first hologram 153 or the second hologram 156, it is possible to use the beam splitter, the polarization beam splitter, etc.

In each above-mentioned preferred embodiment, it is possible to use the anamorphic lens for the micro lens.

Figure 62A:
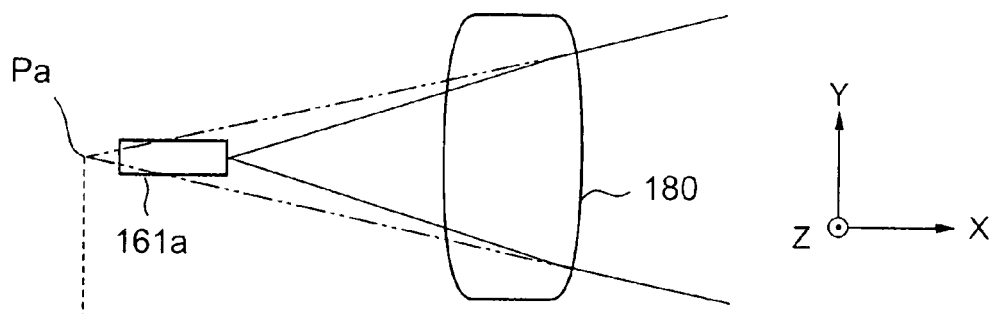
FIG. 62A, FIG. 62B and FIG. 62C are diagrams for explaining the anamorphic lens that adjusts the angle of divergence of the light beam output from the second semiconductor laser.
Figure 62B:
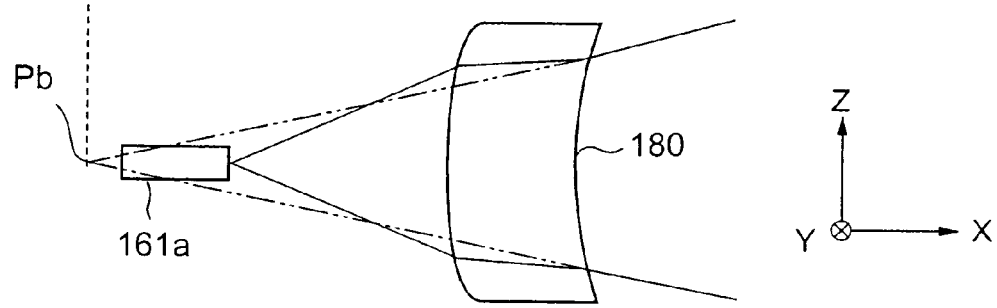

For example, in the above-mentioned preferred embodiment, instead of the micro lens 157, as shown in FIG. 62A and FIG. 62B, it is possible to use the anamorphic lens 180.

The configuration of XY cross section of this anamorphic lens 180 is almost the same as the micro lens 157, as shown in FIG. 62A.

As shown in FIG. 62B, unlike the micro lens 157, light with the more large angle of divergence can also incorporate the configuration of XZ cross section.

Figure 62C:
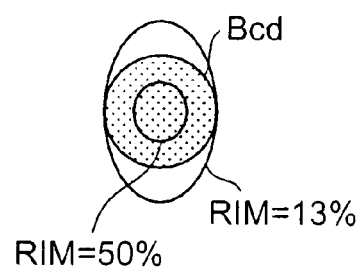

The anamorphic lens 180 is designed so that the angle of divergence in the field containing the transverse of the 780 outgoing beams and the angle of divergence in the field containing the branch axis may become almost equal, As for the light beam incorporated by the object lens 160 among the light beams which came out of the second semiconductor laser 161a, and are put, as shown in FIG. 62 C, compared with the case where the micro lens 157 is used, the beam intensity distribution becomes close to the circle configuration, and raises optical efficiency Moreover, the astigmatism can be suppressed by designing the anamorphic lens 180 so that the point Pa of the appearance in XY flat surface emitting light and the point Pb of the appearance in XZ flat surface emitting light may turn into the almost same point.

It is possible to use the lens unit which unified the transparent substrate and the anamorphic lens 180.

In each above-mentioned preferred embodiment, it is possible to use the diffraction grating and hologram which have the equivalent angle-of-divergence change action instead of the micro lens.

For example, since it is cheap and small compared with the micro lens, the diffraction grating promotes the miniaturization of the optical pickup device and the lightweight structure with low cost.

Although each above-mentioned preferred embodiment explained the case where the wavelength of the light beam output from the light source is 650 nm and 780 nm, it is not limited to these examples.

It is possible to use the light source which outputs the light beam whose wavelength is 400 nm instead of one of the two light sources.

Although each above-mentioned preferred embodiment has explained the case where the wavelengths of the light beams output from the light sources are the two kinds, the present invention is not limited to these examples.

Although each above-mentioned preferred embodiment has explained the case where it is the divergence light in which the configuration of the light beam output from the light source has the elliptical intensity distribution, it is not limited to these examples.

It is possible to be the divergence light in which the configuration of the light beam output from the light source has the intensity distribution of the circle configuration mostly.

Although each above-mentioned preferred embodiment explained the case where the target minimum value of RIM in 650 nm received light beam is 30%, the present invention is not limited to these examples.

Moreover, although each above-mentioned preferred embodiment explained the case where the target minimum value of RIM in 780 nm received light beam is 13%, the present invention is not limited to these examples.

Without causing enlargement and high cost according to the optical pickup device of the present invention, as explained above, it can respond to two or more kinds of information storage mediums, and the optimal optical spot for each information storage medium can be formed.

Moreover, according to the optical disk drive of the present invention, it can respond to two or more kinds of information storage mediums, and it is stabilized and access at the high speed can be performed.

The present invention is not limited to the above-described embodiments, and variations and modifications may be made without departing from the scope of the present invention.

Further, the present invention is based on Japanese priority applications No. 2002-111544, filed on Apr. 15, 2002; No. 2002-134002, filed on May 9, 2002; No. 2002-134012, filed on May 9, 2002; No. 2002-216446, filed on Jul. 25, 2002; and No. 2002-253737, filed on Aug. 30, 2002, the entire contents of which are hereby incorporated by reference.

What is claimed is:

1. A light source unit comprising:
a plurality of light sources outputting light beams respectively, the plurality of light sources being arranged in proximity to each other; and
a divergence-angle changing unit changing an angle of divergence of a light beam output from at least one of the plurality of light sources, wherein the changing unit is provided to change respective angles of divergence of two light beams among the light beams output from the plurality of light sources, in two orthogonal planes each including an outgoing direction of one of the two light beams having a maximum intensity.

2. The light source unit according to claim 1 wherein the light beams output from the plurality of light sources have different wavelengths respectively.

3. The light source unit according to claim 1 wherein the changing unit comprises an optical element.

4. The light source unit according to claim 3 wherein said optical element includes a marking for positioning of said optical element with one of the plurality of light sources.

5. The light source unit according to claim 3 wherein said optical element includes a marking for positioning of said optical element with said at least one of the plurality of light sources.

6. The light source unit according to claim 3 wherein said optical element is provided to change an outgoing direction of the light beam having a maximum intensity in addition to the angle of divergence.

7. The light source unit according to claim 3 wherein said optical element is provided such that astigmatism of said optical element is corrected.

8. The light source unit according to claim 3 wherein said optical element of the changing unit includes at least one of a positive meniscus lens which reduces the angle of divergence and a negative meniscus lens which enlarges the angle of divergence.

9. The light source unit according to claim 3 wherein said optical element is provided to change an angle of divergence of a light beam output from a specific one of the plurality of light sources, and said optical element being arranged at a location where the light beams output from the light sources other than the specific light source are not incident to said optical element.

10. The light source unit according to claim 1 wherein the changing unit comprises a plurality of optical elements arranged for the plurality of light sources respectively, and each of the plurality of optical elements changing an angle of divergence of a light beam output from a corresponding one of the plurality of light sources, respectively.

11. The light source unit according to claim 10 wherein at least two optical elements of the plurality of optical elements are unified.

12. A light source unit comprising:
a plurality of light sources outputting light beams respectively, the plurality of light sources being arranged in proximity to each other; and
a divergence-angle changing unit changing an angle of divergence of a light beam output from at least one of the plurality of light sources; and
wherein the changing unit comprises an optical element; and
wherein said optical element is provided to change an angle of divergence of a light beam output from a specific one of the plurality of light sources, and said optical element being arranged at a location where the light beams output from the light sources other than the specific light source are not incident to said optical element; and
wherein said optical element is arranged at the location so that a distance z from a light-emission point of the specific light source to an outgoing plane of said optical element in a Z-axis direction of an XYZ orthogonal coordinate system with an XY plane being the outgoing plane meets requirement conditions:

$$d \leq z \leq (x-\epsilon)/\{\tan(\theta 1/2)+\tan(\theta 2/2)\}$$

where x indicates a distance in an X axis direction between the light-emission point of the specific light source and a light-emission point of an adjacent light source in proximity to the specific light source, $\theta 1$ indicates an angle of divergence of a first light beam output in the Z axis direction from the specific light source, $\theta 2$ indicates an angle of divergence of a second light beam output in the Z axis direction from the adjacent light source, d indicates a thickness in the Z axis direction of the optical element, and $\epsilon$ indicates a width of a region in the x axis direction, the region being interposed between an optical path of the first light beam and an optical path of the second light beam, and neither the first light beam nor the second light beam passing through the region.

13. A light source unit package including a light source unit, a branch optical element reflecting a light beam, incident to the light source unit, in a predetermined direction, and a photodetector receiving the reflected light beam from the branch optical element, wherein the light source unit, the branch optical element and the photodetector are unified, and the light source unit comprising:
a plurality of light sources outputting light beams respectively, the plurality of light sources being arranged in proximity to each other; and
a divergence-angle changing unit changing respective angles of divergence of two light beams among the light beams output from the plurality of light sources, in two orthogonal planes each including an outgoing direction of one of the two light beams having a maximum intensity.

14. The light source unit package according to claim 13 wherein the photodetector receives the reflected light beam from the branch optical element without being influenced by the changing unit.

15. An optical pickup device which focuses a light beam on a recording surface of a corresponding one of two or more storage media of different types and receives a return light beam from the recording surface, the optical pickup device comprising: a light source unit; an optical system which leads the return light beam to a predetermined light-receiving location and includes an object lens focusing each light beam from the light source unit to the recording surface of the corresponding storage medium; and a photodetector arranged at the light-receiving location, the light source unit comprising:
- a plurality of light sources outputting light beams respectively, the plurality of light sources being arranged in proximity to each other; and
- a divergence-angle changing unit changing respective angles of divergence of two light beams among the light beams output from the plurality of light sources, in two orthogonal planes each including an outgoing direction of one of the two light beams having a maximum intensity.

16. An optical pickup device which focuses a light beam on a recording surface of a corresponding one of two or more storage media of different types and receives a return light beam reflected from the recording surface, the optical pickup device comprising: a light source unit package; and an optical system which leads the return light beam to a predetermined light-receiving location and includes an object lens focusing each light beam from the light source unit package to the recording surface of the corresponding storage medium, the light source unit package comprising: a light source unit, a branch optical element reflecting a light beam incident to the light source unit, in a predetermined direction, and a photodetector arranged at the light-receiving location and receiving the reflected light beam from the branch optical element, wherein the light source unit, the branch optical element and the photodetector are unified, the light source unit comprising:

a plurality of light sources outputting light beams respectively, the plurality of light sources being arranged in proximity to each other; and a divergence-angle changing unit changing respective angles of divergence of two light beams among the light beams output from the plurality of light sources, in two orthogonal planes each including an outgoing direction of one of the two light beams having a maximum intensity.

17. An optical disk drive which performs recording, reproduction and erasing of information with a corresponding one of two or more optical disks of different types, the optical disk drive including: an optical pickup device and a reproduction signal processing unit performing reproduction of information based on a signal output by the optical pickup device, the optical pickup device focusing a light beam on a recording surface of the corresponding optical disk and receiving a return light beam from the recording surface, the optical pickup device comprising: a light source unit; an optical system which leads the return light beam to a predetermined light-receiving location and includes an object lens focusing each light beam from the light source unit to the recording surface of the corresponding storage medium; and a photodetector arranged at the light-receiving location, the light source unit comprising:

a plurality of light sources outputting light beams respectively, the plurality of light sources being arranged in proximity to each other; and a divergence-angle changing unit changing respective angles of divergence of two light beams among the light beams output from the plurality of light sources, in two orthogonal planes each including an outgoing direction of one of the two light beams having a maximum intensity.

* * * * *